United States Patent
Sawa et al.

(10) Patent No.: US 9,826,211 B2
(45) Date of Patent: Nov. 21, 2017

(54) SOUND PROCESSING SYSTEM AND PROCESSING METHOD THAT EMPHASIZE SOUND FROM POSITION DESIGNATED IN DISPLAYED VIDEO IMAGE

(71) Applicant: PANASONIC INTELLECTUAL PROPERTY MANAGEMENT CO., LTD., Osaka (JP)

(72) Inventors: Hirotaka Sawa, Tokyo (JP); Shinichi Shigenaga, Tokyo (JP); Toshimichi Tokuda, Fukuoka (JP); Shintaro Yoshikuni, Fukuoka (JP); Shuichi Watanabe, Fukuoka (JP); Tadashi Maki, Fukuoka (JP); Hirokazu Tasaka, Fukuoka (JP); Susumu Ono, Fukuoka (JP); Keisuke Fujimoto, Osaka (JP); Shojiro Matsuo, Fukuoka (JP); Teppei Fukuda, Fukuoka (JP); Hiroyuki Matsumoto, Fukuoka (JP); Akitoshi Izumi, Fukuoka (JP); Hisashi Tsuji, Fukuoka (JP); Kazunori Hayashi, Fukuoka (JP); Ryoichi Yuge, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 11 days.

(21) Appl. No.: 14/654,944

(22) PCT Filed: Dec. 27, 2013

(86) PCT No.: PCT/JP2013/007681
§ 371 (c)(1),
(2) Date: Aug. 18, 2015

(87) PCT Pub. No.: WO2014/103331
PCT Pub. Date: Jul. 3, 2014

(65) Prior Publication Data
US 2015/0350621 A1  Dec. 3, 2015

(30) Foreign Application Priority Data

Dec. 27, 2012 (JP) .................. 2012-285862
Dec. 5, 2013 (JP) .................. 2013-252468

(51) Int. Cl.
*H04N 9/80* (2006.01)
*H04N 9/802* (2006.01)
(Continued)

(52) U.S. Cl.
CPC ............. *H04N 9/802* (2013.01); *G11B 27/34* (2013.01); *G11B 31/006* (2013.01);
(Continued)

(58) Field of Classification Search
CPC ................ H04R 2430/20; H04R 3/005; H04R 2201/403; H04R 2499/15; H04N 21/439; H04N 9/802
See application file for complete search history.

(56) References Cited

U.S. PATENT DOCUMENTS 5,790,181 A * 8/1998 Chahl ................... G02B 13/06
348/143
6,043,837 A * 3/2000 Driscoll, Jr. ......... H04N 5/2628
348/36
(Continued)

FOREIGN PATENT DOCUMENTS

CN  101086741  12/2007
JP  10-051889  2/1998
(Continued)

OTHER PUBLICATIONS

Extended European Search Report, dated Sep. 23, 2015 by the European Patent Office (EPO), in the corresponding European Patent Application No. 13868107.7.
(Continued)

*Primary Examiner* — David Harvey
(74) *Attorney, Agent, or Firm* — Greenblum & Bernstein, P.L.C.

(57) ABSTRACT

A recorder receives designation of a video which is desired to be reproduced from a user. If designation of one or more designated locations where sound is emphasized on a screen of a display which displays the video is received by the recorder from the user via an operation unit during reproduction or temporary stopping of the video, a signal processing unit performs an emphasis process on audio data, that is, the signal processing unit emphasizes audio data in
(Continued)

directions directed toward positions corresponding to the designated locations from a microphone array by using audio data recorded in the recorder. A reproducing device reproduces the emphasis-processed audio data and video data in synchronization with each other.

13 Claims, 39 Drawing Sheets

(51) Int. Cl.
| | |
|---|---|
| G11B 31/00 | (2006.01) |
| H04N 5/93 | (2006.01) |
| H04N 21/234 | (2011.01) |
| H04N 21/81 | (2011.01) |
| H04R 3/00 | (2006.01) |
| H04N 9/82 | (2006.01) |
| H04N 9/87 | (2006.01) |
| H04N 5/225 | (2006.01) |
| G11B 27/34 | (2006.01) |
| H04R 1/08 | (2006.01) |
| H04R 27/00 | (2006.01) |
| G11B 27/10 | (2006.01) |
| H04R 1/04 | (2006.01) |
| H04R 1/40 | (2006.01) |
| H04R 29/00 | (2006.01) |

(52) U.S. Cl.
CPC ............ *H04N 5/2252* (2013.01); *H04N 5/93* (2013.01); *H04N 9/8211* (2013.01); *H04N 9/87* (2013.01); *H04N 21/23412* (2013.01); *H04N 21/8106* (2013.01); *H04R 1/08* (2013.01); *H04R 3/005* (2013.01); *H04R 27/00* (2013.01); *G11B 27/10* (2013.01); *H04R 1/04* (2013.01); *H04R 1/086* (2013.01); *H04R 1/406* (2013.01); *H04R 29/008* (2013.01); *H04R 2201/021* (2013.01); *H04R 2410/07* (2013.01); *H04R 2499/15* (2013.01)

(56) References Cited

U.S. PATENT DOCUMENTS

| | | | |
|---|---|---|---|
| 6,157,403 A | 12/2000 | Nagata | |
| 7,002,617 B1 | 2/2006 | Smith | |
| 7,260,241 B2* | 8/2007 | Fukuhara | G08B 13/19602 348/143 |
| 7,298,930 B1* | 11/2007 | Erol | G06K 9/00711 382/305 |
| 7,536,029 B2* | 5/2009 | Choi | G01S 3/7864 348/14.04 |
| 7,893,985 B1* | 2/2011 | Ahiska | H04N 5/2254 348/222.1 |
| 8,427,538 B2* | 4/2013 | Ahiska | H04N 5/217 348/143 |
| 8,547,416 B2* | 10/2013 | Ozawa | G06K 9/00234 348/14.16 |
| 9,036,001 B2* | 5/2015 | Chuang | G08B 13/19602 348/335 |
| 9,098,910 B2* | 8/2015 | Hinkel | G06T 3/0062 |
| 9,407,851 B2* | 8/2016 | Kweon | H04N 5/378 |
| 2001/0010555 A1* | 8/2001 | Driscoll, Jr. | G02B 13/06 348/335 |
| 2002/0075295 A1* | 6/2002 | Stentz | G09G 5/00 715/727 |
| 2003/0160862 A1* | 8/2003 | Charlier | H04N 5/23238 348/14.08 |
| 2003/0160868 A1* | 8/2003 | Kakou | G08B 13/19602 348/143 |
| 2005/0140810 A1* | 6/2005 | Ozawa | H04N 5/23293 348/333.02 |
| 2007/0070190 A1* | 3/2007 | Yin | G08B 13/19626 348/36 |
| 2008/0010060 A1 | 1/2008 | Asano et al. | |
| 2008/0131092 A1 | 6/2008 | Takanezawa | |
| 2009/0041378 A1* | 2/2009 | Yamaoka | G06T 5/006 382/275 |
| 2009/0185028 A1 | 7/2009 | Ogawa | |
| 2010/0123785 A1 | 5/2010 | Chen et al. | |
| 2010/0185308 A1* | 7/2010 | Yoshida | H04S 7/00 700/94 |
| 2011/0013075 A1 | 1/2011 | Kim et al. | |
| 2012/0045149 A1 | 2/2012 | Arai et al. | |
| 2012/0124603 A1 | 5/2012 | Amada | |
| 2012/0169842 A1* | 7/2012 | Chuang | G08B 13/19619 348/39 |
| 2012/0218377 A1* | 8/2012 | Oku | H04N 5/23238 348/36 |
| 2012/0317594 A1* | 12/2012 | Thorn | H04N 5/607 725/18 |
| 2013/0321568 A1* | 12/2013 | Suzuki | H04N 5/23238 348/36 |
| 2014/0085538 A1* | 3/2014 | Kaine | H04N 9/802 348/462 |

FOREIGN PATENT DOCUMENTS

| | | |
|---|---|---|
| JP | 11-146295 | 5/1999 |
| JP | 11-205772 | 7/1999 |
| JP | 11-331827 | 11/1999 |
| JP | 2000-209689 | 7/2000 |
| JP | 2003-018561 | 1/2003 |
| JP | 2004-180197 | 6/2004 |
| JP | 2005-274707 | 10/2005 |
| JP | 2007-295335 | 11/2007 |
| JP | 2007-300220 | 11/2007 |
| JP | 2008-141703 | 6/2008 |
| JP | 2008-193196 | 8/2008 |
| JP | 2008-271157 | 11/2008 |
| JP | 2009-118318 | 5/2009 |
| JP | 2010-026834 | 2/2010 |
| JP | 2010-187363 | 8/2010 |
| JP | 2010-213091 | 9/2010 |
| JP | 2011-071686 | 4/2011 |
| JP | 2011211675 A * | 10/2011 |
| JP | 2012-105199 | 5/2012 |
| WO | 2011/114610 | 9/2011 |

OTHER PUBLICATIONS

Office Action issued in Japan Counterpart Patent Appl. No. 2015-007242, dated Jan. 19, 2016, along with an English translation thereof.
Office Action in Japan Patent Application No. 2013-252468, dated Jul. 5, 2016, together with an English language translation thereof.
International Search Report (PCT/ISA/210) and Written Opinion of the International Searching Authority (PCT/ISA/237), dated Apr. 1, 2014, in corresponding International Application No. PCT/JP2013/007681.

* cited by examiner

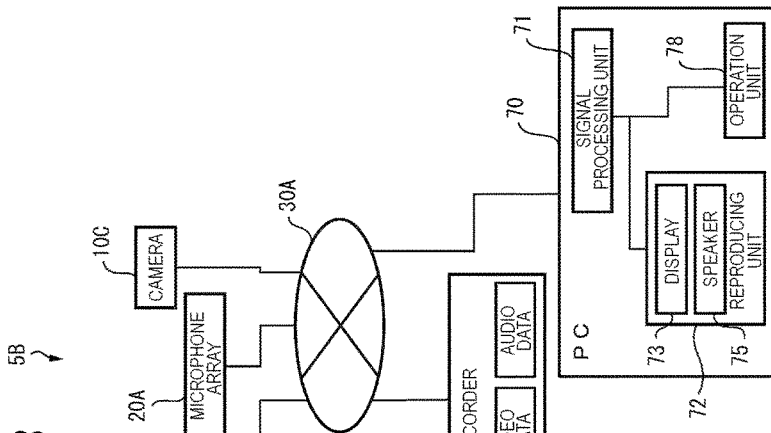
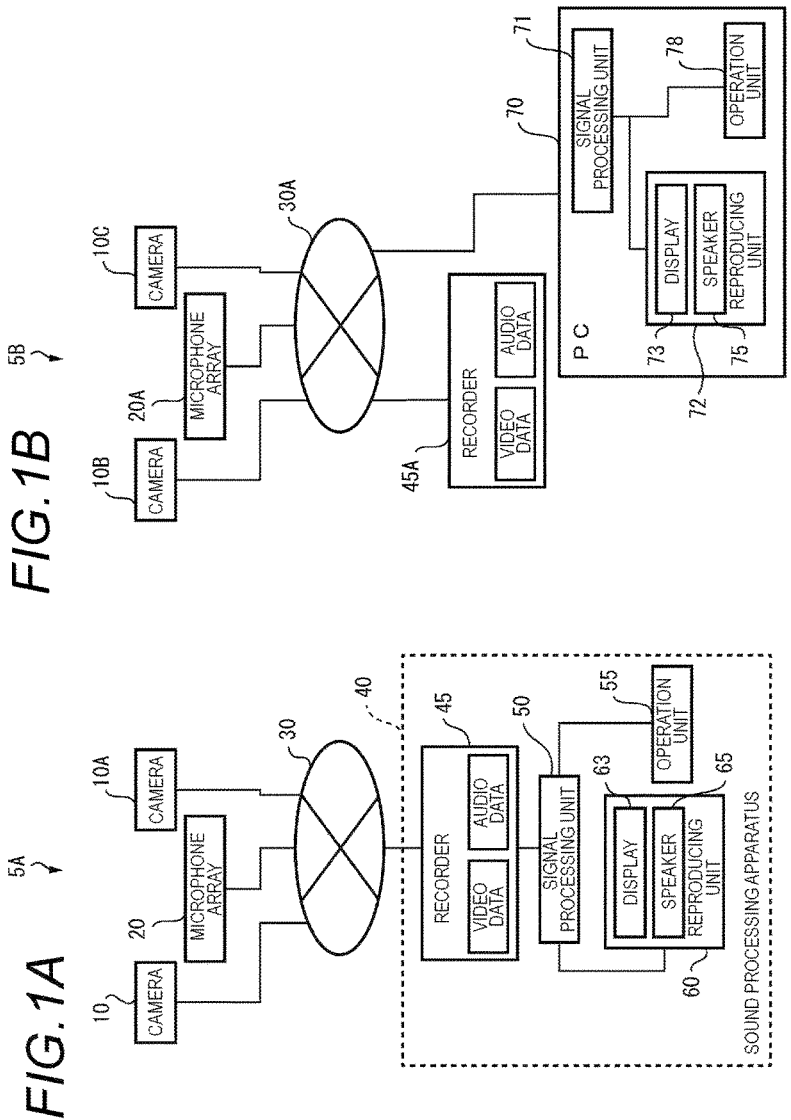

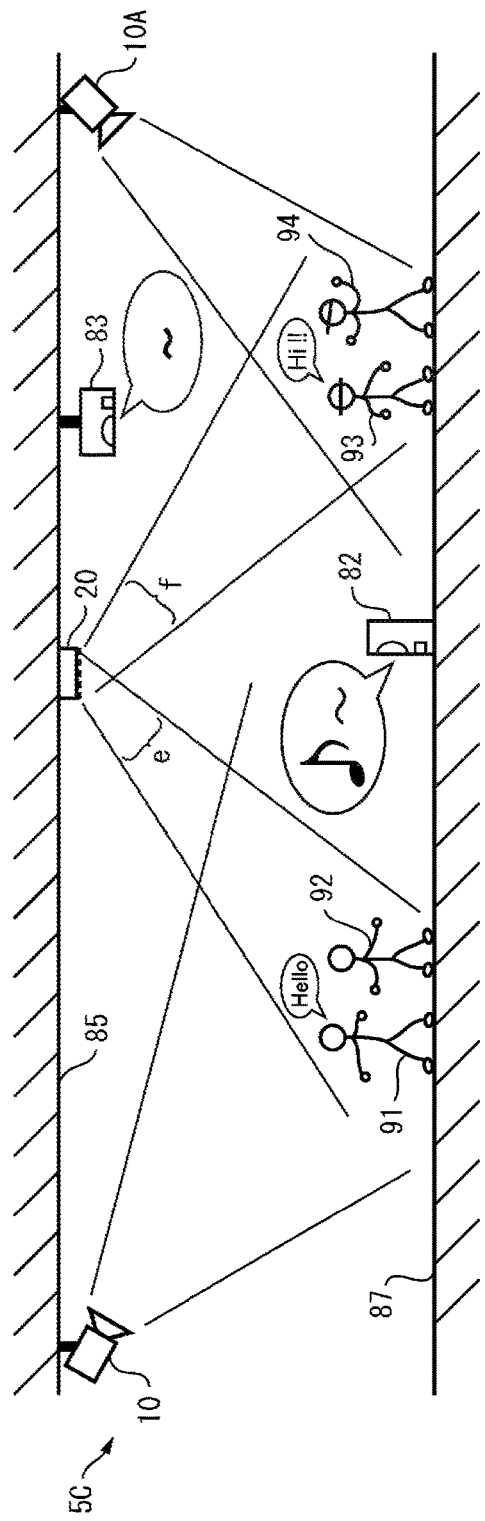
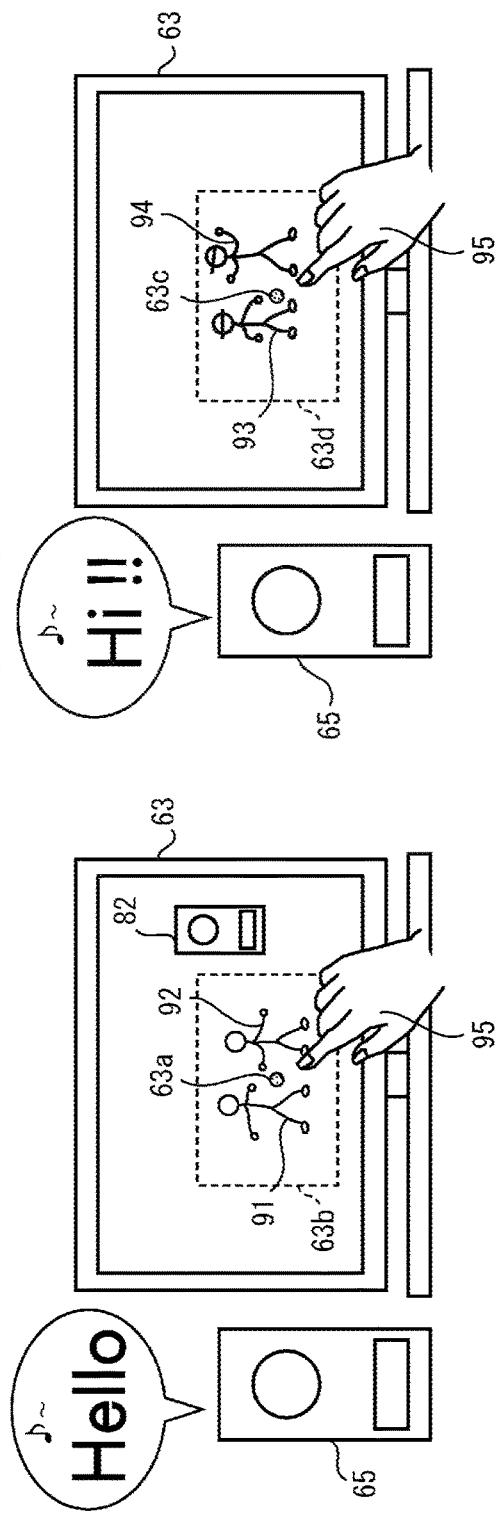

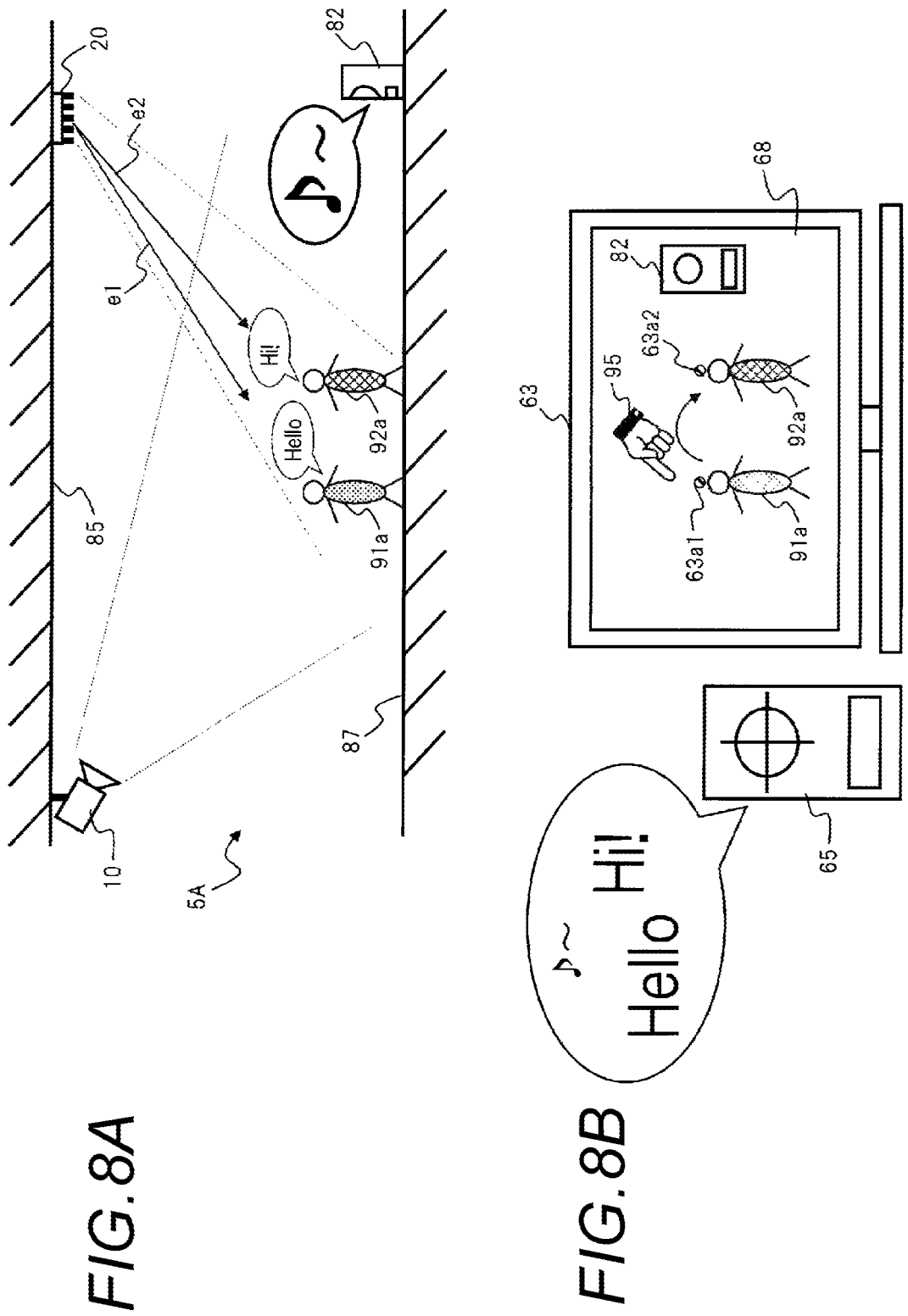

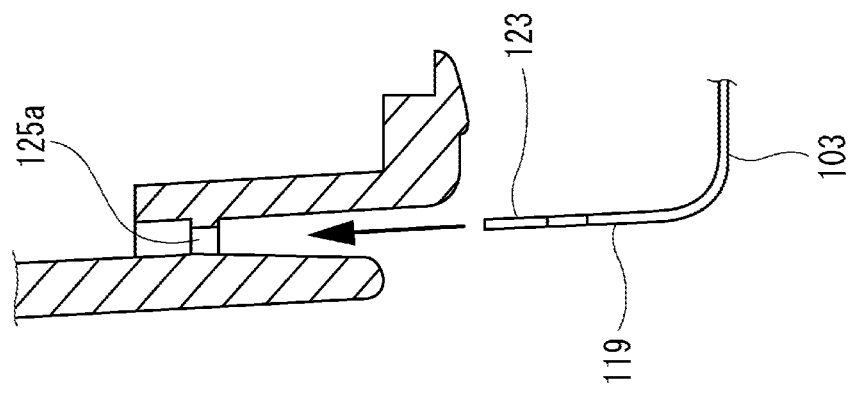
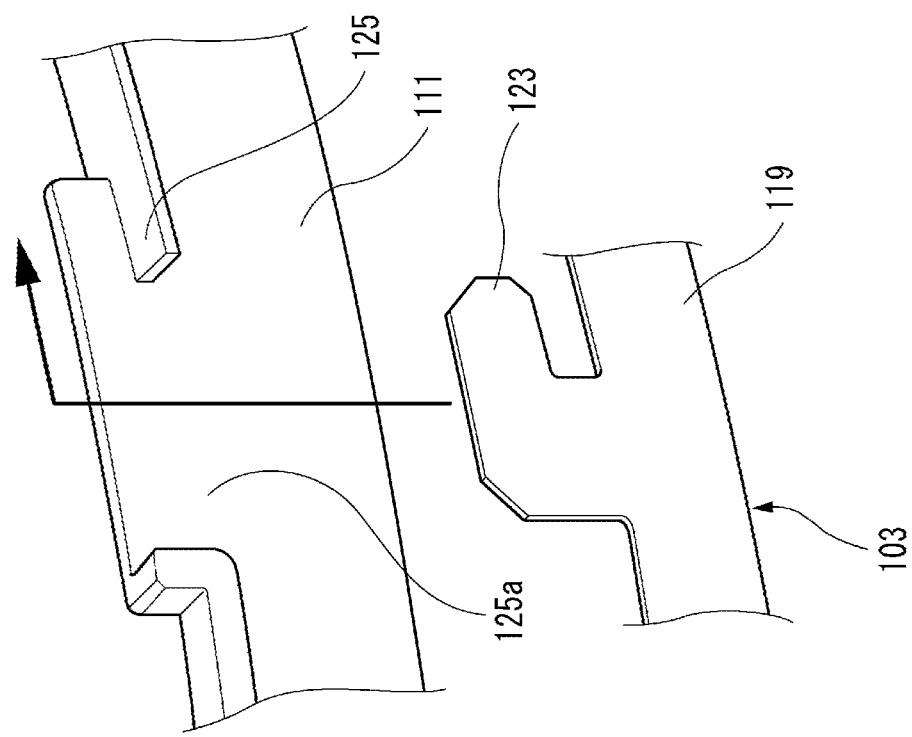

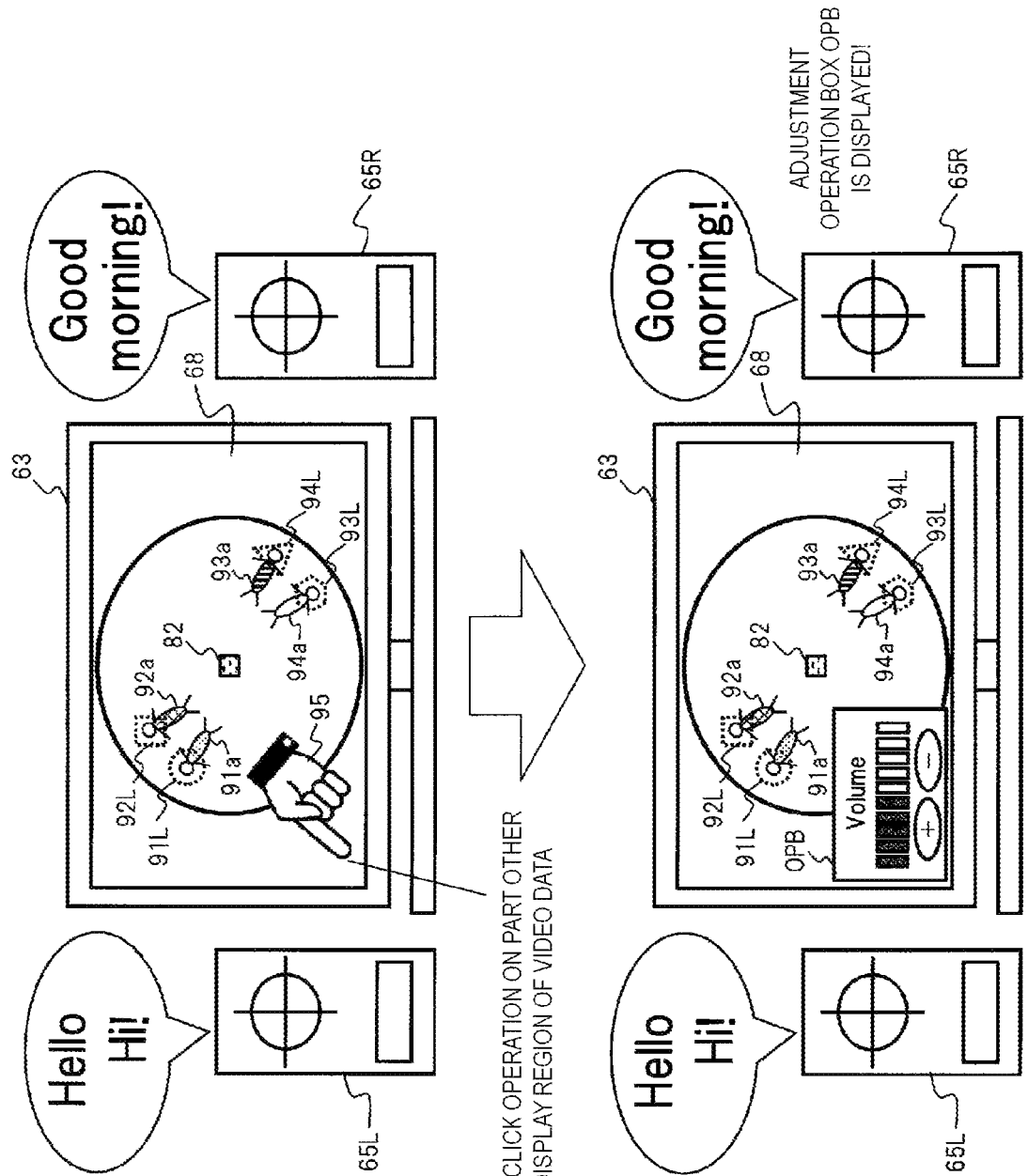

SOUND PROCESSING SYSTEM AND PROCESSING METHOD THAT EMPHASIZE SOUND FROM POSITION DESIGNATED IN DISPLAYED VIDEO IMAGE

TECHNICAL FIELD

The present invention relates to a sound processing system and a sound processing method capable of reproducing recorded video data and audio data.

BACKGROUND ART

In a monitoring system provided in a factory, a store (for example, a retail store or a bank) or a public place (for example, a library), a plurality of monitoring cameras (for example, pan-tilt cameras or omnidirectional cameras) are connected to each other via a network, and thus high image quality and wide angle of view of video data (including a still image and a moving image; this is also the same for the following description) regarding the vicinity of a monitoring target are realized.

In addition, since an information amount which can be obtained in monitoring only using a video is restricted, a monitoring system has recently appeared in which a microphone is also disposed in addition to the monitoring camera, and thus video data and audio data regarding the vicinity of a monitoring target are obtained.

As a related art for obtaining audio data regarding the vicinity of a monitoring target, a sound processing apparatus is known which includes an imaging unit that obtains a captured image and a plurality of microphones (sound collecting unit) that collect audio data, and generates audio data having directivity in a predetermined sound collection direction designated by a sound reproducing apparatus as a client by using the audio data collected by each microphone (for example, refer to Patent Literature 1).

In Patent Literature 1, the sound processing apparatus combines the audio data items collected by the plurality of sound collecting units (microphone) with each other based on a control command for a predetermined sound collection direction which is received in advance from a client (sound reproducing apparatus) connected thereto via a network, generates audio data having directivity in the same direction, and transmits the combined audio data to the client (sound reproducing apparatus).

CITATION LIST

Patent Literature

Patent Literature 1: JP-A-2000-209689

SUMMARY OF INVENTION

Technical Problem

In a case where the sound processing apparatus disclosed in Patent Literature 1 is applied to a manned monitoring system, when a certain accident occurs during recording of captured images of the vicinity of a monitoring target, the sound processing apparatus can directly receive designation for a sound collection direction from the client (sound reproducing apparatus), and audio data having directivity in the same sound collection direction can be generated.

However, for example, in a case where the sound processing apparatus disclosed in Patent Literature 1 is applied to an unmanned monitoring system, it is assumed that, after an accident occurs, information (for example, audio data) regarding the accident is desired to be obtained by reproducing video data and audio data which have been recorded from the time before the occurrence of the accident. In this case, since it cannot be said that a region where the accident has occurred is located in a predetermined sound collection direction which is designated by the client in advance, there is a possibility that the sound processing apparatus may be unlikely to obtain audio data having directivity to the region where the accident has occurred, that is, in the desired sound collection direction. In other words, there is a problem in which there is a high possibility that effective information regarding the accident may not be obtained based on the recorded video data and audio data.

In order to solve the above-described problem of the related art, an object of the present invention is to provide a sound processing system and a sound processing method capable of emphasizing and outputting audio data having directivities toward positions corresponding to one or more designated locations on a display screen on which captured video data is displayed.

Solution to Problem

According to the present invention, there is provided a sound processing system including: at least one imaging unit that captures a video; a display unit that displays video data captured by the imaging unit; a sound collecting unit that includes a plurality of microphones and collects sound by using the microphones; a sound output unit that outputs audio data collected by the sound collecting unit, as sound; a recording unit that records the video data captured by the imaging unit and the audio data collected by the sound collecting unit; a reproducing unit that displays the video data recorded in the recording unit on the display unit, and outputs the audio data recorded in the recording unit from the sound output unit as sound; an operation unit that receives designation of one or more designated locations in the video data displayed on the display unit; and a signal processing unit that generates or combines audio data in which sound is emphasized in directivities directed toward positions corresponding to the one or more designated locations in the video data from the sound collecting unit based on the audio data recorded in the recording unit.

In addition, the present invention relates to a sound processing method including the steps of causing at least one imaging unit to capture a video; causing a sound collecting unit including a plurality of microphones to collect sound; displaying video data captured by the imaging unit on a display unit; recording the video data captured by the imaging unit and the audio data collected by the sound collecting unit; displaying the recorded video data on the display unit, and outputting the recorded audio data from a sound output unit as sound; receiving designation of one or more designated locations in the video data displayed on the display unit; and generating or combining audio data in which sound is emphasized in directivities directed toward positions corresponding to the one or more designated locations in the video data from the sound collecting unit based on the recorded audio data.

Advantageous Effects of Invention

According to the present invention, it is possible to emphasize and output audio data in directivities toward positions corresponding to one or more designated locations on a display screen on which captured video data is displayed.

BRIEF DESCRIPTION OF DRAWINGS

FIGS. 1A and 1B are block diagrams illustrating configurations of sound processing systems of respective embodiments.

FIG. 6 schematically illustrates an example of a usage type of the sound processing system of a first embodiment, in which

FIG. 7 schematically illustrates an example of a usage type of the sound processing system of a second embodiment, in which FIG. 7A is a diagram illustrating a state in which two cameras, a single microphone array located at an intermediate position between the two cameras, and a speaker are installed, for example, on the ceiling of the indoor hall; FIG. 7B is a diagram illustrating a state in which video data captured by the camera 10 is displayed on the display 63, and audio data is output from the speaker 65 as sound; and FIG. 7C is a diagram illustrating a state in which video data captured by the camera 10A is displayed on the display 63, and audio data is output from the speaker 65 as sound.

FIG. 8 schematically illustrates an example of a usage type of the sound processing system of a fourth embodiment, in which FIG. 8A is a diagram illustrating a state in which a single camera, a single microphone array, and a single speaker are installed, for example, on a ceiling of an indoor hall, and FIG. 8B is a diagram illustrating a schematic operation of the sound processing system in a case where a plurality of designated locations are designated in video data displayed on the display.

FIG. 9 schematically illustrates an example of the usage type of the sound processing system, in which

FIG. 15A is a perspective view illustrating a state in which a punched metal cover is fixed to a main casing, and FIG. 15B is a sectional view illustrating a state in which the punched metal cover is fixed to the main casing.

FIG. 40 is a diagram illustrating a case in which a touch operation is performed on parts other than a display region of the video data which is displayed on the display provided with a touch panel in a state in which the video data illustrated in FIG. 39B is displayed, and, as a result, the adjustment operation box is displayed.

DESCRIPTION OF EMBODIMENTS

Figure 2B:
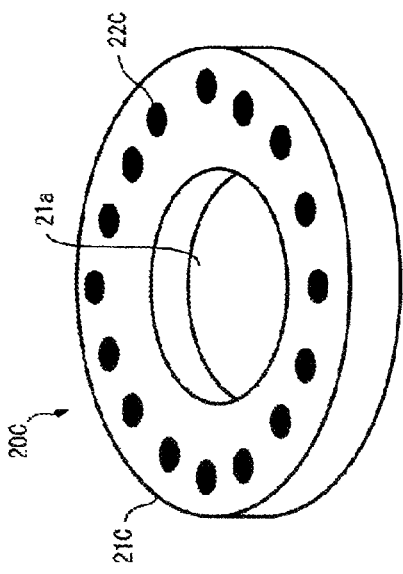
FIG. 2B is a diagram illustrating an exterior of a microphone array in a third embodiment.

Hereinafter, with reference to the accompanying drawings, a sound processing system and a sound processing method according to the present invention will be described. A sound processing system of each embodiment is applied to a factory, a public facility (for example, a library or an event hall), or a monitoring system (including a manned monitoring system and an unmanned monitoring system) provided in a store (for example, a retail store or a bank).

First Embodiment

FIGS. 1A and 1B are block diagrams illustrating configurations of sound processing systems 5A and 5B of respective embodiments. The sound processing system 5A includes monitoring cameras 10 and 10A, a microphone array 20, and a sound processing apparatus 40. The cameras 10 and 10A, the microphone array 20, the sound processing apparatus 40 are connected to each other via a network 30.

The sound processing system 5B includes monitoring cameras 10B and 10C, a microphone array 20A, a recorder 45A, and a personal computer (PC) 70. The cameras 10B and 10C, the microphone array 20A, the recorder 45A, and the PC 70 are connected to each other via a network 30A.

Hereinafter, a description will be made focusing on an operation of each element of the sound processing system 5A, and an operation of each element of the sound processing system 5B will be described in relation to the content which is different from that of the operation of the sound processing system 5A.

The cameras 10 and 10A as imaging units which are monitoring cameras installed, for example, on a ceiling of an event hall (for example, refer to FIG. 6), has panning and tilting functions, a zoom-in function, and a zoom-out function which can be remotely operated from a monitoring system control center (not illustrated) connected thereto via the network 30, and capture videos (including a still image and a moving image; this is also the same for the following description) of the vicinity of a monitoring target point (location). The cameras 10 and 10A record data (video data) regarding the captured videos in a recorder 45 via the network 30.

The microphone array 20 as a sound collecting unit is installed, for example, on the ceiling of the event hall (for example, refer to FIG. 6), and is a set of microphones in which a plurality of microphones 22 (for example, refer to FIG. 2) are uniformly provided. The microphone array 20 collects sound of the vicinity of the monitoring target point (location) by using each of the microphones 22, and records data (audio data) regarding the sound collected by each of the microphones 22 in the recorder 45 via the network. A structure of the microphone array 20 will be described later with reference to FIG. 2.

The sound processing apparatus 40 includes the recorder 45, a signal processing unit 50, an operation unit 55, and a reproducing unit 60. The recorder 45 includes a control section (not illustrated) which controls each process such as recording of data in the recorder 45 and a recording section (not illustrated) which stores video data and audio data. The recorder 45 records video data captured by the cameras 10 and 10A and audio data collected by the microphone array 20 in correlation with each other.

The signal processing unit 50 is configured by using, for example, a central processing unit (CPU), a micro-processing unit (MPU), or a digital signal processor (DSP), and performs a control process for entirely supervising an operation of each unit of the sound processing apparatus 40, data input and output processes with the other units, a data calculation (computation) process, and a data storage process.

By using the audio data recorded in the recorder 45, the signal processing unit 50 adds audio data collected by each of the microphones thereto through a directivity control process of the audio data to be described later, and generates audio data in which directivity is formed in a specific directivity in order to emphasize (amplify) sound (volume level thereof) in the specific direction from a position of each microphone 22 of the microphone array 20. In addition, by using audio data transmitted from the microphone array 20, the signal processing unit 50 may generate audio data in which directivity is formed in a specific direction in order to emphasize (amplify) a volume level of sound in the specific direction (directivity) from the microphone array 20. Further, the specific direction is a direction which is directed from the microphone array 20 toward a position corresponding to a predetermined designated location which is designated from the operation unit 55, and is a direction designated by a user in order to emphasize (amplify) a volume level of audio data.

In a case where the video data recorded in the recorder 45 is captured by an omnidirectional camera (which will be described later), the signal processing unit 50 performs a conversion process of a coordinate system (two-dimensional or three-dimensional coordinate conversion of an x axis, a y axis, and a z axis) of the video data recorded in the recorder 45, and displays video data having undergone the conversion process on a display 63 (refer to FIGS. 9C and 9E).

The operation unit 55 is disposed so as to correspond to, for example, a screen of the display 63 and is configured by using a touch panel or a touch pad which allows an input operation with a user's finger 95 or a stylus pen. The operation unit 55 outputs coordinate data of one or more designated locations where a volume level of audio data is desired to be emphasized (amplified), to the signal processing unit 50. In addition, the operation unit 55 may be configured by using a pointing device such as a mouse or a keyboard.

The reproducing unit 60 includes the display 63 and a speaker 65, displays the video data recorded in the recorder 45 on the display 63, and outputs the audio data recorded in the recorder 45 to the speaker 65 as sound. In addition, the display 63 and the speaker 65 may have configurations which are different from that of the reproducing unit 60.

The display 63 as a display unit displays video data which is captured by the cameras 10 and 10A and is recorded in the recorder 45.

The speaker 65 as a sound output unit outputs, as sound, audio data which is collected by the microphone array 20 and is recorded in the recorder 45, or audio data which has undergone an emphasis in a specific direction in the signal processing unit 50 based on the audio data.

Here, the sound processing apparatus 40 may have a configuration in which the recorder 45 is provided separately from the other units of the sound processing apparatus 40 (refer to FIG. 1B). Specifically, the sound processing apparatus 40 illustrated in FIG. 1A may include the recorder 45A illustrated in FIG. 1B and the PC 70 illustrated in FIG. 1B. In other words, the PC 70 is configured by using a general purpose computer, and includes a signal processing unit 71, a reproducing unit 72 provided with a display 73 and a speaker 75, and an operation unit 78. The recorder 45A and the PC 70 correspond to the sound processing apparatus 40 in the sound processing system 5A and realize the same function and operation.

In addition, functions of the cameras 10B and 10C and the microphone array 20A are respectively the same as the functions of the cameras 10 and 10A and the microphone array 20 in the sound processing system 5A.

Further, the number of cameras provided in the sound processing systems 5A and 5B are arbitrary. Still further, the networks 30 and 30A may be connected to each other so that data can be transmitted between the sound processing systems 5A and 5B.

Figure 2C:
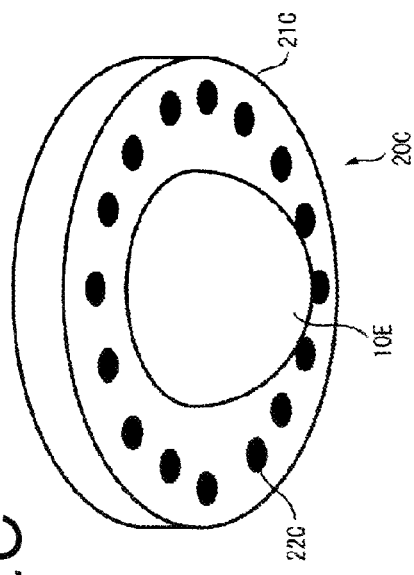
FIG. 2C is a diagram illustrating a state in which the microphone array and a camera are installed.
Figure 2A:
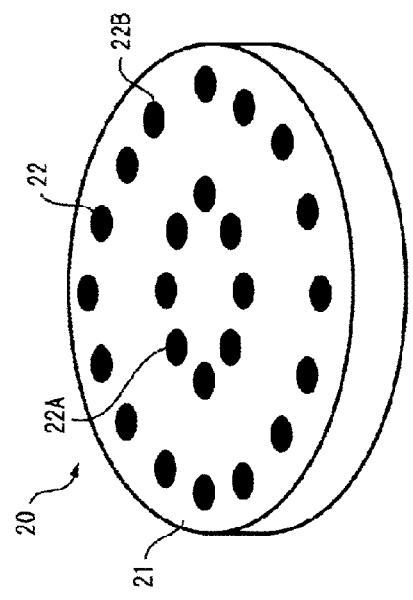
FIG. 2A is an exterior view of a microphone array.

FIG. 2A is an exterior view of the microphone array 20. The microphone array 20 includes a plurality of microphones 22 which are disposed in a disc-shaped casing 21. The plurality of microphones 22 are disposed along a surface of the casing 21, and are disposed in two concentric circular shapes including a small circular shape and a large circular shape which have the same center as the casing 21. A plurality of microphones 22A disposed in the small circular shape have mutually narrow intervals and have characteristics suitable for a high sound range. On the other hand, a plurality of microphones 22B disposed in the large circular shape have great diameters and have characteristics suitable for a low sound range.

FIG. 2B is a diagram illustrating an exterior of a microphone array 20C in a third embodiment, and a state in which the microphone array 20C and an omnidirectional camera 10E (refer to FIG. 9A) are installed. The microphone array 20C illustrated in FIG. 2B includes a doughnut-shaped casing 21C in which an opening 21a is formed inside, and a plurality of microphones 22C which are uniformly provided in the casing 21C. The plurality of microphones 22C are disposed in a concentric circular shape in the casing 21C.

Figure 9A:
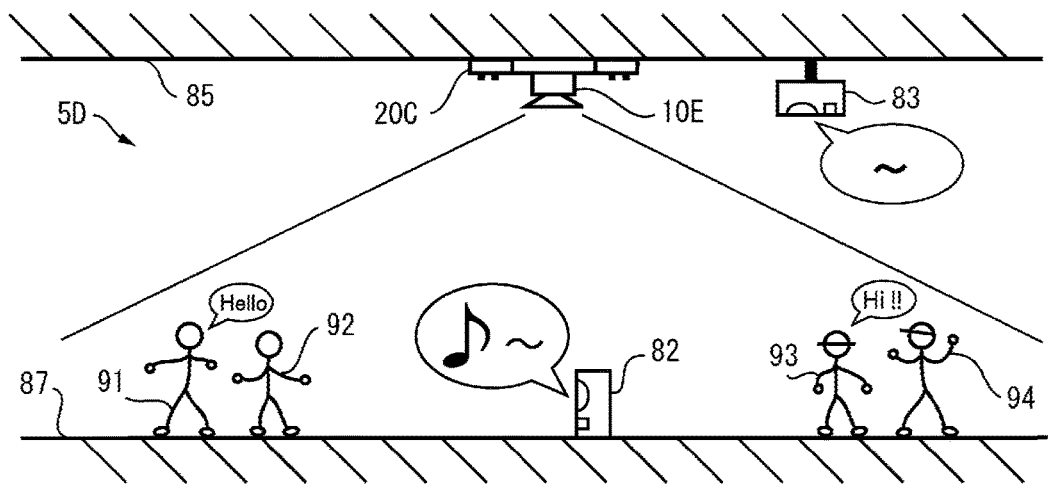
FIG. 9A is a diagram illustrating a state in which a doughnut-shaped microphone array, a camera incorporated integrally with the microphone array, and a speaker are installed, for example, on the ceiling of the indoor hall.

In FIG. 2C, the omnidirectional camera 10E illustrated in FIG. 9A is installed inside the opening 21a of the casing 21C in a state of being inserted thereinto. In the present embodiment, the omnidirectional camera 10E is a camera in which, for example, a fish-eye lens is mounted, and is installed so as to image a wide range of a floor surface of the hall. As mentioned above, the omnidirectional camera 10E and the microphone array 20C have a center of the casing 21C of the microphone array 20C in common and are disposed on the same axis, and thus the same coordinate system can be used therein.

Figure 3:
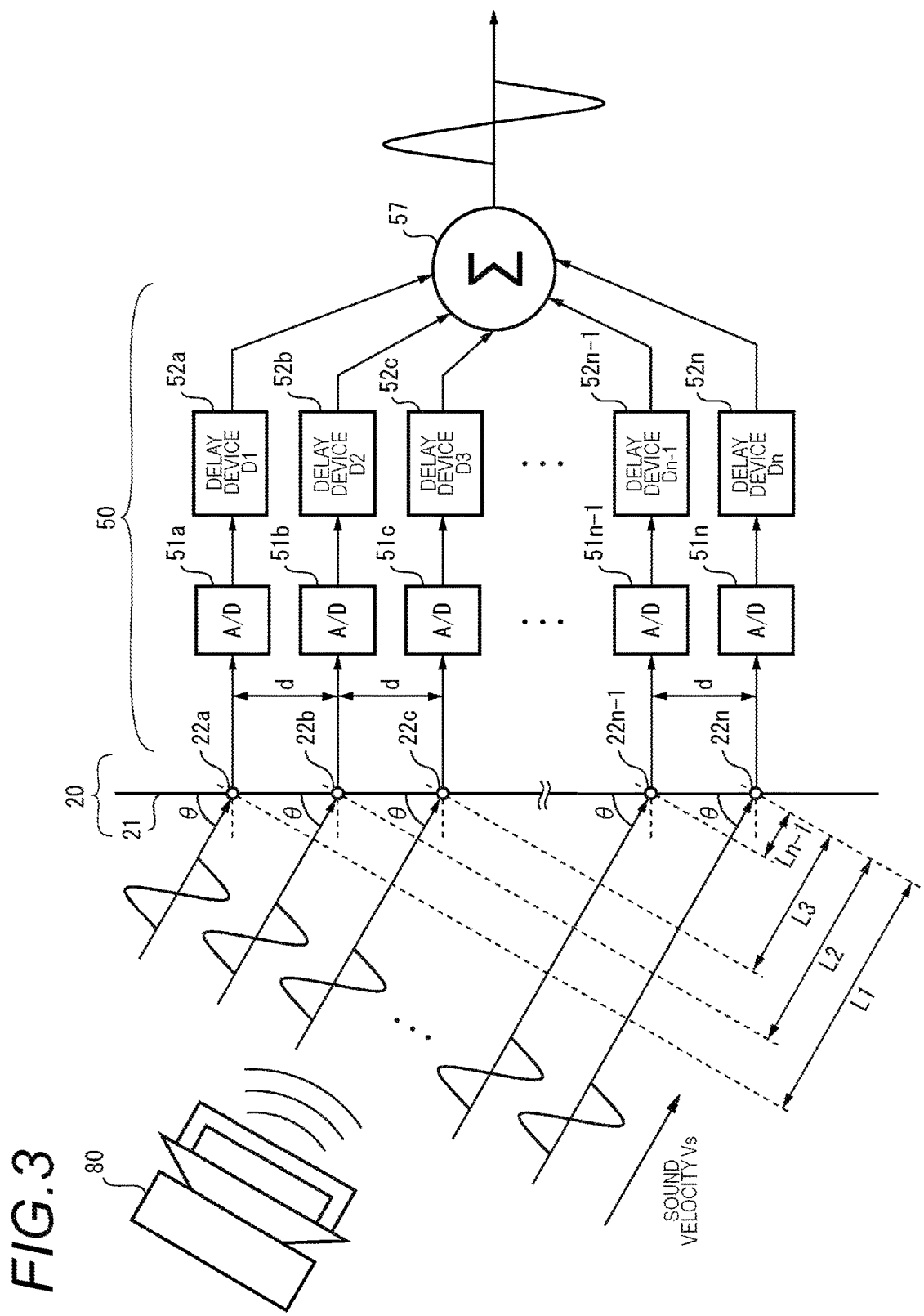
FIG. 3 is a diagram for explaining a principle of a directivity control process using the microphone array.

FIG. 3 is a diagram for explaining a principle of a directivity control process using the microphone array 20. In FIG. 3, a principle of a directivity control process using a delay sum method will be described briefly. It is assumed that sound waves generated from a sound source 80 are incident to respective microphones 22a, 22b, 22c, . . . , 22(n–1), and 22n of the microphone array 20 with predetermined angles (incidence angle=(90–θ) [degrees]). It is assumed that the sound source 80 is disposed in a direction of a predetermined angle θ with respect to the surface of the casing 21 of the microphone array 20. In addition, intervals of the microphones 22a, 22b, 22c, . . . , 22(n–1), and 22n are constant.

The sound waveforms generated from the sound source 80 initially arrive at and are collected by the microphone 22a, then arrive at and are collected by the microphone 22b, similarly, sequentially arrive at and are collected by the microphones, and, finally, arrive at and are collected by the microphone 22n. In addition, for example, in a case where the sound source 80 is the sound of conversations which people have or ambient music, a direction which is directed toward the sound source 80 from each of the microphones 22a, 22b, 22c, . . . , 22(n–1) and 22n of the microphone array 20 may be the same as a direction corresponding to a predetermined region designated from the operation unit 55 in order to emphasize (amplify) a volume level of audio data of the sound which the people have or the ambient music.

Here, there are occurrences of arrival time differences τ1, τ2, τ3, . . . and τ(n–1) between time points when the sound waves arrive at the microphones 22a, 22b, 22c, . . . and 22(n–1) and finally arrive at the microphone 22n. For this reason, if audio data collected by the respective 22a, 22b, 22c, . . . , 22(n–1), and 22n is added without change, the audio data is added in a state where a phase thereof is shifted, and thus a volume level of the sound waves is entirely lowered.

In addition, τ1 indicates a time difference between the time point when the sound wave arrives at the microphone 22a and the time point when the sound wave arrives at the microphone 22n, τ2 indicates a time difference between the time point when the sound wave arrives at the microphone 22b and the time point when the sound wave arrives at the microphone 22n, and, similarly, τ(n–1) indicates a time difference between the time point when the sound wave arrives at the microphone 22(n–1) and the time point when the sound wave arrives at the microphone 22n.

On the other hand, in the respective embodiments including the present embodiment, the signal processing unit 50 includes A/D converters 51a, 51b, 51c, . . . , 51(n–1) and 51n and delay devices 52a, 52b, 52c, . . . , 52(n–1) and 52n which are respectively provided so as to correspond to the 22a, 22b, 22c, . . . , 22(n–1), and 22n, and an adder 57 (refer to FIG. 3).

In other words, in the signal processing unit 50, the A/D converters 51a, 51b, 51c, . . . , 51(n–1) and 51n A/D convert analog audio data collected by the respective 22a, 22b, 22c, . . . , 22(n–1), and 22n into digital audio data. In addition, in the signal processing unit 50, the delay devices 52a, 52b, 52c, . . . , 52(n–1) and 52n provide delay times corresponding to the arrival time differences in the respective 22a, 22b, 22c, . . . , 22(n–1), and 22n to all phases of the sound waves so that the phases thereof are made to match each other, and then the adder 57 adds the audio data having undergone the delay process together. Consequently, the signal processing unit 50 can generate the audio data in which the audio data is emphasized in the direction of the predetermined angle θ from each installation position of the 22a, 22b, 22c, . . . , 22(n–1), and 22n. For example, in FIG. 3, delay times D1, D2, D3, . . . , D(n–1) and Dn which are respectively set in the delay devices 52a, 52b, 53c, . . . , 52(n–1) and 52n respectively correspond to the arrival time differences τ1, τ2, τ3, . . . and τ(n–1), and are expressed by Equation (1)

[Equation 1]

$$D1 = \frac{L1}{Vs} = \frac{\{d \times (n-1) \times \cos\theta\}}{Vs} \quad (1)$$
$$D2 = \frac{L2}{Vs} = \frac{\{d \times (n-2) \times \cos\theta\}}{Vs}$$
$$D3 = \frac{L3}{Vs} = \frac{\{d \times (n-3) \times \cos\theta\}}{Vs}$$
$$\ldots$$
$$Dn-1 = \frac{Ln-1}{Vs} = \frac{\{d \times 1 \times \cos\theta\}}{Vs}$$
$$Dn = 0$$

Here, L1 indicates a difference between sound wave arrival distances in the microphone 22a and the microphone 22n. L2 indicates a difference between sound wave arrival distances in the microphone 22b and the microphone 22n. L3 indicates a difference between sound wave arrival distances in the microphone 22c and the microphone 22n. L(n–1) indicates a difference between sound wave arrival distances in the microphone 22(n–1) and the microphone 22n. Vs indicates sound velocity. L1, L2, L3, . . . , and L(n–1), and Vs are known values. In FIG. 3, the delay time Dn set in the delay device 52n is 0 (zero).

As mentioned above, the signal processing unit 50 can generate audio data in which the audio data is emphasized in any direction with respect to the installation position of the microphone array 20 based on the audio data recorded in the recorder 45 by changing the delay times D1, D2, D3, . . . , D(n–1) and Dn which are respectively set in the delay devices 52a, 52b, 52c, . . . , 52(n–1) and 52n. Therefore, it is possible to easily perform the directivity control process of the audio data in the sound processing systems 5A and 5B.

Figure 4:
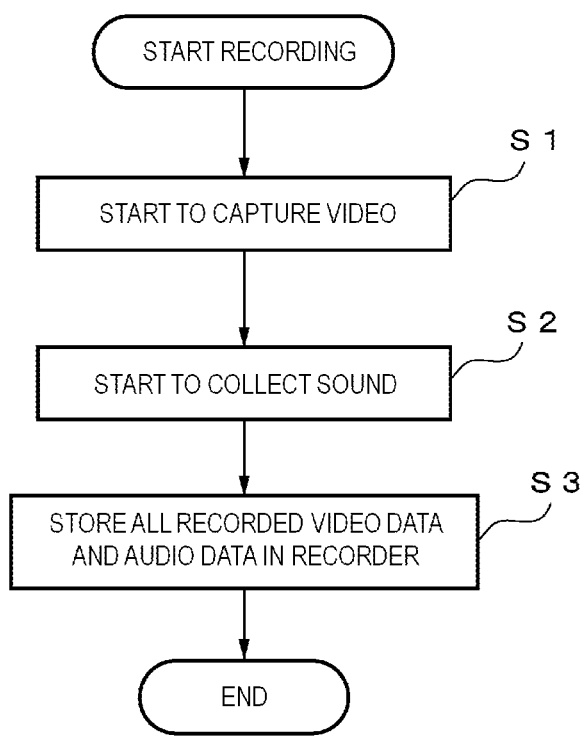
FIG. 4 is a flowchart illustrating an operation procedure in the sound processing system during recording.

Next, a description will be made of each operation of the sound processing systems 5A and 5B during recording and reproduction. Herein, a description will be made of a case where the sound processing system 5A is applied to a monitoring system. FIG. 4 is a flowchart illustrating an operation procedure in the sound processing system 5A during recording.

In FIG. 4, for example, the cameras 10 and 10A start to capture videos of the vicinity of a monitoring target point (location) through a remote operation from a user staying at a monitoring system control center (not illustrated) (S1). At the same time as or substantially at the same time as the start of the imaging in the cameras 10 and 10A, the microphone array 20 starts to collect sound of the vicinity of the monitoring target point (location) (S2). The cameras 10 and 10A transmit the captured video data to the recorder 45 connected thereto via the network 30. The microphone array 20 transmits the collected audio data to the recorder 45 connected thereto via the network 30.

The recorder 45 stores and records the video data transmitted from the cameras 10 and 10A detection the audio data transmitted from the microphone array 20 in correlation with each other (S3). The recording operation of the cameras 10 and 10A, the microphone array 20, and the recorder 45 is finished through a remote operation from the user.

Figure 5:
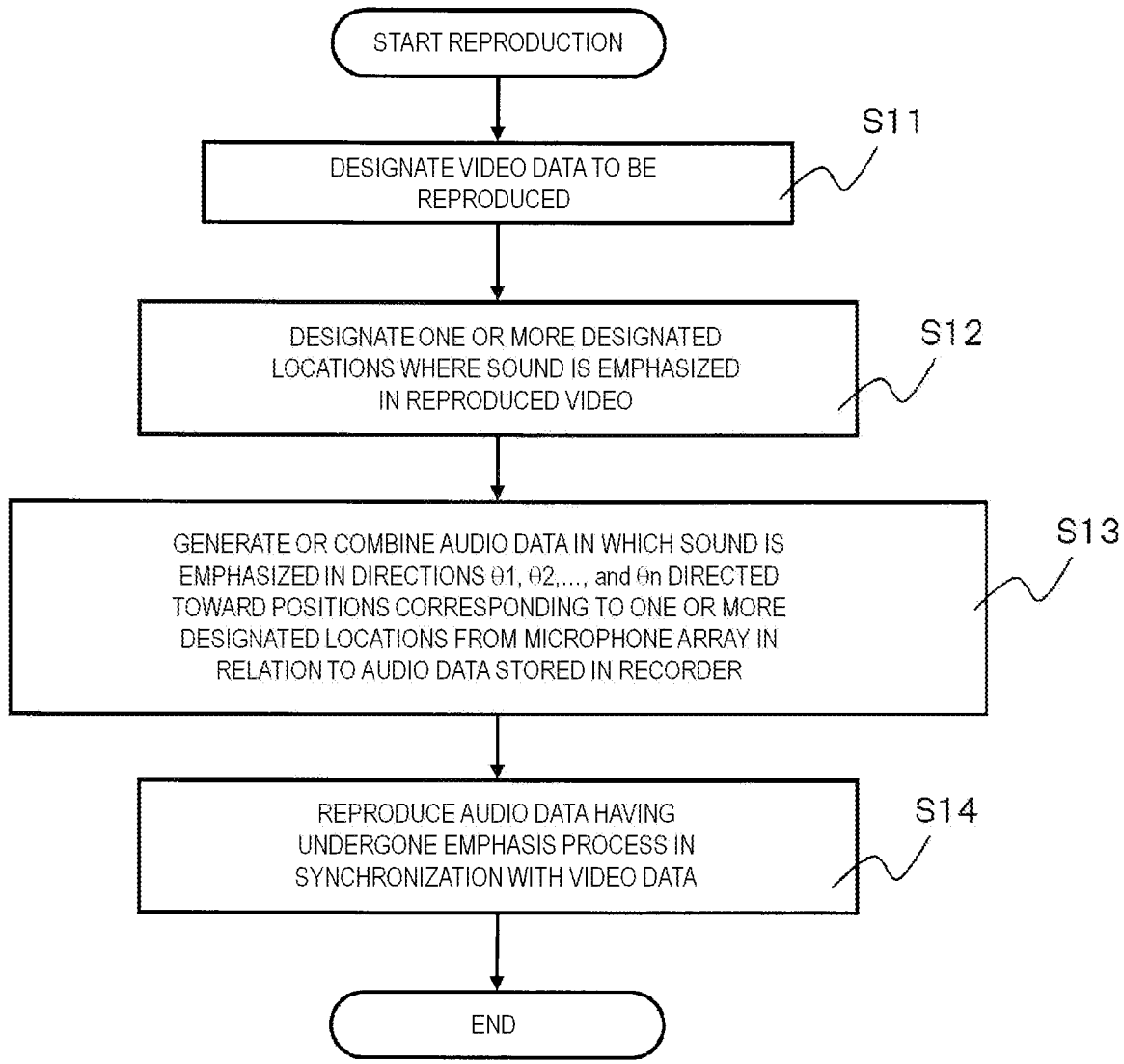
FIG. 5 is a flowchart illustrating an operation procedure in the sound processing system during reproduction in a case where one or more designated locations are designated.

FIG. 5 is a flowchart illustrating an operation procedure in the sound processing systems 5A and 5B during reproduction in a case where one or more locations are designated.

In FIG. 5, the recorder 45 of the sound processing apparatus 40 receives designation of video data which is desired to be reproduced through a direct operation or a remote operation from the user (S11). In the designation of video data, for example, the recorded date and time, and the type of camera are used as conditions. The reproducing unit 60 reproduces video data corresponding to the designated conditions in step S11 and displays the video data on the screen of the display 63. Further, the reproducing unit 60 also reproduces audio data which is stored in the recorder 45 in correlation with the reproduced video data, and outputs the audio data from the speaker 65 as sound.

Here, it is assumed that, during reproduction or temporary stopping of the video data which is being reproduced by the reproducing unit 60, the user designates one or more locations where sound (volume level thereof) is emphasized (amplified) in the video data which is being displayed on the screen of the display 63 via the operation unit 55. In response to the designation operation from the user, the signal processing unit 50 receives the designation of one or more locations where the sound (volume level thereof) is emphasized (amplified) in the content of the video data (S12).

Hereinafter, a location designated by the user via the operation unit 55 in order to form directivity in a direction (directivity) for emphasizing (amplifying) the sound (volume level thereof) with respect to the microphone arrays 20 and 20A is referred to as a "designated location". In step S12, for example, it is assumed that the user touches the screen of the display 63 with the finger 95, and thus a designated location on the video data displayed on the screen of the display 63, or a predetermined rectangular sound emphasis region centering on a touched designated location is designated.

The signal processing unit 50 calculates directions toward respective positions (respective sound positions) of actual sites corresponding to, for example, centers of the one or more designated locations or the sound emphasis region from the positions of the respective microphones 22 of the microphone array 20, as the directions of the predetermined angles θ1, θ2, . . . , and θn described with reference to FIG. 3, that is, respective directions (respective directivities) for emphasizing (amplifying) the sound (volume level thereof), based on the one or more designated locations or the sound emphasis region designated via the operation unit 55. In addition, the signal processing unit 50 generates audio data in which directivity is formed in the calculated predetermined angles θ1, θ2, . . . , and θn, that is, audio data in which sound (volume level thereof) with predetermined angles θ1, θ2, . . . , and θn is emphasized (amplified) in relation to the audio data stored in the recorder 45 in correlation with the video data which is currently being reproduced by the reproducing unit 60 (S13).

In addition, in the present embodiment, the signal processing unit 50 generates or combines audio data in which directivity is formed in directions from the centers of the positions of the respective microphones 22 of the microphone array 20 toward the sound positions corresponding to, for example, the centers of one or more designated locations or the sound emphasis region, but may further perform a suppression process on audio data in a direction (for example, a direction deviated relative to the predetermined angles θ1, θ2, . . . , and θn by ±5 degrees or greater) which is considerably deviated relative to the directions (predetermined angles θ1, θ2, . . . , and θn) directed toward the respective sound positions corresponding to the one or more designated locations or the sound emphasis region.

The reproducing unit 60 outputs, as sound, the respective audio data items in which the sound (volume level thereof) is emphasized (amplified) in the directions directed toward the respective sound positions corresponding to one or more designated locations or the sound emphasis region by the signal processing unit 50, from the speaker 65 in synchronization with the video data which is being displayed on the display 63 in response to the designation in step S11 (S14). Consequently, the operation of the sound processing apparatus 40 during reproduction is finished.

Figure 6A:
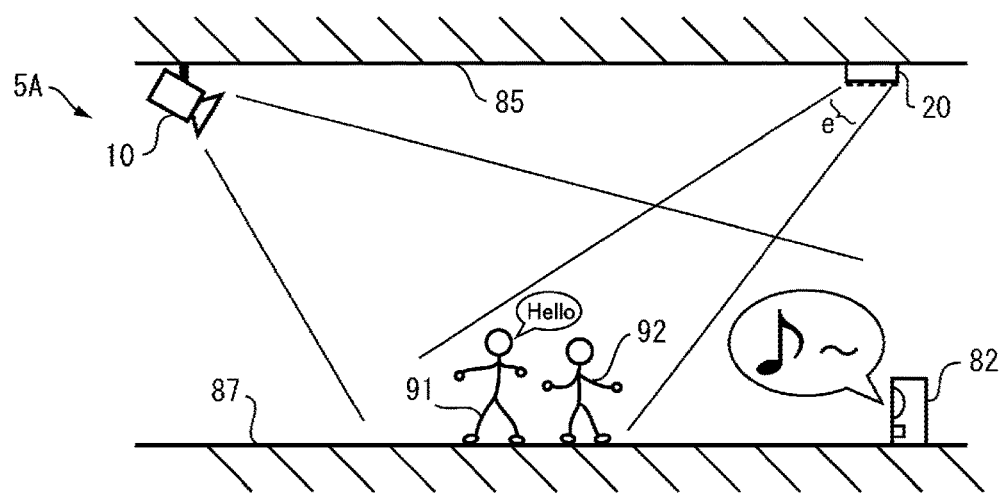
FIG. 6A is a diagram illustrating a state in which a single camera and a single microphone array are installed at positions which are separated from each other, for example, on a ceiling of an indoor hall.

FIG. 6 schematically illustrates an example of a usage type of the sound processing system 5A of the first embodiment. FIG. 6A is a diagram illustrating a state in which a single camera 10 and a single microphone array 20 are installed at positions which are separated from each other, for example, on a ceiling 85 of a hall as an indoor event hall.

In FIG. 6A, two persons 91 and 92 have conversations on a floor 87 of the hall. A speaker 82 is placed so as to contact the floor 87 at a position which is a little far from the two persons 91 and 92, and music is output from the speaker 82. In addition, the camera 10 images the persons 91 and 92 present in the vicinity of a monitoring target point (location) which is set in advance in the camera 10. Further, the microphone array 20 collects sound of the entire hall.

Figure 6B:
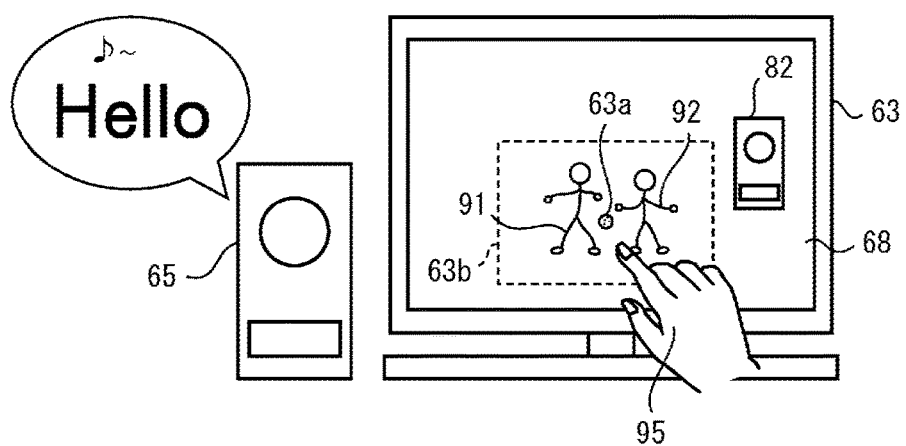
FIG. 6B is a diagram illustrating a state in which video data is displayed on a display and audio data is output from a speaker as sound.

FIG. 6B is a diagram illustrating a state in which video data is displayed on the display 63 and audio data is output from the speaker 65 as sound. The video data captured by the camera 10 is displayed on the screen of the display 63. In addition, the conversations of the two persons 91 and 92 or the music in the hall is output from the speaker 65 as sound.

For example, it is assumed that the user touches the vicinity of the center of the video data of the two persons 91 and 92 displayed on the screen of the display 63 with the finger 95. A touch point 63a is a designated location which is designated by the user. The signal processing unit 50 generates audio data in which directivity is formed in directivities (directions indicated by the reference sign e shown in FIG. 6A) from the positions of the respective microphones 22 of the microphone array 20 toward the sound position corresponding to the touch point 63a designated by the user or a center of a rectangular region 63b by using sound collected by the microphone array 20, that is, respective audio data items collected by the microphones 22.

In other words, the signal processing unit 50 generates the audio data in which sound (volume level thereof) is emphasized (amplified) in the directivities directed toward the sound position corresponding to the touch point 63a designated by the user or the center of the rectangular region 63b from the positions of the respective microphones 22 of the microphone array 20 by using the audio data items collected by the microphones 22. The reproducing unit 60 outputs the audio data generated by the signal processing unit 50 from the speaker 65 as sound in synchronization with the video data captured by the camera 10.

As a result, the audio data in the touch point 63a designated by the user or the rectangular region 63b is emphasized, and the conversations (for example, refer to "Hello" illustrated in FIG. 6A) of the two persons 91 and 92 are output from the speaker 65 as sound with a large volume. On the other hand, the music (refer to "note" illustrated in FIG. 6A) is output as sound so as not to be emphasized from the speaker 82 which is placed at a distance closer to the microphone array 20 than to the two persons 91 and 92 and which is not the touch point 63a designated by the user, and is output as sound with a volume smaller than the conversations of the two persons 91 and 92.

As described above, in the present embodiment, the sound processing system 5A or 5B can emphasize and output audio data in videos for any reproduction period of time designated by the user during reproduction of video data and audio data recorded in the recorder 45. Consequently, if the user has only to touch and designate a location where audio data is desired to be emphasized while viewing the video data displayed on the screen of the display 63, it is possible to easily emphasize and output the audio data in the designated location or a designated region (sound emphasis region) including the designated location as sound. As mentioned above, in the sound processing system 5A or 5B of the present embodiment, the user can easily acquire audio information in a region required by the user while viewing video data captured by the camera 10 on the display 63.

For example, not only in a case where a certain accident occurs but also after the accident occurs, the sound processing system 5A or 5B of the present embodiment generates audio data in which directivity is formed in a direction directed toward a location where the accident has occurred from each microphone 22 of the microphone array 20, and thus allows the user to check conversations or sound at the time when the accident has occurred.

In addition, since the camera 10 and the microphone array 20 are installed on the ceiling 85 of the indoor hall or the like, the sound processing system 5A or 5B can monitor every part of the hall.

Second Embodiment

In the first embodiment, a description has been made of an example of the usage type of the sound processing system 5A in a case of a single camera. In a second embodiment, a description will be made of an example of a usage type of a sound processing system 5C in a case of a plurality of cameras (for example, two cameras).

In addition, the sound processing system 5C of the second embodiment has the same configuration as that of the sound processing system 5A or 5B of the first embodiment except for a plurality of cameras (for example, two cameras), and thus description thereof will be omitted by using the same reference numerals for the same constituent elements as those of the sound processing system 5A or 5B of the first embodiment.

FIG. 7 schematically illustrates an example of a usage type of the sound processing system 5C of the second embodiment. FIG. 7A is a diagram illustrating a state in which two cameras 10 and 10A, a single microphone array 20 located at intermediate position between the two cameras 10 and 10A, and a speaker 83 are installed, for example, on the ceiling 85 of the indoor hall.

In addition, four persons 91, 92, 93 and 94 stand on the floor 87 of the hall, the person 91 is having conversations with the person 92, and the person 93 is having conversations with the person 94. The speaker 82 is placed on the floor 87 between the two sets of people and outputs music. Further, the speaker 83 is provided on the ceiling 85 substantially directly above the person 93 and the person 94.

The camera 10 images the two persons 91 and 92 from the position which is a little far from the four persons 91, 92, 93 and 94, and the microphone array 20 is provided on the ceiling 85 substantially directly above the speaker 82 and collects sound of the entire hall. The camera 10A images the persons 93 and 94 from the position which is a little far from the four persons 91, 92, 93 and 94.

FIG. 7B is a diagram illustrating a state in which video data captured by the camera 10 is displayed on the display 63, and audio data is output from the speaker 65 as sound. The video data captured by the camera 10 is displayed on the screen of the display 63. In addition, the conversations of the two persons 91 and 92 or the music in the hall is output from the speaker 65 as sound.

For example, it is assumed that the user touches the vicinity of the center of the video data of the two persons 91 and 92 displayed on the screen of the display 63 with the finger 95. The signal processing unit 50 generates audio data in which directivity is formed in directivities (directions indicated by the reference sign e shown in FIG. 7A) from the positions of the respective microphones 22 of the microphone array 20 toward the sound position corresponding to the touch point 63a designated by the user or a center of a rectangular region 63b by using sound collected by the microphone array 20, that is, respective audio data items collected by the microphones 22.

In other words, the signal processing unit 50 generates the audio data in which sound (volume level thereof) is emphasized (amplified) in the directivity directed toward the sound position corresponding to the touch point 63a designated by the user or the center of the rectangular region 63b from the positions of the respective microphones 22 of the microphone array 20 by using the audio data items collected by the microphones 22. The reproducing unit 60 outputs the audio data generated by the signal processing unit 50 from the speaker 65 as sound in synchronization with the video data captured by the camera 10.

As a result, the audio data in the touch point 63a designated by the user or the rectangular region 63b is emphasized, and the conversations (for example, refer to "Hello" illustrated in FIG. 7A) of the two persons 91 and 92 are output from the speaker 65 as sound with a large volume. On the other hand, the music (refer to "note" illustrated in FIG. 7A) is output as sound so as not to be emphasized from the speaker 82 which is placed at a distance closer to the microphone array 20 than to the two persons 91 and 92 and which is not included in the rectangular region 63b designated by the user, and is output as sound with a volume smaller than the conversations of the two persons 91 and 92.

FIG. 7C is a diagram illustrating a state in which video data captured by the camera 10A is displayed on the display 63, and audio data is output from the speaker 65 as sound. The video data captured by the camera 10A is displayed on the screen of the display 63. In addition, the conversations of the two persons 93 and 94 or the music in the hall is output from the speaker 65 as sound.

For example, it is assumed that the user touches the vicinity of the center of the video data of the two persons 93 and 94 displayed on the screen of the display 63 with the finger 95. The signal processing unit 50 generates audio data in which directivity is formed in directivities (directions indicated by the reference sign f shown in FIG. 7A) from the positions of the respective microphones 22 of the microphone array 20 toward the sound position corresponding to a touch point 63c designated by the user or a center of a rectangular region 63d by using sound collected by the microphone array 20, that is, respective audio data items collected by the microphones 22.

In other words, the signal processing unit 50 generates the audio data in which sound (volume level thereof) is emphasized (amplified) in the directivity directed toward the sound position corresponding to the touch point 63c designated by the user or the center of the rectangular region 63d from the positions of the respective microphones 22 of the microphone array 20 by using the audio data items collected by the microphones 22. The reproducing unit 60 outputs the audio data generated by the signal processing unit 50 from the speaker 65 as sound in synchronization with the video data captured by the camera 10A.

As a result, the audio data in the touch point 63a designated by the user or the rectangular region 63d is emphasized, and the conversations (for example, refer to "Hi" illustrated in FIG. 7A) of the two persons 91 and 92 are output from the speaker 65 as sound with a large volume. On the other hand, the music (refer to "note" illustrated in FIG. 7A) is output as sound so as not to be emphasized from the speaker 82 which is placed at a distance closer to the microphone array 20 than to the two persons 93 and 94 and which is not included in the rectangular region 63d designated by the user, and is output as sound with a volume smaller than the conversations of the two persons 93 and 94.

As described above, in the present embodiment, the sound processing system 5C can emphasize and output audio data in videos for any reproduction period of time in relation to video data captured by either the camera 10 or the camera 10A designated by the user during reproduction of video data and audio data recorded in the recorder 45. Consequently, if the user has only to touch and designate a location where sound (volume level thereof) is desired to be emphasized (amplified) while viewing the video data captured by the camera 10 or 10A on the display 63, it is possible to easily emphasize and output the audio data in the designated location or a designated region (sound emphasis region) including the designated location as sound. As mentioned above, in the sound processing system 5C of the present embodiment, the user can easily acquire audio information in a region required by the user while viewing video data captured by the camera 10 or 10A on the display 63.

In addition, in the present embodiment, when compared with the first embodiment, since a plurality of cameras in the sound processing system 5C may be used, the number of microphone arrays may not be increased so as to match the number of cameras, and thus it is possible to build the sound processing system 5C capable of reducing cost and to save a space of the sound processing system 5C. Further, in the sound processing system 5C, if the second camera 10A has only to be additionally installed to the sound processing system 5A or 5B in which the first camera 10 has already been installed, it is possible to achieve the same operation and effect as those of the sound processing system 5A or 5B of the first embodiment and thus to improve expandability of the sound processing system.

Third Embodiment

In each of the first and second embodiments, a description has been made of an example of the usage type of the sound processing system 5A or 5B in which the camera and the microphone array are provided at different positions on the ceiling. In the third embodiment, a description will be made of an example of a usage type of a sound processing system 5D in which an omnidirectional camera and a microphone array are integrally provided on the same axis.

In addition, the sound processing system 5D of the third embodiment has the same configuration as that of the sound processing system 5A or the sound processing system 5B of the first embodiment except that an omnidirectional camera and a microphone array are integrally provided on the same axis, and thus description thereof will be omitted by using the same reference numerals for the same constituent elements as those of the sound processing system 5A or 5B of the first embodiment.

FIG. 9 schematically illustrates an example of the usage type of the sound processing system 5D. FIG. 9A is a diagram illustrating a state in which the doughnut-shaped microphone array 20C, the omnidirectional camera 10E incorporated integrally with the microphone array 20C, and the speaker 83 are installed, for example, on the ceiling 85 of the indoor hall. In FIG. 9A, a conversation situation of the persons 91, 92, 93 and 94 and each operation situation of the speakers 82 and 83 are assumed to be the same as the situations in the second embodiment.

Figure 9B:
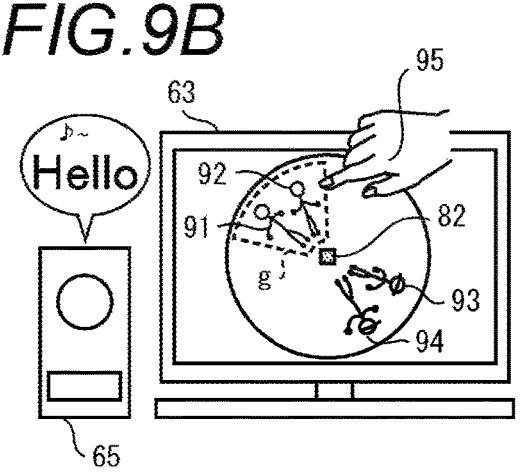
FIG. 9B is a diagram illustrating a state in which two persons 91 and 92 are selected in video data captured by the camera 10E.

FIG. 9B is a diagram illustrating a state in which two persons 91 and 92 are selected in video data captured by the omnidirectional camera 10E. In FIG. 9B, video data using a coordinate system of the omnidirectional camera 10E, that is, the video data captured by the omnidirectional camera 10E is displayed without change on the screen of the display 63. FIG. 9C is a diagram illustrating a state in which video data of the two persons 91 and 92 having undergone image conversion is displayed on the display, and audio data of conversations of the persons 91 and 92 is output from the speaker 65 as sound.

For example, it is assumed that the user touches a designated location around the upper left part of the video data of four persons 91, 92, 93 and 94 displayed on the screen of the display 63 with the finger 95. In addition to the same operation as in the second embodiment, the signal processing unit 50 performs a conversion process on a coordinate system of video data of a region indicated by the reference sign g, including the designated location which is designated by the user in the video data in a wide range captured by the omnidirectional camera 10E. The reproducing unit 60 displays the video data having undergone the coordinate system conversion process in the signal processing unit 50 on the display 63 (refer to FIG. 9C). In addition, the region g is assumed to be automatically generated based on a touch point of the finger 95. Further, a description of the same operation as that of the signal processing unit 50 in the second embodiment will be omitted.

As a result, the audio data in the region g designated by the user is emphasized, and the conversations (for example, refer to "Hello" illustrated in FIG. 9A) of the two persons 91 and 92 are output from the speaker 65 as sound with a large volume. On the other hand, the music (refer to "note" illustrated in FIG. 9A) is output as sound so as not to be emphasized from the speaker 82 which is placed at a distance closer to the microphone array 20C than to the two persons 91 and 92 and which is not included in the designated location which is designated by the user or the designated region g including the designated location, and is output as sound with a volume smaller than the conversations of the two persons 91 and 92.

Figure 9D:
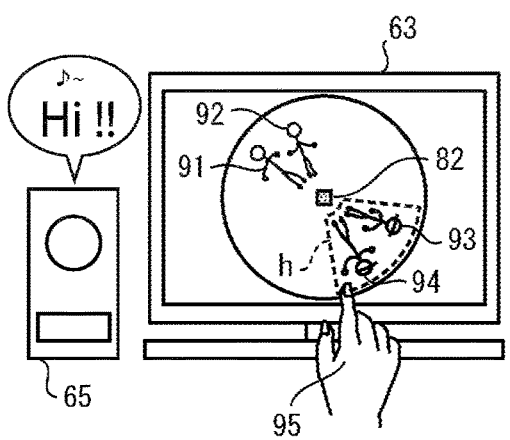
FIG. 9D is a diagram illustrating a state in which two persons 93 and 94 are selected in video data captured by the camera 10E.
Figure 9C:
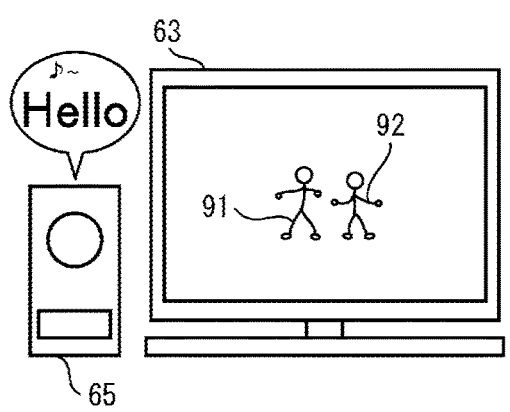
FIG. 9C is a diagram illustrating a state in which video data of the two persons 91 and 92 having undergone image conversion is displayed on the display, and audio data of conversations of the persons 91 and 92 is output from the speaker 65 as sound.
Figure 9E:
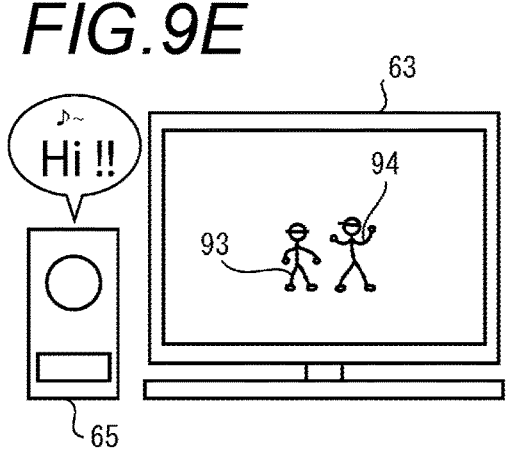
FIG. 9E is a diagram illustrating a state in which video data of the two persons 93 and 94 having undergone image conversion is displayed on the display, and audio data of conversations of the persons 93 and 94 is output from the speaker 65 as sound.

FIG. 9D is a diagram illustrating a state in which two persons 93 and 94 are selected in video data captured by the omnidirectional camera 10E. In FIG. 9D, video data using a coordinate system of the omnidirectional camera 10E, that is, the video data captured by the omnidirectional camera 10E is displayed without change on the screen of the display 63. FIG. 9E is a diagram illustrating a state in which video data of the two persons 93 and 94 having undergone image conversion is displayed on the display, and audio data of conversations of the persons 93 and 94 is output from the speaker 65 as sound.

For example, it is assumed that the user touches a designated location around the lower right part of the video data of four persons 91, 92, 93 and 94 displayed on the screen of the display 63 with the finger 95. In addition to the same operation as in the second embodiment, the signal processing unit 50 performs a conversion process on a coordinate system of video data of a region indicated by the reference sign h, including the designated location which is designated by the user in the video data in a wide range captured by the omnidirectional camera 10E. The reproducing unit 60 displays the video data having undergone the coordinate system conversion process in the signal processing unit 50 on the display 63 (refer to FIG. 9E). In addition, the region h is assumed to be automatically generated based on a touch point of the finger 95. Further, a description of the same operation as that of the signal processing unit 50 in the second embodiment will be omitted.

As a result, the audio data in the region h designated by the user is emphasized, and the conversations (for example, refer to "Hi" illustrated in FIG. 9A) of the two persons 93 and 94 are output from the speaker 65 as sound with a large volume. On the other hand, the music (refer to "note" illustrated in FIG. 9A) is output as sound so as not to be emphasized from the speaker 82 which is placed at a distance closer to the microphone array 20C than to the two persons 93 and 94 and which is not included in the designated location which is designated by the user or the designated region h including the designated location, and is output as sound with a volume smaller than the conversations of the two persons 93 and 94.

As mentioned above, according to the present embodiment, in the sound processing system 5D, the omnidirectional camera 10E and the microphone array 20C are disposed on the same axis, and thus the same coordinate system can be used as coordinate systems of the omnidirectional camera 10E and the microphone array 20C. Consequently, in addition to the effect of each of the first and second embodiment, the sound processing system 5D can facilitate a coordinate system conversion process for correlating a position of a subject in video data captured by the omnidirectional camera 10E with a direction of sound of a person as the subject, collected by the microphone array 20C when compared with the first and second embodiments, and thus it is possible to reduce a load of the reproduction process for synchronizing video data with audio data in the reproducing unit 60.

In addition, video data included in the designated location which is designated by the user or the designated region g or the designated region h including the designated location is converted into video data so as to match a screen size of the display 63, and thus the sound processing system 5D can display video data captured by the omnidirectional camera 10E in a display form of the video data whose aspect ratio appears natural on the display 63.

Figure 10A:
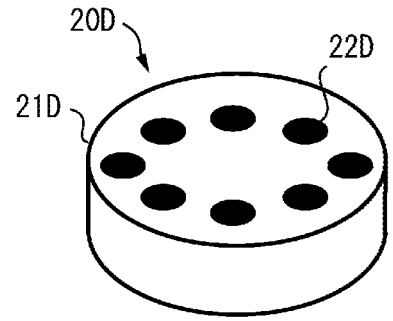
FIGS. 10A, 10B and 10C are exterior views of other microphone arrays 20D, 20E and 20F.
Figure 10B:
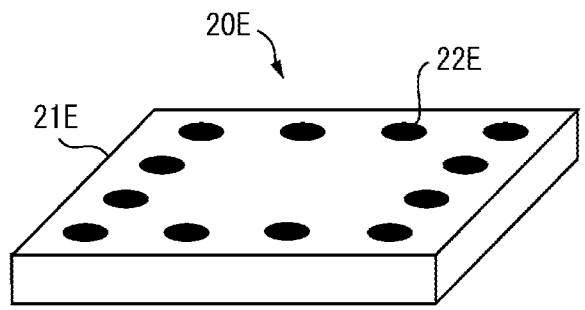
Figure 10C:
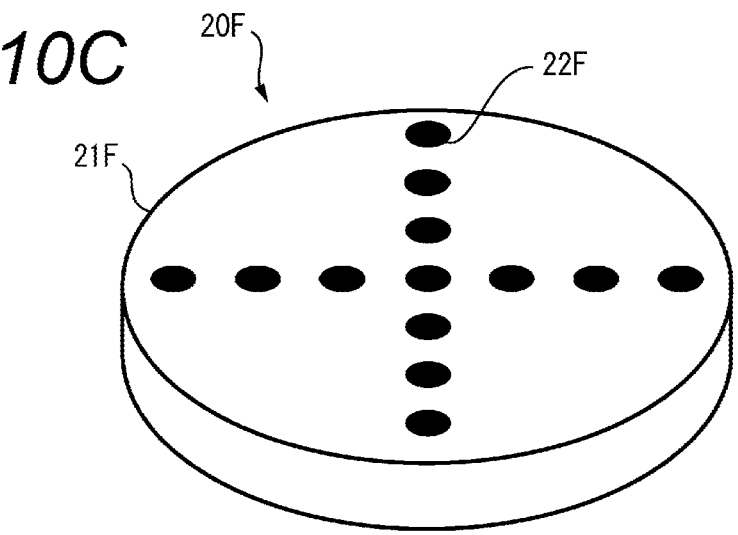

Further, for example, a shape and a configuration of the microphone array are not limited to those of each of the above-described embodiments, and may employ various shapes and configurations. FIGS. 10A to 10C are exterior views of other microphone arrays 20D, 20E and 20F.

In the microphone array 20D illustrated in FIG. 10A, a diameter of a disc-shaped casing 21D is smaller than in the microphone array 20 illustrated in FIG. 2. A plurality of microphones 22D are uniformly disposed in a circular shape on a surface of the casing 21D. Since the intervals between the respective microphones 22D are short, the omnidirectional microphone array 20D has a characteristic suitable for a high sound range.

In addition, in the microphone array 20E illustrated in FIG. 10B, a plurality of microphones 22E are uniformly disposed in a rectangular shape on a surface of a rectangular casing 21E. Since the casing 21E is formed in the rectangular shape, the microphone array 20E can be easily installed even at a location such as a corner.

Further, in the microphone array 20F illustrated in FIG. 10C, a plurality of microphones 22F are uniformly arranged horizontally and vertically on a surface of a disc-shaped casing 21F. Since the plurality of microphones 22F are disposed in a linear shape, a sound emphasis process can be simplified in the signal processing unit 50. Further, the plurality of microphone units 22F may be disposed either in the vertical direction or in the horizontal direction.

Still further, in the above-described respective embodiments, the user designates a designated location where sound is desired to be emphasized or a designated region including the designated location by arbitrarily touching the designated location with the finger 95 while viewing video data displayed on the display 63, but, for example, the screen of the display 63 may be divided into a plurality of sections (for example, four sections including upper, lower, right and left sections), and any one of the sections may be selected as a region where sound is desired to be emphasized.

Furthermore, in the above-described respective embodiments, a case has been described in which the camera records videos and the display displays recorded video data, but the present invention is also applicable to a case where the camera captures still images at a predetermined cycle, and the display displays the still images captured at the predetermined cycle, that is, videos are captured and sound is collected in real time. In other words, the user may designate a predetermined region of the still image displayed on the screen of the display so as to emphasize sound of the vicinity thereof.

Moreover, in the above-described respective embodiments, if the user touches the screen with the finger 95, a designated region (for example, an elliptical or rectangular region) including the touch point which is touched with the finger 95 is designated, but a predetermined region may be designated by the user drawing a circle or a polygon with the finger 95.

Figure 11:
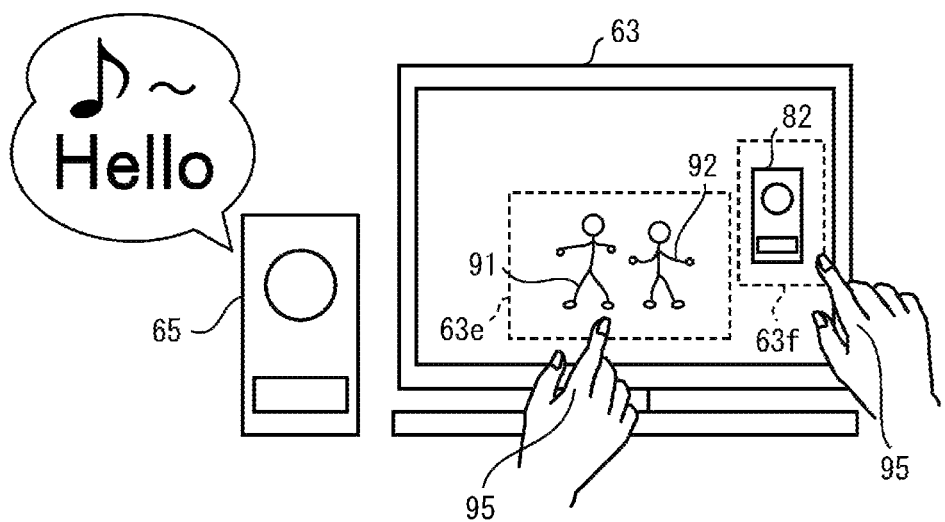
FIG. 11 is a schematic diagram illustrating operations of the display 63 and the speaker 65 in a case where a plurality of designated locations are designated.

In addition, in the above-described respective embodiments, the signal processing unit 50 may receives designation of a plurality of designated locations or a designated region (sound emphasis region) including each designated location via the operation unit 55. In this case, the signal processing unit 50 performs an audio data emphasis process in accordance with each designated location or each designated region. FIG. 11 is a schematic diagram illustrating operations of the display 63 and the speaker 65 in a case where a plurality of designated locations or designated regions (sound emphasis regions) are designated. For simplification of description, operation situations of a camera and a microphone array used in the sound processing system are the same as operation situations of the camera 10 and the microphone array 20 illustrated in FIG. 6.

In this case, in response to designation of two predetermined different designated locations or sound emphasis regions 63e and 63f including the different designated locations from the speaker 65, the signal processing unit 50 generates audio data in which directivity is formed in directivities directed toward a sound position corresponding to a center of two persons 91 and 92 from the positions of the respective microphones 22 of the microphone array 20, and also generates audio data in which directivity is formed in directions directed toward a sound position corresponding to a center of the speaker 82 from the positions of the respective microphones 22 of the microphone array 20.

As a result, both of the conversations (refer to "Hello" illustrated in FIG. 11) of the two persons 91 and 92 and the music (refer to "note" illustrated in FIG. 11) output from the speaker 82 are output as sound with a large volume. Consequently, the sound processing system can emphasize sound of two or more locations in a single display.

Next, a description will be made of examples of a casing structure of the microphone array 20 and a circuit configuration of the microphone array 20 in the above-described respective embodiments with reference to FIGS. 12 to 30.

(Casing of Microphone Array: Quadruple Casing Structure)

Figure 12:
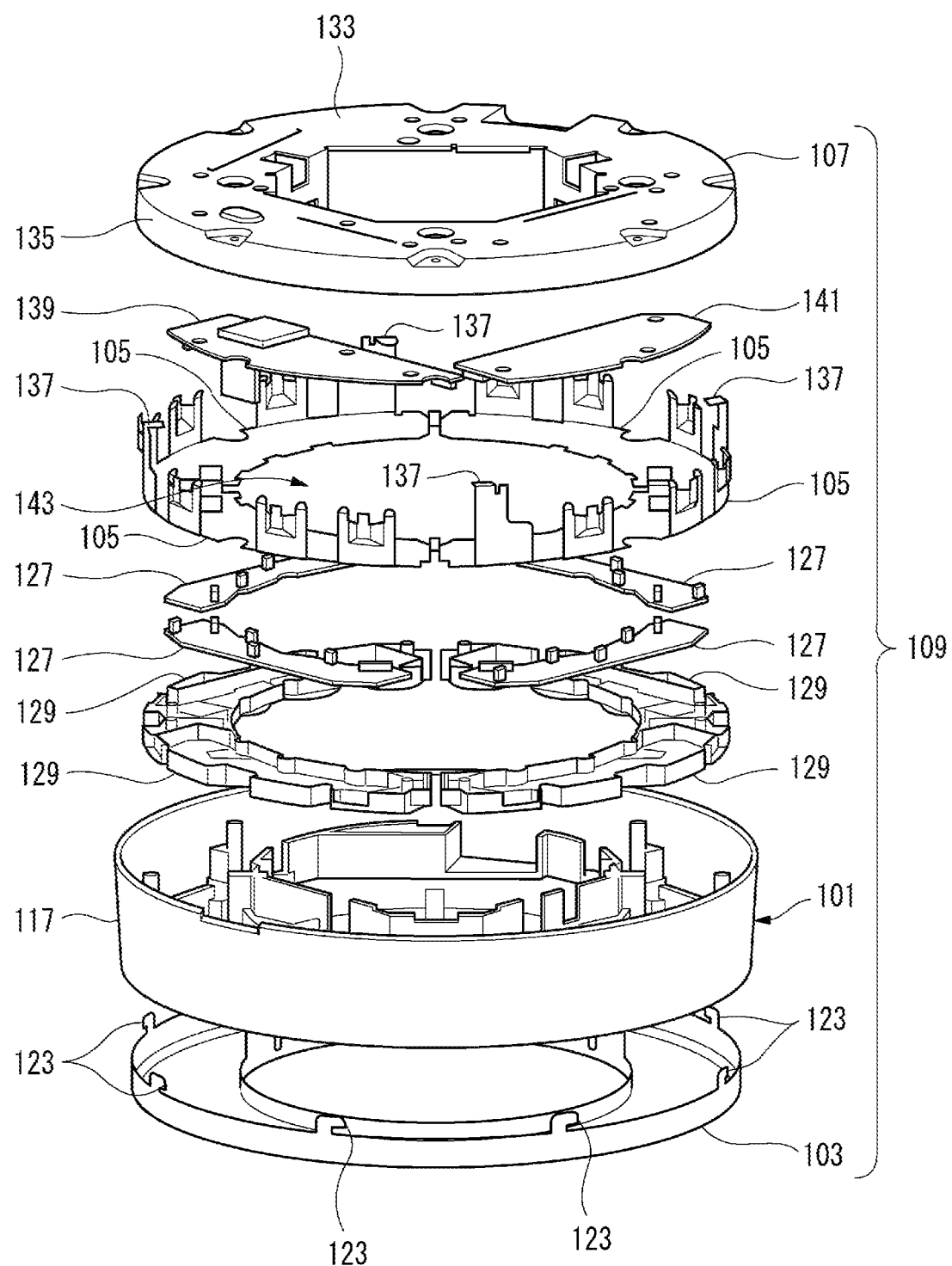
FIG. 12 is an exploded perspective view illustrating a casing structure of the microphone array of the respective embodiments.
Figure 13A:
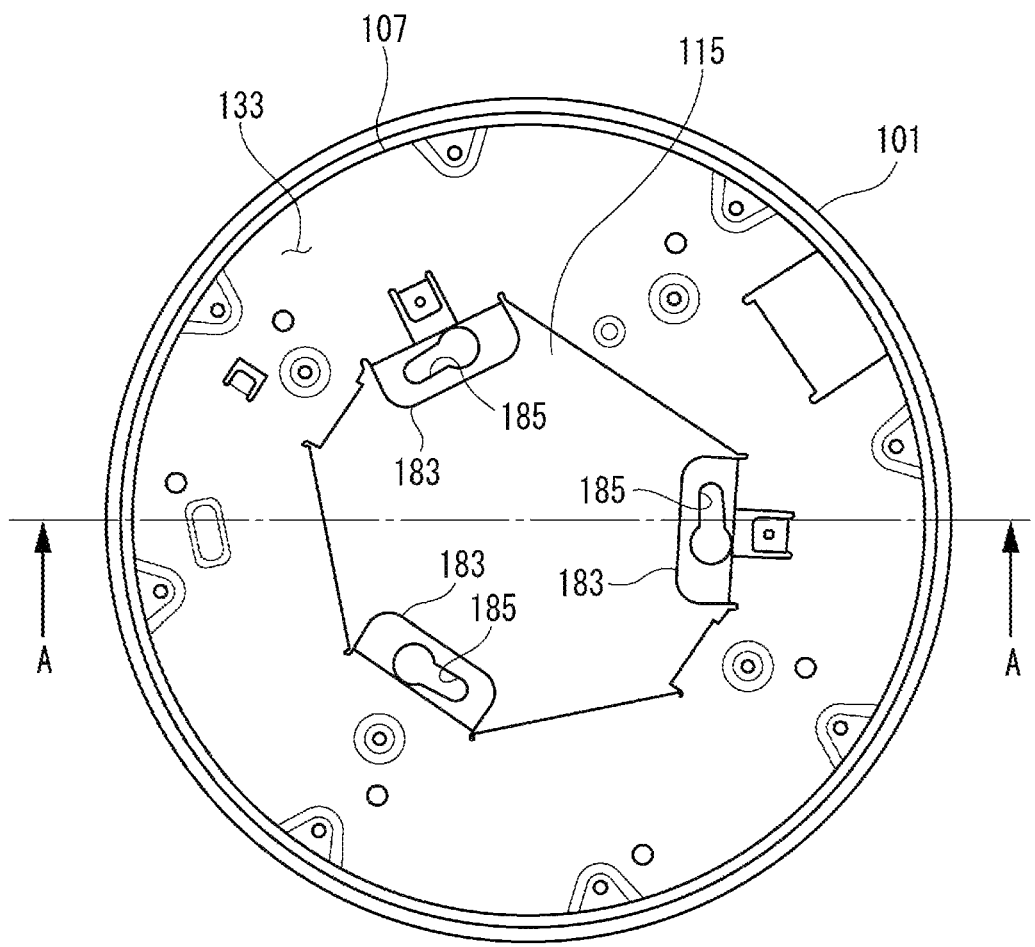
FIG. 13A is a plan view illustrating a casing structure of the microphone array illustrated in FIG. 12.
Figure 13B:
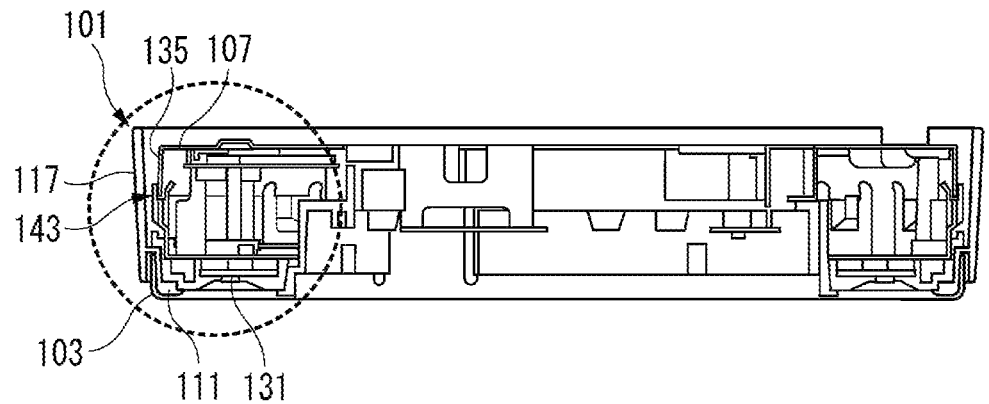
FIG. 13B is a sectional view taken along the line A-A in FIG. 13A.
Figure 14:
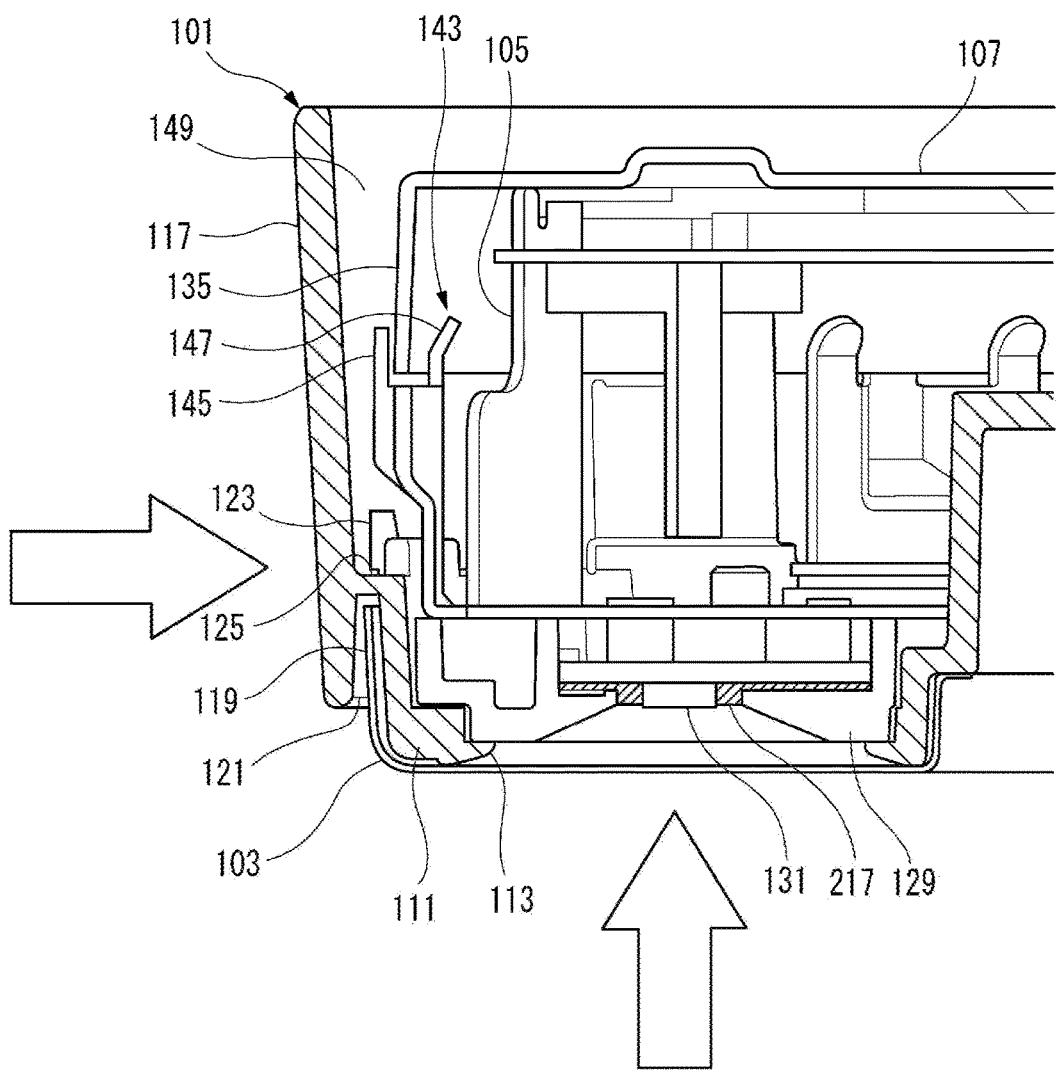
FIG. 14 is an enlarged view of main portions in a dotted region illustrated in FIG. 13B.

FIG. 12 is an exploded perspective view illustrating a casing structure of the microphone array 20 of the above-described respective embodiments. FIG. 13A is a plan view illustrating a casing structure of the microphone array 20 illustrated in FIG. 12. FIG. 13B is a sectional view taken along the line A-A in FIG. 13A. FIG. 14 is an enlarged view of main portions in a dotted region illustrated in FIG. 13B.

The casing structure of the microphone array 20 illustrated in FIG. 12 has a configuration in which a main casing 101, a punched metal cover 103, a microphone sheet metal 105, and a base sheet metal 107 are stacked in the vertical direction. The main casing 101, the punched metal cover 103, the microphone sheet metal 105, and the base sheet metal 107 constitute a four-layer impact resistant casing 109 (vandal-resistant casing).

The main casing 101 is made of, for example, a resin material, and is integrally molded. The main casing 101 is formed in a bottomed cylindrical shape, and a plurality of microphone installation holes 113 are provided on an annular bottom 111 in a concentric shape. A central portion of the annular bottom 111 is used as a camera installation space 115. In the main casing 101, a main casing outer circumferential wall 117 has the maximum outer diameter in the casing structure of the microphone array 20 illustrated in FIG. 12.

The punched metal cover 103 is made of, for example, a metal material, and is integrally molded in an annular shape. The punched metal cover 103 is attached to the main casing 101 so as to cover the annular bottom 111 of the main casing 101. The punched metal cover 103 is provided with a plurality of through holes (not illustrated) for making sound waves incident thereto. A rising edge portion 119 which rises toward the main casing 101 is formed on an outer circumference of the punched metal cover 103 through drawing or the like. The rising edge portion 119 is inserted into a circumferential groove 121 (refer to FIG. 14) which is a lower outer circumference of the main casing 101. A plurality of elastic engaging claws 123 protrude upward (the upper side of FIG. 12 or FIG. 14) at the same intervals in a circumferential direction from the rising edge portion 119.

FIG. 15A is a perspective view illustrating a state in which the punched metal cover 103 is fixed to the main casing 101. FIG. 15B is a sectional view illustrating a state in which the punched metal cover 103 is fixed to the main casing 101. The elastic engaging claw 123 rotates through an engaging hole 125a which is provided inside the circumferential groove 121, so as to be engaged with a claw engaging portion 125. The punched metal cover 103 is fixed to the main casing 101 when the elastic engaging claw 123 is engaged with the claw engaging portion 125.

The microphone sheet metal 105 is formed by press-processing, for example, a metal plate. The microphone sheet metal 105 is formed in a shape in which an annular shape is equally divided into four portions in the circumferential direction. The microphone sheet metal 105 is fixed to the main casing 101 by using a microphone sheet metal fixing screw (not illustrated). The microphone sheet metal 105 fixed to the main casing 101 is held in a state in which a microphone casing 129 holding a microphone board 127 is interposed between the microphone sheet metal and the annular bottom 111 of the main casing 101.

The microphone casing 129 is made of, for example, a resin material, and is integrally molded. The microphone casing 129 is formed in a shape in which an annular shape is equally divided into four portions in the circumferential direction. Four high-quality small electrets condenser microphone (ECM) are attached to the same surface of the microphone board 127. The microphone board 127 is attached to the microphone casing 129 in a state in which the ECM 131 faces downward in FIG. 14. A rubber component is interposed between the microphone board 127 and the microphone casing 129 (refer to FIG. 14). A single microphone board 127 is attached to the microphone casing 129. Therefore, in the entire casing structure of the microphone array 20, a total of four microphone boards 127 are attached, and in the entire casing structure of the microphone array 20, a total of sixteen ECMs 131 are provided.

Therefore, in the casing structure of the microphone array 20 illustrated in FIG. 12, the punched metal cover 103, the main casing 101, the microphone casing 129, the microphone sheet metal 105, and the base sheet metal 107 are disposed in this order in the upward direction illustrated in FIG. 12 from the outside of the bottom. The plurality of members constitutes a structural body which resists an external force (impact force) which is applied to the microphone array 20 from the downward direction illustrated in FIG. 12. For example, since the main casing 101 is provided not integrally with but separately from the microphone casing 129, an external force (impact force) from the downward direction illustrated in FIG. 12 can be distributed, and thus the base sheet metal 107 can prevent the main casing 101 and the microphone casing 129 from being deformed. Consequently, even after the external force is applied thereto, the shape of the microphone array 20 can be maintained while sound is being collected, and thus it is possible to prevent deterioration in a sound characteristic while the microphone array 20 is collecting sound.

The base sheet metal 107 is integrally molded by press-processing (drawing), for example, a metal material. The base sheet metal 107 is provided with an annular top plate 133 and is formed in a bottomed cylindrical shape. In other words, a base sheet metal outer circumferential wall 135 is bent downward from the outer circumference of the annular bottom 111. The base sheet metal outer circumferential wall 135 is formed by performing drawing of a base plate with a large diameter of the annular top plate 133. The base sheet metal 107 provided with the base sheet metal outer circumferential wall 135 having undergone the drawing has the strength higher than that of other constituent members.

The base sheet metal 107 is fixed to main casing 101 by using a base sheet metal fixing screw (not illustrated). For example, a main board 139 on which components for controlling a process in the microphone array 20 are mounted, and, for example, a power supply board 141 on which components for supplying power to the respective units of the microphone array 20 are mounted are disposed on the base sheet metal 107 between the base sheet metal and the microphone sheet metal 105. Each of the main board 139 and the power supply board 141 is provided singly in the entire casing structure of the microphone array 20 illustrated in FIG. 12.

A plurality of fitting portions 143 rise from the microphone sheet metal 105 at the same intervals in the circumferential direction. Each of the fitting portions 143 is constituted of a pair of pinch pieces (an outer pinch piece 145 and an inner pinch piece 147) which are separated from each other in the radial direction. The fitting portions 143 are disposed with a gap 149 inside the main casing outer circumferential wall 117. The base sheet metal outer circumferential wall 135 is fitted to the fitting portions 143. In other words, in the casing structure of the microphone array 20 illustrated in FIG. 12, the main casing outer circumferential wall 117, the gap 149, the outer pinch piece 145, the base sheet metal outer circumferential wall 135, and the inner pinch piece 147 are disposed in this order inwards from the outside of the side portion. Such a plurality of overlapping members constitute a structural body which resists an external force (impact force) from the side portion of the microphone array 20.

In addition, a stop portion 137 is provided which rises and protrudes from the microphone sheet metal 105 and is located at a position separated from the base sheet metal 107 in normal times. However, if the main casing 101 is deformed due to application of an external force, the stop portion 137 comes into contact with the base sheet metal 107 and acts so that great strain does not occur in the main casing 101.

(Direct Attachment Structure of ECM)

Figure 16:
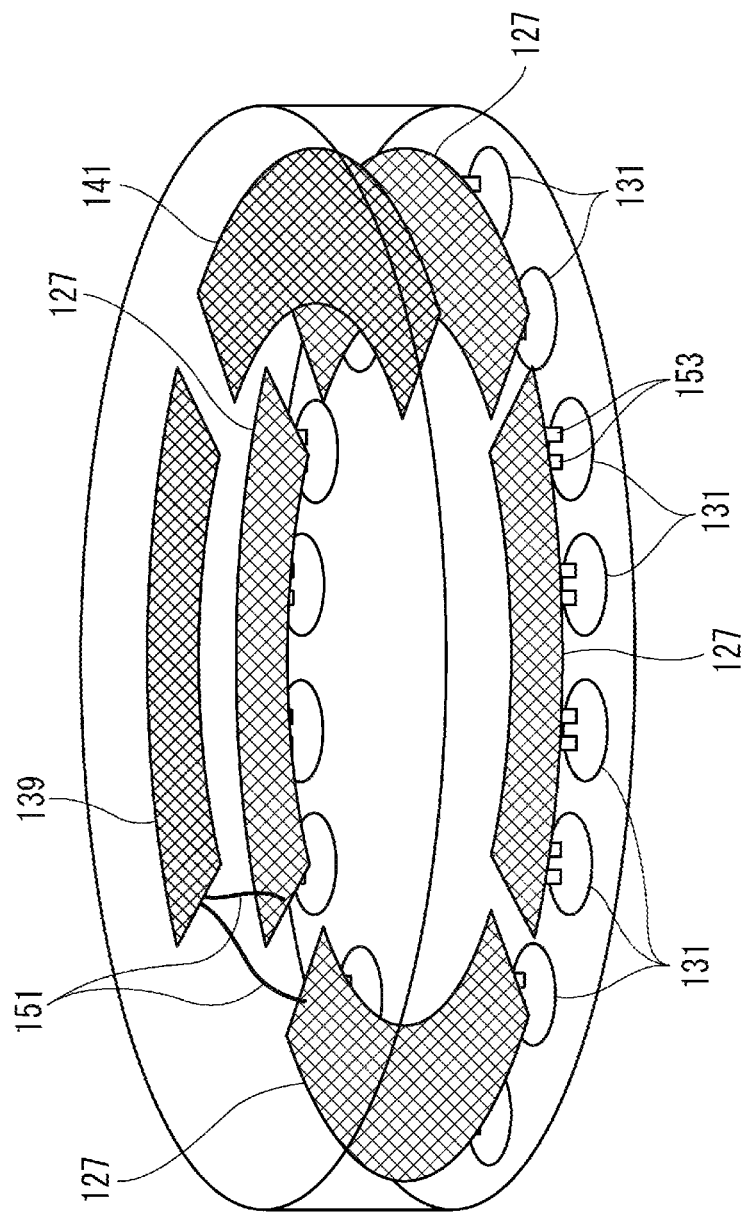
FIG. 16 is a schematic diagram illustrating an attachment structure of the microphone.

FIG. 16 is a schematic diagram illustrating an attachment structure of the ECM. In the casing structure of the microphone array 20 illustrated in FIG. 12, the microphone board 127 is disposed under the microphone sheet metal 105, and the main board 139 and the power supply board 141 are disposed over the microphone sheet metal 105. In other words, the microphone board 127, and the main board 139 and the power supply board 141 are disposed in a two-story structure. Here, four microphone boards 127 are assumed to be disposed in an order of a first microphone board 127, a second microphone board 127, a third microphone board 127, and a fourth microphone board 127 in one circumferential direction. In this case, the main board 139 is connected to the first microphone board 127 and the fourth microphone board 127 via a power supply wiring 151. The first microphone board 127 is connected to the second microphone board 127. The fourth microphone board 127 is connected to the third microphone board 127.

The ECMs 131 are attached to lower surface sides of the microphone boards 127. A pair of pin terminals 153 protrudes from the ECM 131. In the ECM 131, each of the pin terminals 153 is inserted into a terminal pin insertion hole (not illustrated) provided in a predetermined circuit of the microphone board 127, and is directly connected and fixed thereto through, for example, soldering. Consequently, thinning (reduction in height) of the ECM 131 relative to the microphone board 127 is realized. In addition, material cost is reduced as a result of the ECM 131 being directly attached to the microphone board 127.

(Arrangement of AD Converter)

Figure 17:
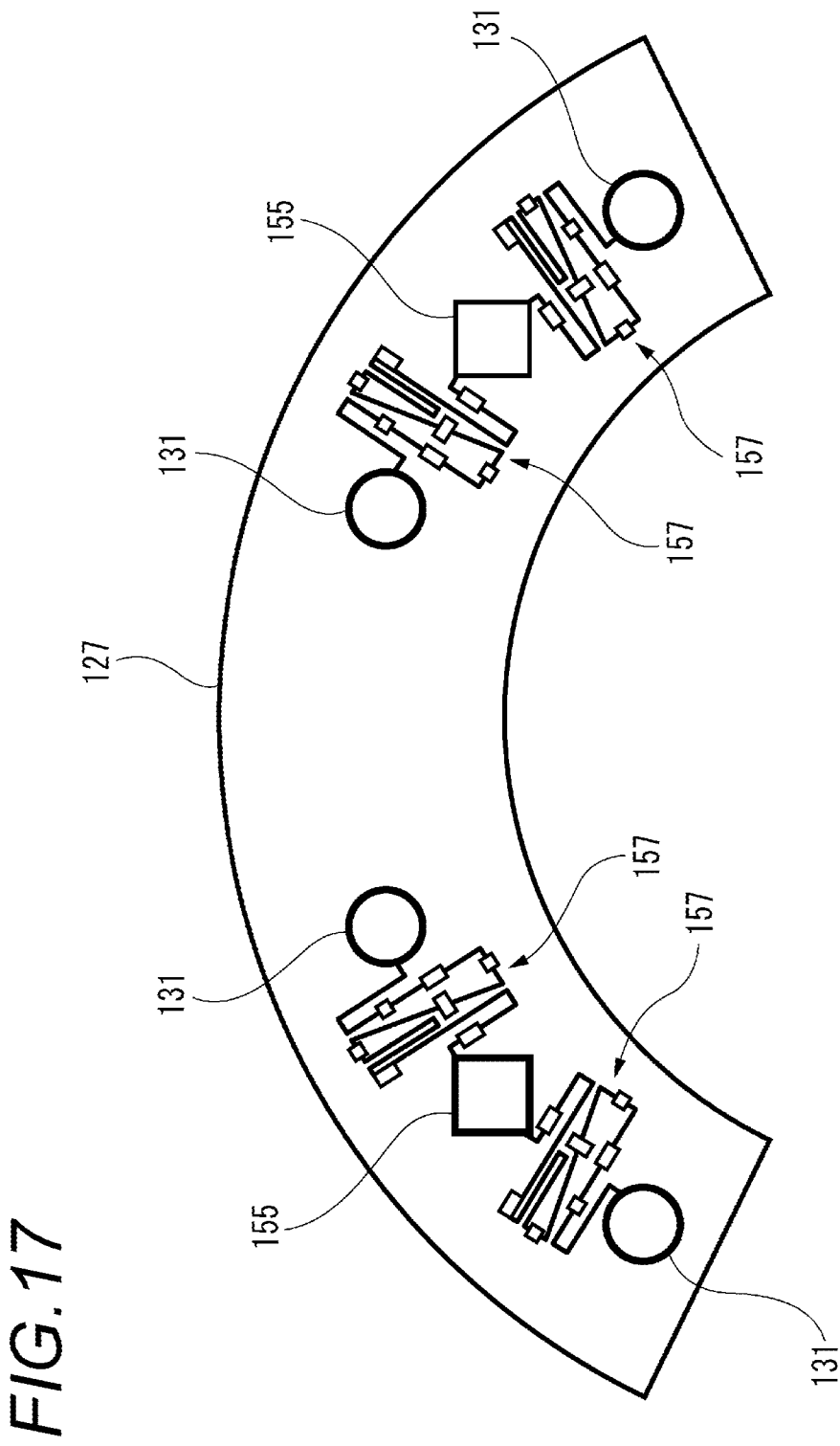
FIG. 17 is a plan view of a microphone board.

FIG. 17 is a plan view of the microphone board 127. Four ECMs 131 are attached to a single microphone board 127 illustrated in FIG. 17. In a circuit (microphone board circuit) of the microphone board 127, a difference between lengths of line paths connected to the respective ECMs 131 causes a phase difference in a sound wave signal, and thus this phase difference causes a deviation of a directive angle. For this reason, the lengths of the line paths connected to the respective ECMs 131 are required to be the same as each other.

Therefore, in the microphone board 127, a microphone board circuit is constituted of a combination of two ECMs 131 with a single AD converter 155. In the microphone board circuit, the single AD converter 155 is disposed at an equal distance from each ECM 131, and thus analog line paths 157 between the AD converter 155 and the ECMs 131 are arranged so as to have the shortest and equal line path length via amplifying circuits. Thus, in the microphone board circuit, it is possible to make a level of a noise signal in the microphone board 127 uniform and to reduce a deviation of a directive angle, in each ECM.

(Microphone Board Circuit)

Figure 18A:
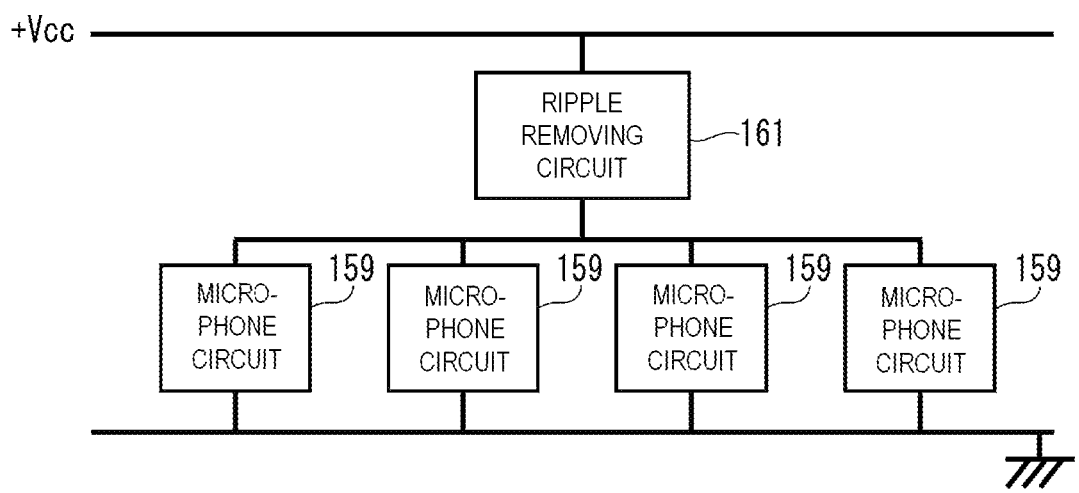
FIG. 18A is a diagram illustrating a microphone board circuit in which a single ripple removing circuit is provided for a plurality of microphone circuits.
Figure 18B:
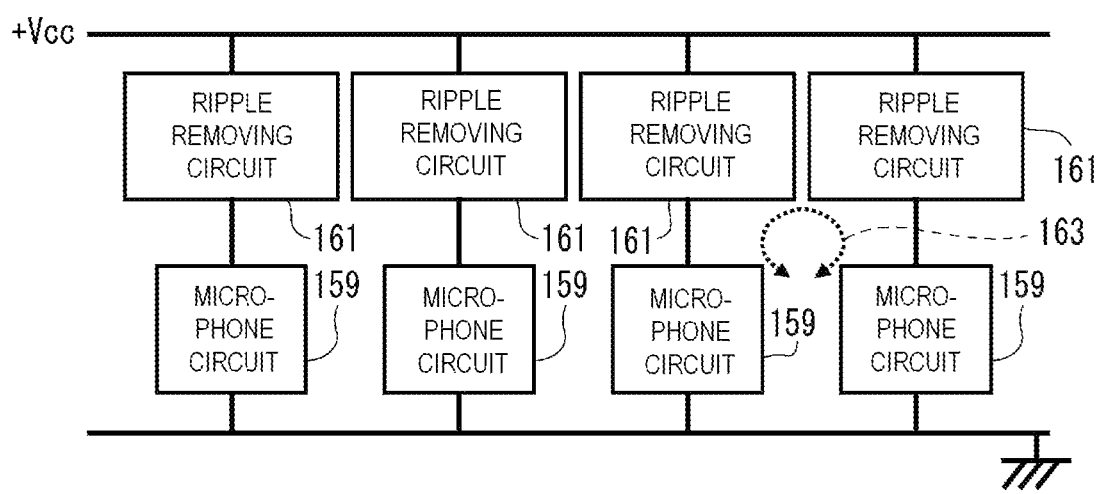
FIG. 18B is a diagram illustrating a microphone board circuit in which ripple removing circuits are respectively provided for a plurality of microphone circuits.

FIG. 18A is a diagram illustrating a microphone board circuit in which a single ripple removing circuit 161 is provided for a plurality of microphone circuits 159. FIG. 18B is a diagram illustrating a microphone board circuit in which ripple removing circuits 161 are respectively provided for a plurality of microphone circuits 159.

In the microphone board circuit of the microphone board 127, the ripple removing circuit 161 is provided between the microphone circuit 159 provided with the ECM and the power supply board 141. The ripple removing circuit 161 is a filter which allows a DC signal to pass therethrough but cuts off an AC signal with a specific frequency. As illustrated in FIG. 18A, a single ripple removing circuit 161 may be provided between four microphone circuits 159 which are connected in parallel to each other, and the power supply board 141. In this case, it is possible to reduce manufacturing cost of the microphone array 20.

On the other hand, as illustrated in FIG. 18B, the ripple removing circuit 161 may be provided between each of four microphone circuits 159 and the power supply board 141. In this case, signal introduction between different ECMs can be reduced, and thus so-called crosstalk 163 can be minimized.

(Countermeasure for Structural Gap Between Microphone Array and Camera)

Figure 19A:
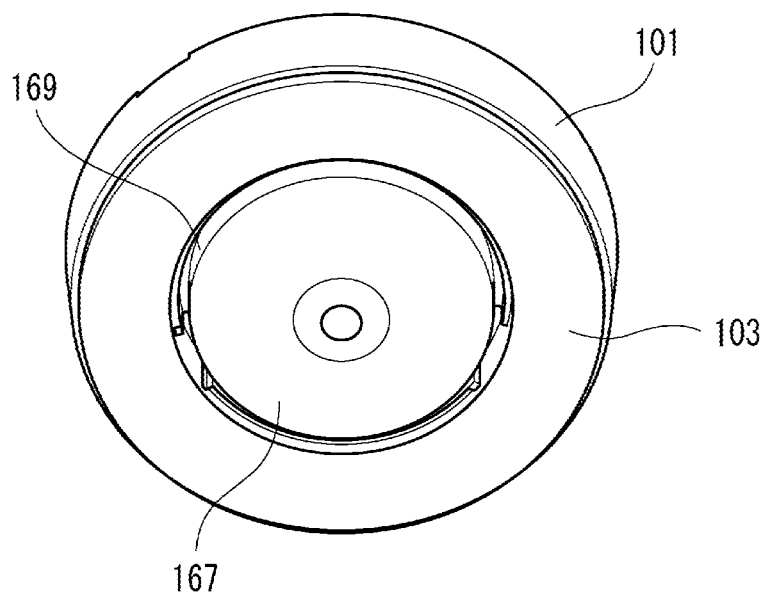
FIG. 19A is a perspective view illustrating a casing structure of the microphone array to which an omnidirectional camera is attached without a camera adaptor being installed.
Figure 19B:
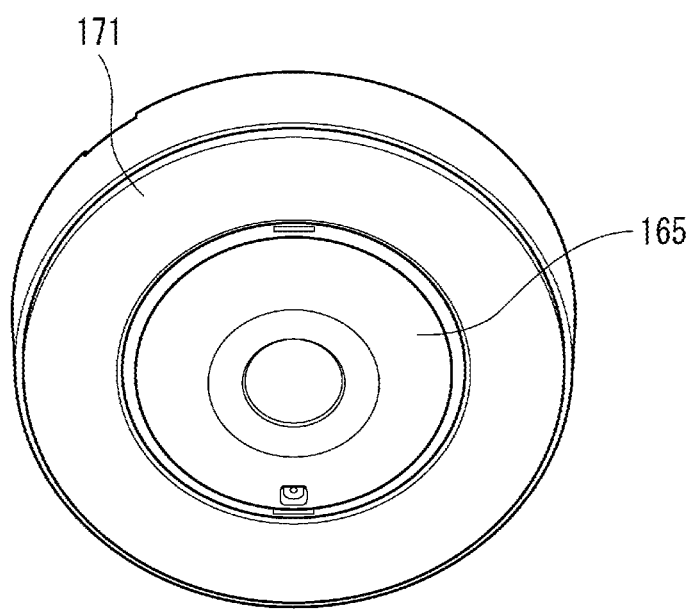
FIG. 19B is a perspective view illustrating a casing structure of the microphone array to which an outdoor omnidirectional camera is attached along with a camera adaptor.
Figure 20:
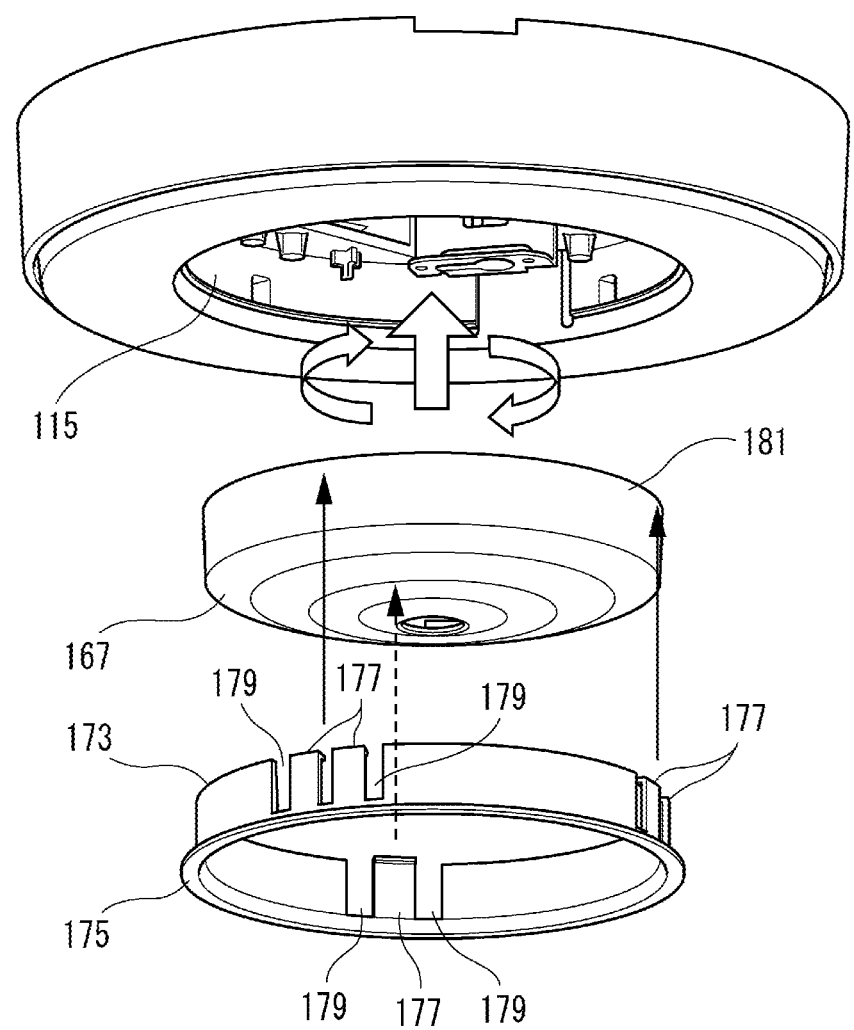
FIG. 20 is an exploded perspective view illustrating a casing structure of the microphone array to which an indoor omnidirectional camera is attached.
Figure 21:
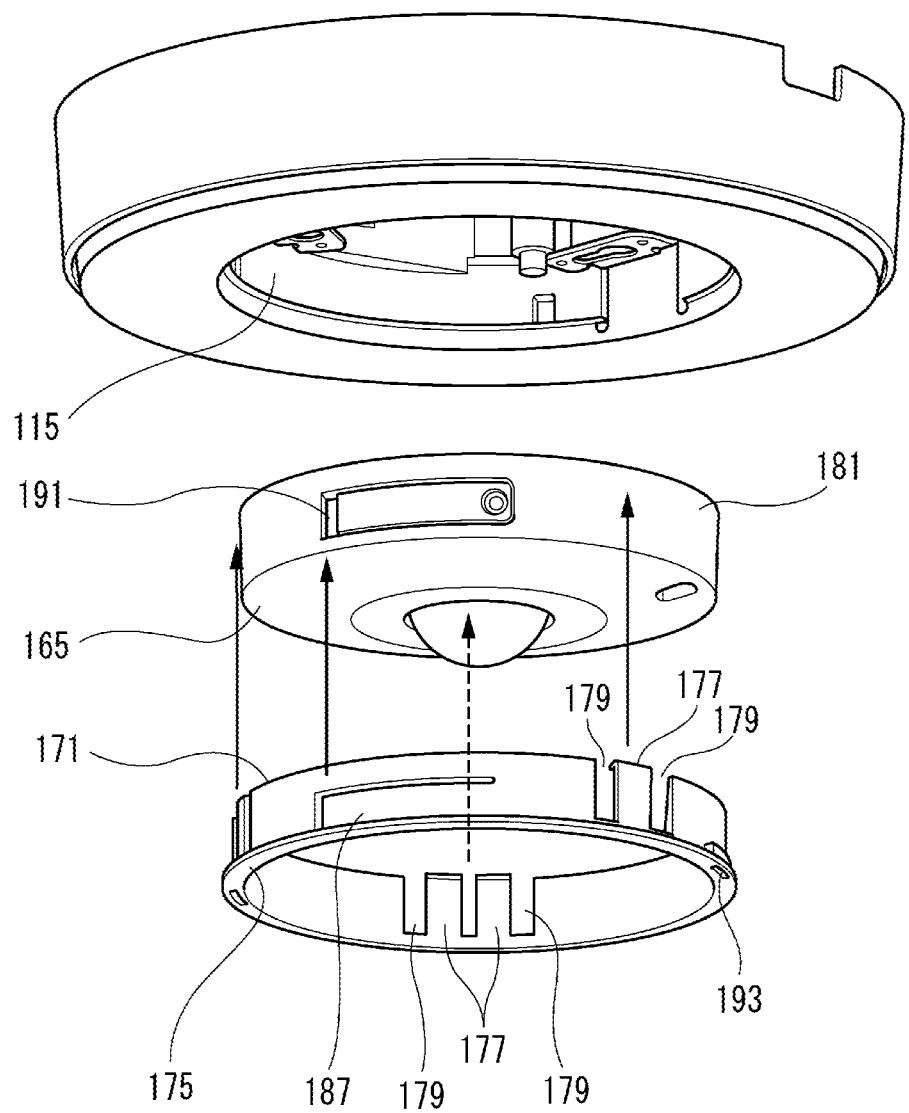
FIG. 21 is an exploded perspective view illustrating a casing structure of the microphone array to which the outdoor omnidirectional camera is attached.
Figure 22A:
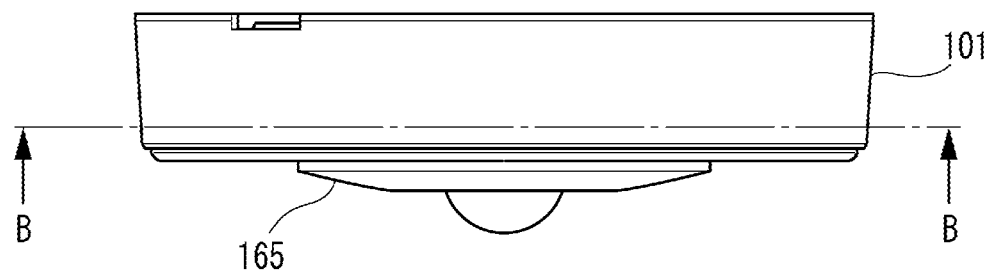
FIG. 22A is a side view illustrating a casing structure of the microphone array to which the outdoor omnidirectional camera is attached.
Figure 22B:
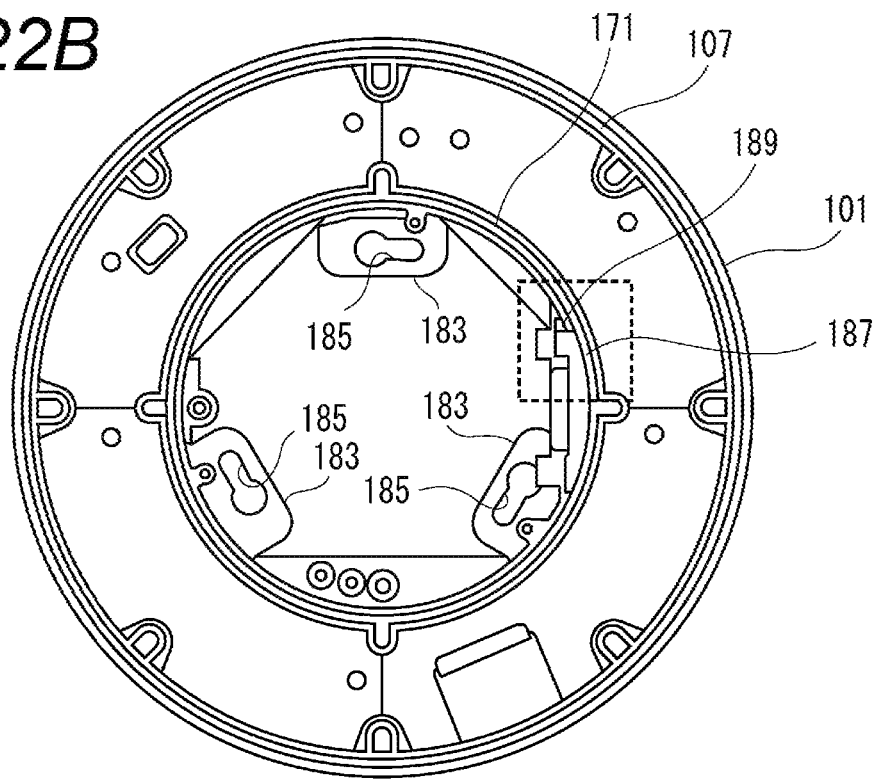
FIG. 22B is a sectional view taken along the line B-B in FIG. 22A.
Figure 23:
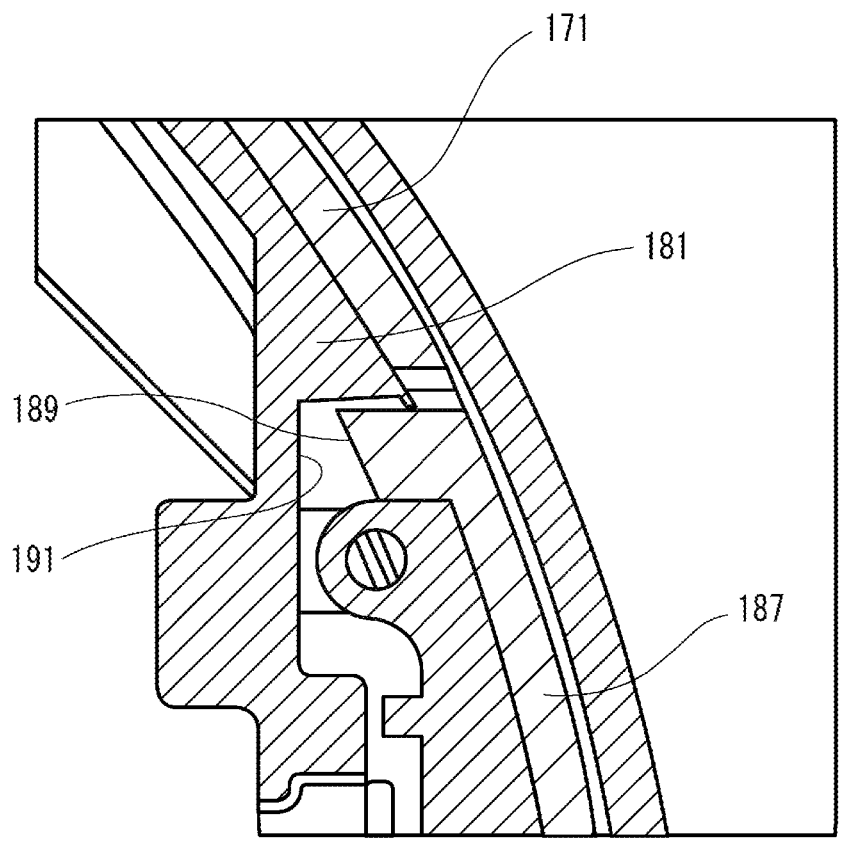
FIG. 23 is an enlarged view of main portions in a dotted region illustrated in FIG. 22.

FIG. 19A is a perspective view illustrating a casing structure of the microphone array 20 to which an omnidirectional camera is attached without a camera adaptor being installed. FIG. 19B is a perspective view illustrating a casing structure of the microphone array 20 to which an outdoor omnidirectional camera 165 is attached along with a camera adaptor. FIG. 20 is an exploded perspective view illustrating a casing structure of the microphone array 20 to which an indoor omnidirectional camera 167 is attached. FIG. 21 is an exploded perspective view illustrating a casing structure of the microphone array 20 to which the outdoor omnidirectional camera 165 is attached. FIG. 22A is a side view illustrating a casing structure of the microphone array 20 to which the outdoor omnidirectional camera 165 is attached. FIG. 22B is a sectional view taken along the line B-B in FIG. 22A. FIG. 23 is an enlarged view of main portions illustrated in FIG. 22.

In the casing structure of the microphone array 20, for example, an omnidirectional camera can be incorporated into the camera installation space 115 in the central portion. The omnidirectional camera includes the outdoor omnidirectional camera 165 and the indoor omnidirectional camera 167. As illustrated in FIG. 19A, as the casing structure of the microphone array 20, if the indoor omnidirectional camera 167 is installed in the camera installation space 115, a gap 169 is generated between the main casing 101 of the microphone array 20 and the indoor omnidirectional camera 167, and thus the inside of the microphone array 20 is viewed. In the state in which the inside is viewed, an appearance of a product deteriorates or dust enters the inside, and sound permeates into the internal space of the microphone array 20 so as to cause resonance, reflection, or the like and thus to cause deterioration in acoustic performance.

In addition, the omnidirectional camera has various sizes depending on usage or function thereof. The main casings 101 having different sizes are prepared as respective omnidirectional cameras, and this inevitably increases cost. If the main casing 101 is fixed to one size, and a gap difference caused by a model of the omnidirectional camera is removed by using a camera adaptor, it is possible to reduce manufacturing cost.

Therefore, as illustrated in FIG. 19B, for example, in a case where the outdoor omnidirectional camera 165 is installed in the camera installation space 115, an outdoor camera adaptor 171 is attached around the outdoor omnidirectional camera 165. In addition, as illustrated in FIG. 20, in a case where the indoor omnidirectional camera 167 is installed in the camera installation space 115, an indoor camera adaptor 173 is attached around the indoor omnidirectional camera 167. The indoor camera adaptor 173 is made of, for example, a resin material, and is formed in a tubular shape. A flange 175 for hiding a gap is formed at a lower end of the indoor camera adaptor 173, and the flange 175 hides the gap 169 between the indoor omnidirectional camera 167 and the main casing 101, generated when the indoor omnidirectional camera 167 is installed in the camera installation space 115.

A plurality of circumferential wall elastic claws 177 are formed inside a plurality of incisions 179 at the same intervals in the circumferential direction in the indoor camera adaptor 173. The indoor camera adaptor 173 is installed by engaging the circumferential wall elastic claws 177 with a camera casing 181 of the indoor omnidirectional camera 167. A plurality of camera fixing sheet metals 183 illustrated in FIG. 22 are formed at the same intervals in the circumferential direction in the base sheet metal 107. The camera fixing sheet metals 183 have tumbler holes 185, and are disposed on an upper side of the camera installation space 115. Engaging pins (not illustrated) having large-diameter head portions which are engaged with the tumbler holes 185 of the camera fixing sheet metal 183 protrudes from an upper surface of the camera casing 181. The indoor omnidirectional camera 167 attached with the indoor camera adaptor 173 is inserted into the camera installation space 115 and is rotated so that the engaging pins are engaged with the tumbler holes 185 and thus dropping is prevented, and, as a result, the indoor omnidirectional camera is supported in the camera installation space. The indoor omnidirectional camera 167 is locked to the main casing 101 or the like of the microphone array 20 at this rotation position via a camera rotation restricting screw (not illustrated). In addition, in a in synchronization with the indoor omnidirectional camera 167 is locked, the circumferential wall elastic claws 177 are prevented from being unengaged with the camera fixing sheet metals 183 due to the inner circumferential wall of the main casing 101.

On the other hand, a bayonet plate 187 whose front end is a free end is provided on the outer circumference of the outdoor camera adaptor 171 illustrated in FIG. 21. An adaptor rotation restricting claw 189 (refer to FIG. 23) which protrudes inwards in the radial direction is formed at the free end of the bayonet plate 187. The adaptor rotation restricting claw 189 is engaged with a bayonet engaging groove 191 which is formed at the camera casing 181. Other structures are the same as those of the indoor camera adaptor 173. If the outdoor camera adaptor 171 installed in the camera installation space 115 is intended to be rotated, as illustrated in FIG. 23, the adaptor rotation restricting claw 189 is engaged with the bayonet engaging groove 191, and thus rotation is restricted. In other words, relative rotation between the outdoor camera adaptor 171 and the outdoor omnidirectional camera 165 is restricted. Further, a tool insertion hole 193 is formed in the flange 175 of the outdoor camera adaptor 171. If the outdoor omnidirectional camera 165 is pushed into the camera installation space 115, there is no means for rotating the outdoor omnidirectional camera. Therefore, a screwdriver is inserted into the tool insertion hole 193, and thus the outdoor omnidirectional camera can be rotated.

(Lid Used when Microphone Array and Omnidirectional Camera are Separately Used)

Figure 24:
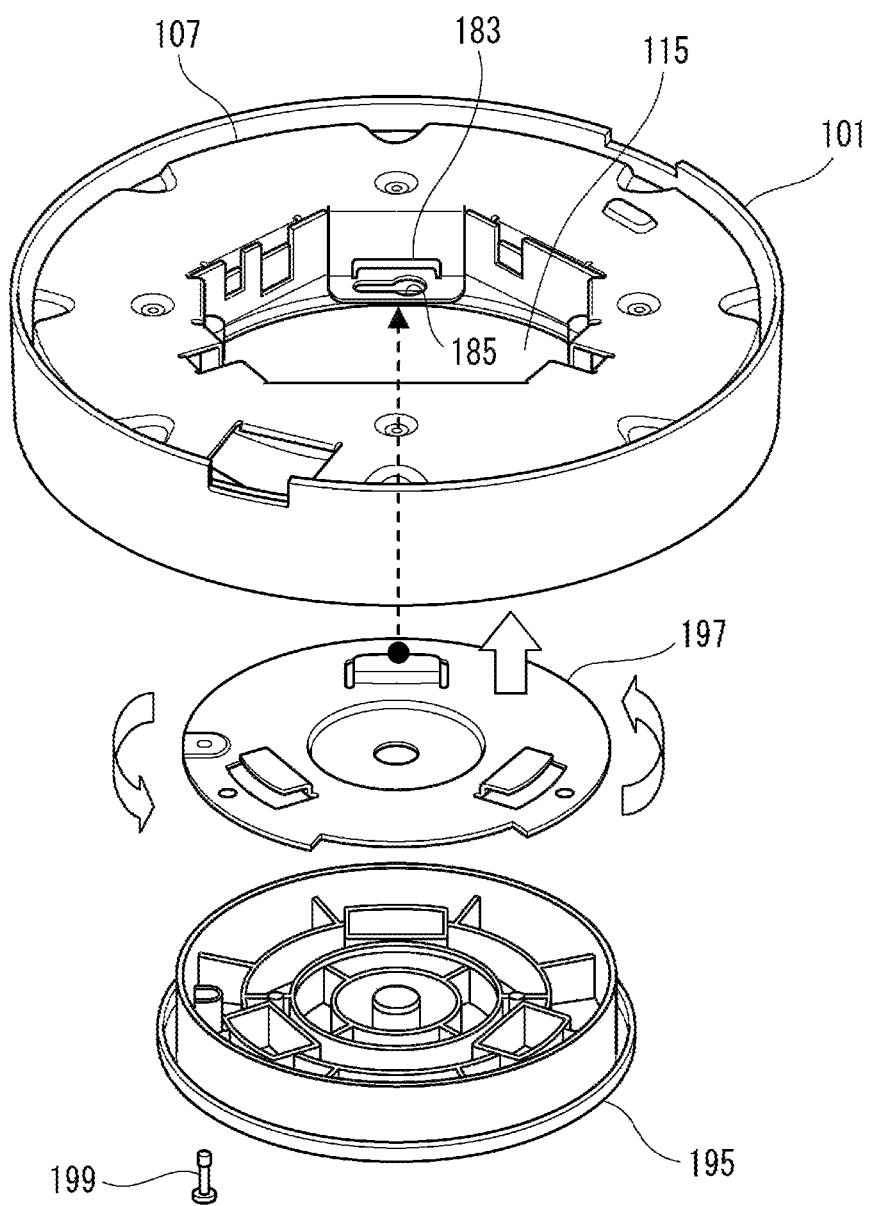
FIG. 24 is an exploded perspective view illustrating a casing structure of the microphone array attached with a lid.

FIG. 24 is an exploded perspective view illustrating a casing structure of the microphone array 20 attached with a lid 195. The microphone array 20 and the omnidirectional camera are integrally attached to each other, for example, as illustrated in FIG. 7A, but may be separately attached so as to be used, for example, as illustrated in FIG. 9A. In this case, the camera installation space 115 is closed by the lid 195 illustrated in FIG. 24. The lid 195 is made of, for example, a resin material, and is integrally molded. In addition, the lid 195 is integrally combined with a metallic lid sheet metal 197 via an engagement structure. The lid 195 is combined with the lid sheet metal 197, and thus an external force (impact force) is distributed to the lid sheet metal 197. Consequently, the lid 195 is prevented from being deformed in the lid 195, and thus cracks or the like are prevented. The lid 195 combined with the lid sheet metal 197 is inserted into and is supported in the camera installation space 115 since the lid sheet metal 197 is engaged with the camera fixing sheet metals 183 for fixing the omnidirectional camera. In this state, the lid 195 stops being rotated at and is fixed to the camera fixing sheet metals 183 by a lid rotation stopping screw 199.

(Attachment Fixture)

Figure 25:
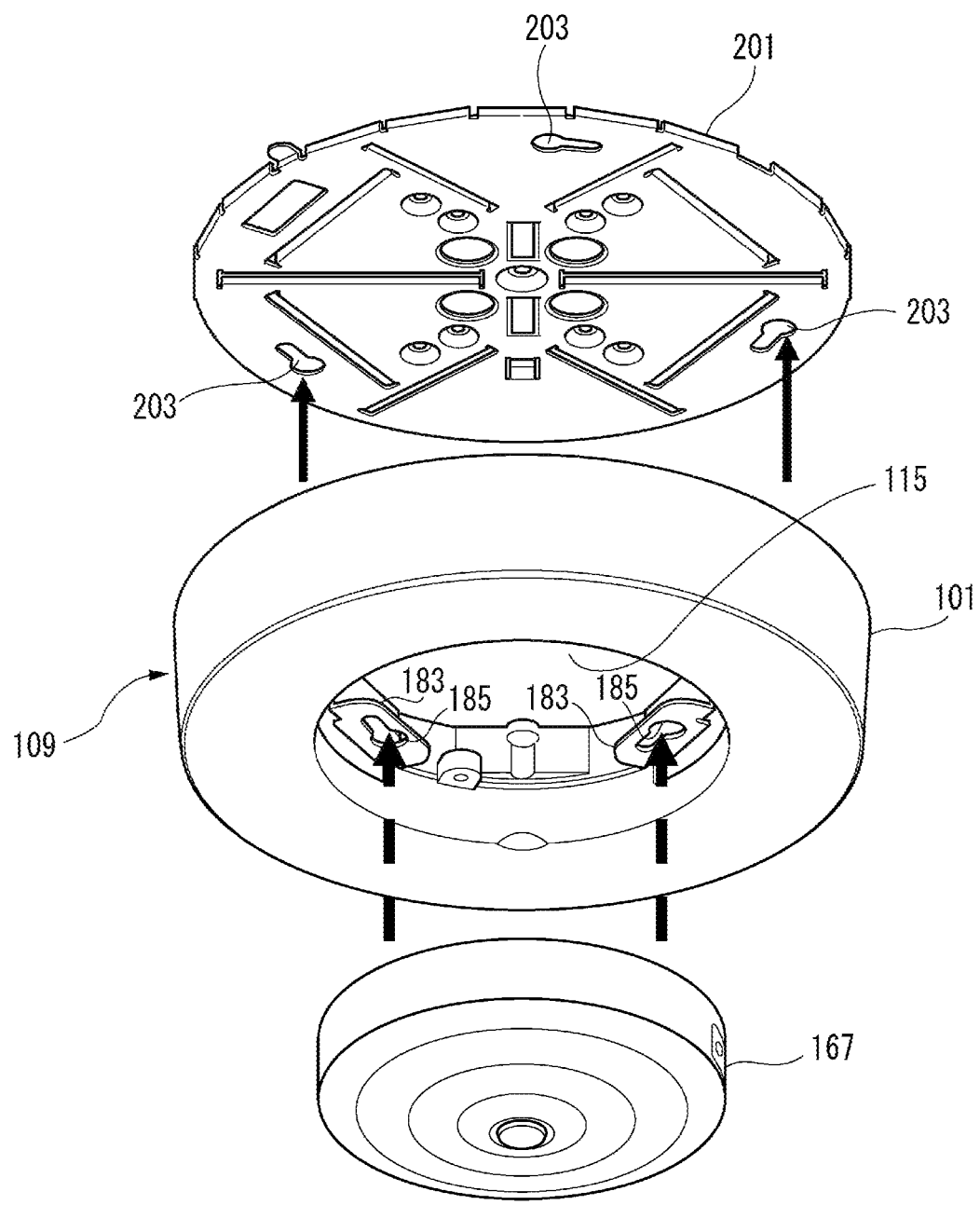
FIG. 25 is an exploded perspective view illustrating a casing structure which is attached to a ceiling by using an attachment fixture.
Figure 26:
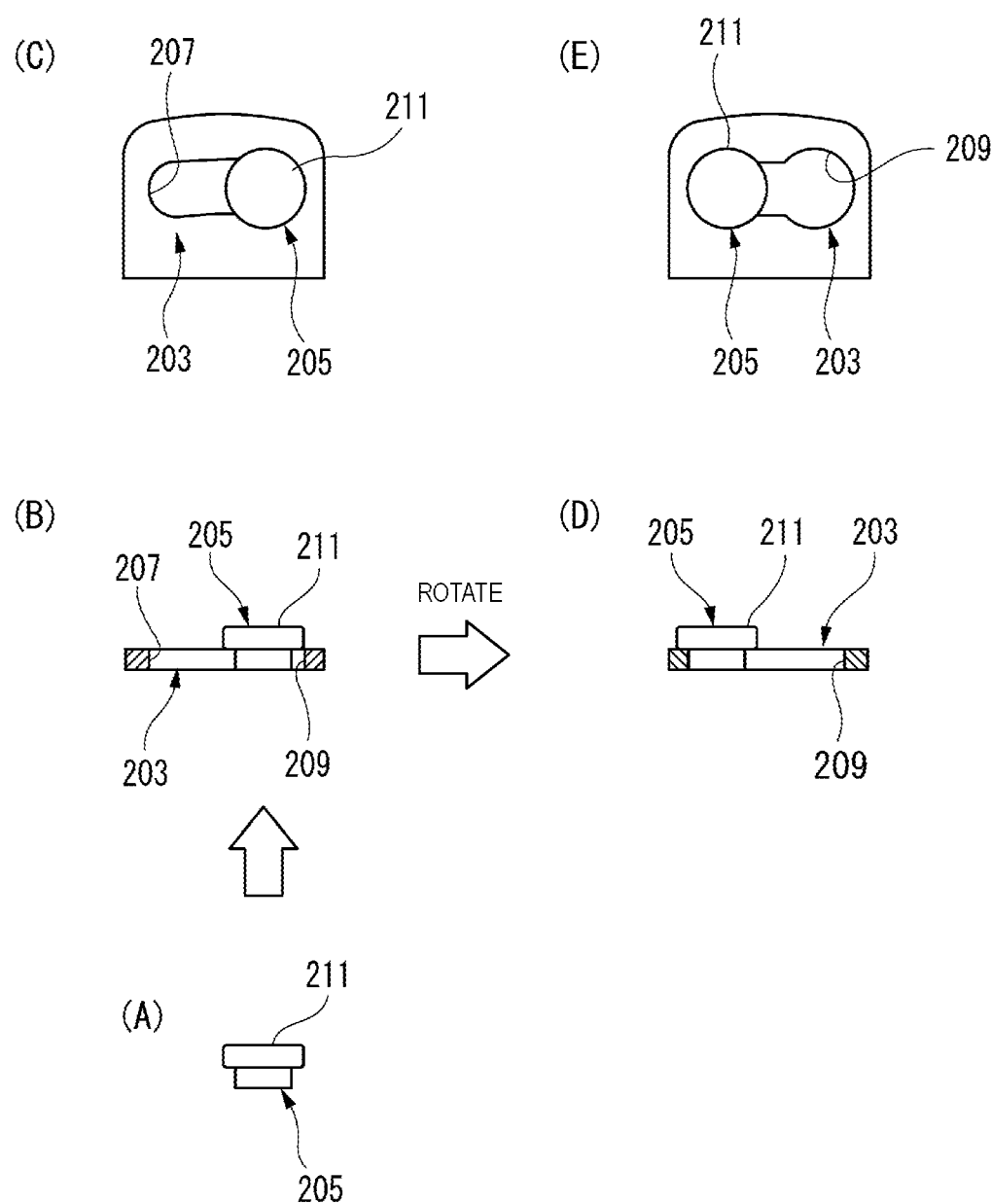
In FIG. 26, (A) is a side view illustrating a base sheet metal side fixing pin before being inserted into a base sheet metal fixing hole; (B) is a side view illustrating the base sheet metal side fixing pin inserted into the base sheet metal fixing hole; (C) is a plan view illustrating the base sheet metal side fixing pin inserted into the base sheet metal fixing hole; (D) is a side view illustrating the base sheet metal side fixing pin which is moved to a small-diameter hole of the base sheet metal fixing hole; and (E) is a plan view illustrating the base sheet metal side fixing pin which is moved to the small-diameter hole of the base sheet metal fixing hole.

FIG. 25 is an exploded perspective view illustrating a casing structure of the microphone array 20 which is attached to a ceiling by using an attachment fixture 201. FIG. 26(A) is a side view illustrating a base sheet metal side fixing pin 205 before being inserted into a base sheet metal fixing hole 203. FIG. 26(B) is a side view illustrating the base sheet metal side fixing pin 205 inserted into the base sheet metal fixing hole 203. FIG. 26(C) is a plan view illustrating the base sheet metal side fixing pin 205 inserted into the base sheet metal fixing hole 203. FIG. 26(D) is a side view illustrating the base sheet metal side fixing pin 205 which is moved to a small-diameter hole 207 of the base sheet metal fixing hole 203. FIG. 26(E) is a plan view illustrating the base sheet metal side fixing pin 205 which is moved to the small-diameter hole 207 of the base sheet metal fixing hole 203.

The impact resistant casing 109 (refer to FIG. 12) is attached to a ceiling surface (not illustrated) as an example of an attachment surface by using the attachment fixture 201. In other words, the attachment fixture 201 is fixed to the ceiling surface, and the impact resistant casing 109 having a casing structure is attached to the attachment fixture 201.

The attachment fixture 201 as an example of an attachment tool is provided with a circular base portion as illustrated in FIG. 25. However, an attachment tool is not limited to the metallic attachment fixture 201, and a material of the attachment tool may be, for example, ceramics and synthetic resin (for example, plastic or elastomer). A plurality of (for example, three) base sheet metal fixing holes 203 are formed in the fixture base portion. The base sheet metal fixing hole 203 is formed in a tumbler shape or a luffa shape in which the small-diameter hole 207 is connected to a large-diameter hole 209.

On the other hand, the base sheet metal side fixing pin 205 protrudes from a surface of the base sheet metal 107 facing the ceiling surface so as to correspond to the base sheet metal fixing hole 203. As illustrated in FIG. 26(A), the base sheet metal side fixing pin 205 has a large-diameter pin head portion 211 at its protruding front end. The large-diameter pin head portion 211 can be inserted into the large-diameter hole 209, and can be engaged with the small-diameter hole 207 so as to be prevented from being released therefrom.

Next, a description will be made of a method of attaching the impact resistant casing 109. First, when the impact resistant casing 109 is attached to a ceiling surface as an example of an attachment surface, the attachment fixture 201 is fixed at a predetermined position of the ceiling surface via a ceiling fixation screw (not illustrated). The impact resistant casing 109 is positioned at the attachment fixture 201 fixed to the ceiling surface in a concentric shape.

Next, as illustrated in FIGS. 26B and 26C, the large-diameter pin head portion 211 of the base sheet metal side fixing pin 205 is inserted into the large-diameter hole 209 of the base sheet metal fixing hole 203 (refer to FIGS. 26B and 26C).

Then, as illustrated in FIGS. 26D and 26E, the impact resistant casing 109 is rotated so that the large-diameter pin head portion 211 is moved to the small-diameter hole 207, and thus the base sheet metal side fixing pins 205 are all fixed to the base sheet metal fixing holes 203 together. As described above, the outdoor omnidirectional camera 165 or the indoor omnidirectional camera 167 is installed in the camera installation space 115 of the impact resistant casing 109 which is fixed to the ceiling surface via the attachment fixture 201.

As mentioned above, in the casing structure of the microphone array 20, the omnidirectional camera is directly attached to the impact resistant casing 109 which is fixed to the ceiling surface via the attachment fixture 201. Consequently, in the casing structure of the microphone array 20, the omnidirectional camera is directly attached to the base sheet metal 107 to which the microphone sheet metal 105 is fixed, and thus it is possible to improve position accuracy of the ECM 131 and the omnidirectional camera.

(Minimization of Reflected Sound)

Figure 27:
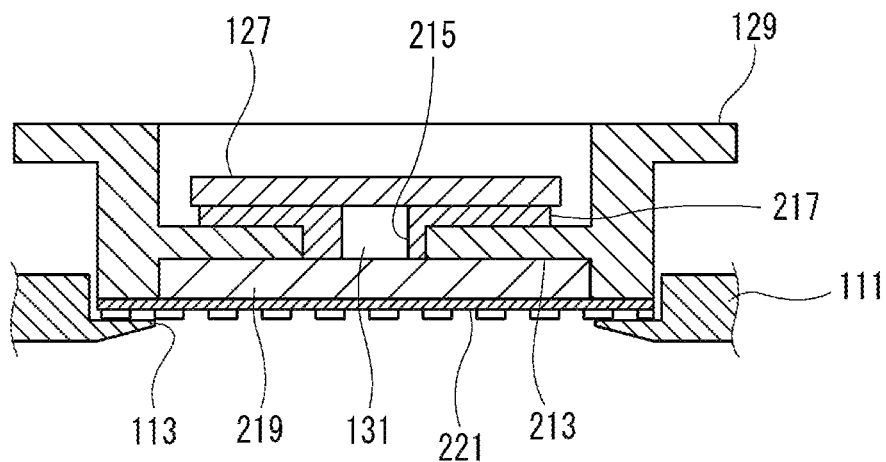
FIG. 27 is a sectional view illustrating a casing structure of the microphone array in which a taper is provided on an ECM recess.

FIG. 27 is a sectional view illustrating a casing structure of the microphone array 20 in which a taper 223 is provided on an ECM recess 213. In the casing structure of the microphone array 20, as illustrated in FIG. 27, an inner circumferential surface of the ECM recess 213 has the taper 223 so that a diameter thereof is reduced toward the ECM 131. The minimum diameter of the taper 223 substantially matches an outer diameter of a circular protrusion of a cushioning member 217 into which the ECM 131 is inserted, and the maximum diameter thereof substantially matches the microphone installation hole 113 of the annular bottom 111. A resonance point of an air column increase in the ECM recess 213 with the taper 223. In addition, a reflected wave at the inner circumferential surface of the ECM recess 213 is not directed toward the ECM 131. Further, a sound wave from the casing direction arrives at the ECM 131 in a state in which there is no disturbance in the sound wave. Consequently, a usable sound range increases, and thus an acoustic characteristic of the microphone array 20 while collecting sound is improved. Still further, a nonwoven fabric 221 for reducing wind noise is interposed between the punched metal cover 103 and the annular bottom 111.

(Countermeasure for Wind)

Figure 28:
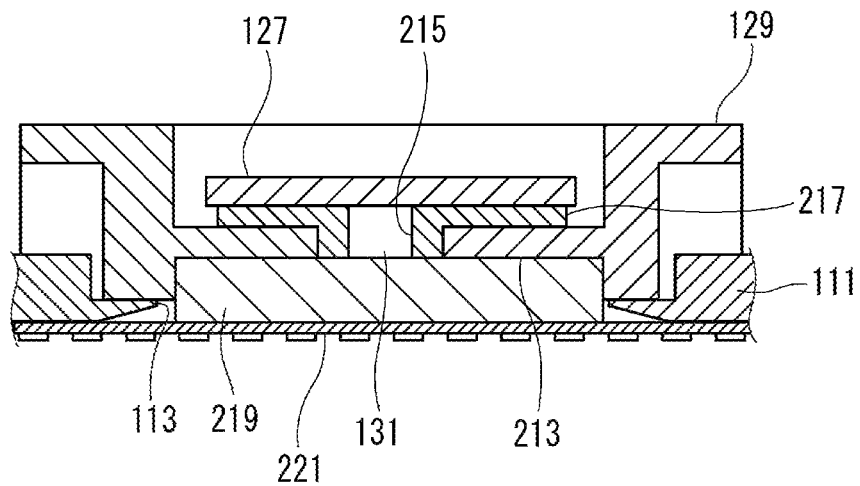
FIG. 28 is a sectional view illustrating a casing structure of the microphone array in which a countermeasure for wind is taken.

FIG. 28 is a sectional view illustrating a casing structure of the microphone array 20 in which a countermeasure for wind is taken. In the casing structure of the microphone array 20, a plurality of ECM recesses 213 are formed in the microphone casing 129 so as to correspond to the ECMs 131. For example, a through hole 215 which is formed in a circular shape and allows the ECM 131 to be exposed to its center is provided in the ECM recess 213. In addition, for example, the ECM 131 has the outer circumference wound by the cushioning member 217 such as rubber and is attached to the microphone casing 129, and the front end of the ECM 131 is inserted into the through hole 215. The ECM recesses 213 are disposed in a concentric shape along with the microphone installation holes 113 formed in the annular bottom 111. The ECM recess 213 may be filled with a sound absorbing material 219 for wind countermeasure. A surface of the sound absorbing material 219 is covered with the nonwoven fabric 221. The nonwoven fabric 221 is interposed between the punched metal cover 103 and the annular bottom 111.

Figure 29A:
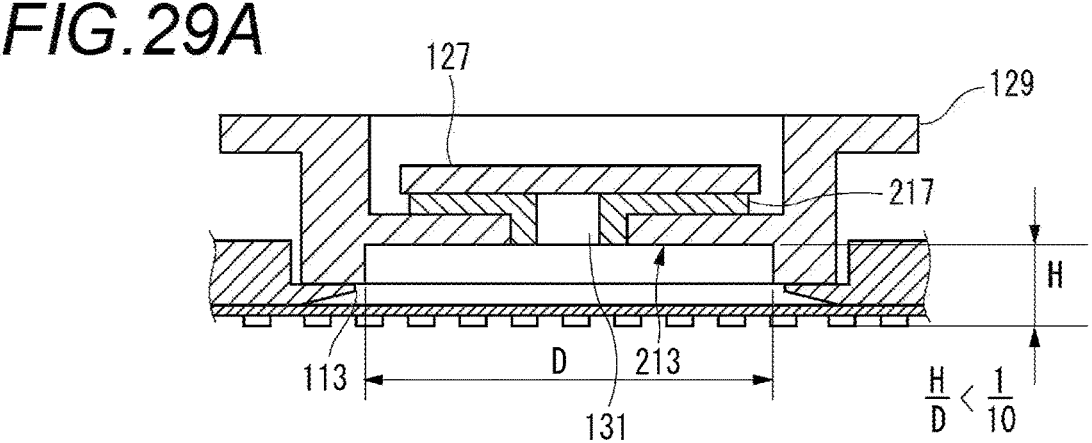
FIG. 29A is a sectional view of a casing structure of the microphone array illustrating a relationship between an inner diameter and a depth of the ECM recess.
Figure 29B:
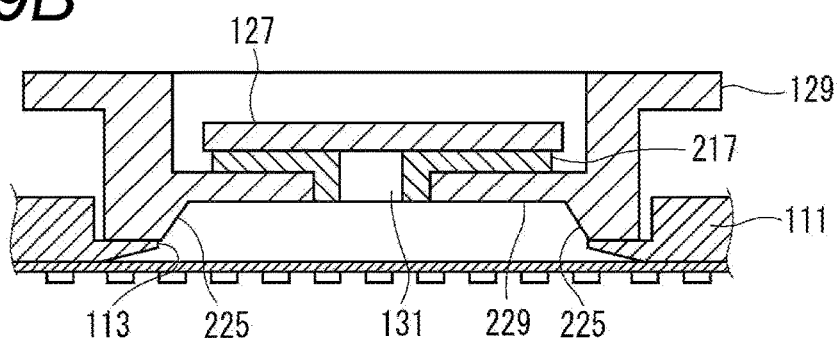
FIG. 29B is a sectional view illustrating a casing structure of the microphone array in which an inner wall of the ECM recess is a tilted wall.
Figure 29C:
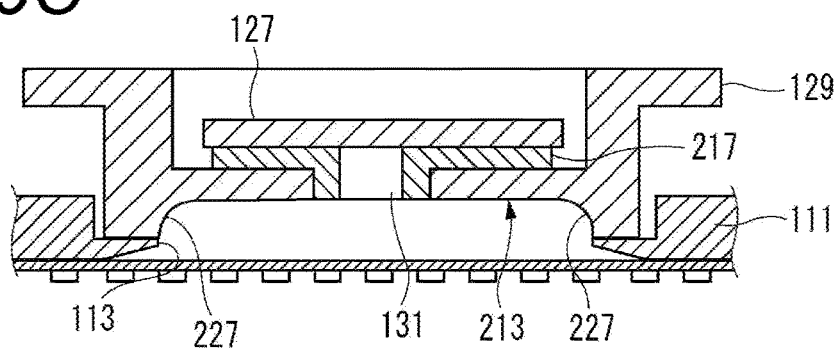
FIG. 29C is a sectional view illustrating a casing structure of the microphone array in which an inner circumferential corner portion of the ECM recess is an R portion.

Next, a description will be made of modification examples of the ECM recess 213 with reference to FIGS. 29A to 29C. FIG. 29A is a sectional view of a casing structure of the microphone array 20 illustrating a relationship between an inner diameter and a depth of the ECM recess 213. FIG. 29B is a sectional view illustrating a casing structure of the microphone array 20 in which an inner wall of the ECM recess 213 is a tilted wall 225. FIG. 29C is a sectional view illustrating a casing structure of the microphone array 20 in which an inner circumferential corner portion of the ECM recess 213 is an R portion 227.

As illustrated in FIG. 29A, a diameter D and a height H of the ECM recess 213 preferably have a predetermined relationship. For example, if a relationship of H/D<1/10 is satisfied, a peak is suppressed around a resonance frequency of the ECM recess 213, and thus acoustic performance has no adverse effect.

As illustrated in FIG. 29B, the ECM recess 213 may be constituted of a flat concave bottom 229 and a tapered tilted wall 225. Consequently, it is possible to make a resonance frequency of the ECM recess 213 higher than a frequency bandwidth which is used and also to reduce a reflected wave directed toward to the ECM 131 from the inner circumferential surface of the ECM recess 213.

As illustrated in FIG. 29C, the inner circumferential corner portion of the ECM recess 213 may be the R portion 227. Also with this configuration, it is possible to make a resonance frequency of the ECM recess 213 higher than a frequency bandwidth which is used and also to reduce a reflected wave directed toward to the ECM 131 from the inner circumferential surface of the ECM recess 213.

Figure 30A:
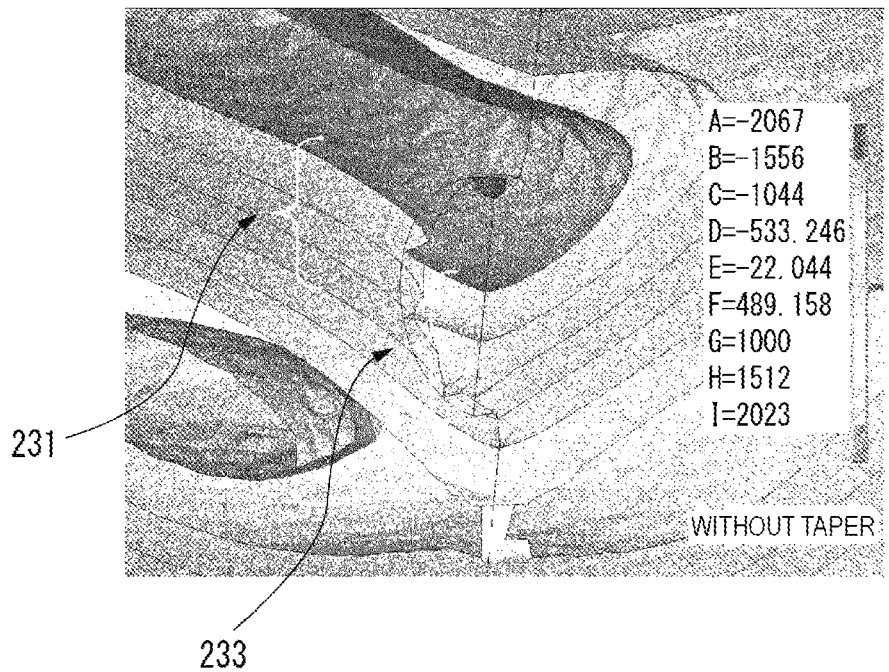
FIG. 30A is a diagram illustrating a constant-pressure surface of the ECM recess in which the taper is not formed.
Figure 30B:
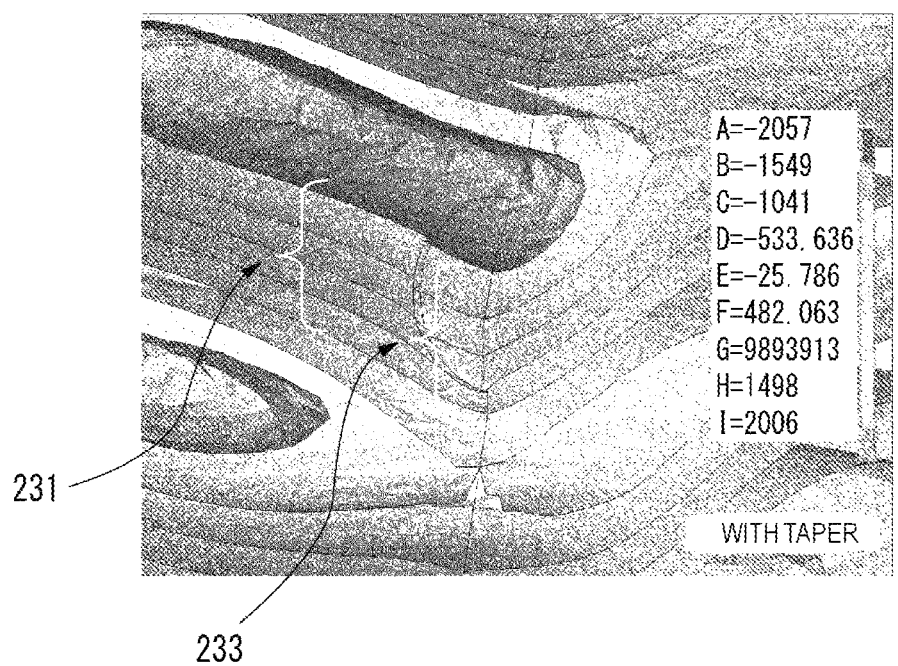
FIG. 30B is a diagram illustrating a constant-pressure surface of the ECM recess in which the taper is formed.

FIG. 30A is a diagram illustrating a constant-pressure surface of the ECM recess 213 in which the taper 223 is not formed. FIG. 30B is a diagram illustrating a constant-pressure surface of the ECM recess 213 in which the taper 223 is formed.

Sound around the ECM 131 can be simulated, for example, by analyzing sound which is transmitted through a space according to the wave equation, by using a finite element method. In this case, in the model in which the taper 223 is not provided in the ECM recess 213, as illustrated in FIG. 30A, an interval of the constant-pressure surface differs in a casing surface 231 and an ECM portion 233. On the other hand, in the model in which the taper 223 is provided in the ECM recess 213, as illustrated in FIG. 30B, an interval of the constant-pressure surface is constant in the casing surface 231 and the ECM portion 233. Consequently, if the taper 223 is provided in the ECM recess 213, a sound wave arrives at the ECM 131 without being disturbed.

Next, a description will be made of an operation of the casing structure of the microphone array 20 of the above-described respective embodiment. In the casing structure of the microphone array 20 of the above-described respective embodiments, the metallic microphone sheet metal 105 and the resinous base sheet metal 107 which is formed in a bottomed cylindrical shape are fixed to the resinous main casing 101 which is formed in a bottomed cylindrical shape. The stop portion 137 rises toward the base sheet metal 107 side from the metallic microphone sheet metal 105. In addition, the metallic punched metal cover 103 is fixed to the main casing 101 on the opposite side to the microphone sheet metal 105 with the main casing 101 interposed therebetween.

In the casing structure of the microphone array 20 of the respective embodiments, impact energy from the outside is absorbed by deforming the resinous main casing 101. Impact energy which is equal to or higher than the breaking strength of the main casing 101 is absorbed by deforming the metallic microphone sheet metal 105. In addition, impact energy which causes the microphone sheet metal 105 to be plastically deformed is applied to the base sheet metal 107 via the stop portion 137 and is finally released to the building frame or the like attached to the base sheet metal 107.

Further, in the casing structure of the microphone array 20 of the above-described respective embodiments, the punched metal cover 103, the main casing 101, the microphone sheet metal 105, and the base sheet metal 107 which are constituted of separate members can be integrally fixed and assembled together. For this reason, impact energy from the outside is absorbed and reduced by the gaps 149 between the members and even friction due to rubbing therebetween.

In addition, in the casing structure of the microphone array 20 of the above-described respective embodiments, the microphone board 127 is interposed between the punched metal cover 103 and the microphone sheet metal 105. The main board 139 and the power supply board 141 are interposed between the microphone sheet metal 105 and the base sheet metal 107. In other words, the microphone sheet metal 105 is electronically shielded by a conductive outer shell constituted of the metallic punched metal cover 103 and the metallic microphone sheet metal 105. The main board 139 and the power supply board 141 are electronically shielded by a conductive outer shell constituted of the metallic microphone sheet metal 105 and the metallic base sheet metal 107.

Further, in the casing structure of the microphone array 20 of the above-described respective embodiments, the microphone casing 129 which is interposed between the resinous main casing 101 and the metallic microphone sheet metal 105 is made of a resin material. A plurality of microphones are fixed to the microphone casing 129. The microphones fixed to the microphone casing 129 are exposed to the outside through the microphone installation holes 113 which are open to the annular bottom 111 of the main casing 101. The microphone installation holes 113 are covered with the punched metal cover 103 which covers the annular bottom 111.

For example, if the impact resistant casing 109 is fixed to the ceiling surface, the punched metal cover 103 is disposed on the side facing the ground surface. An impact such as a blow which is applied to the impact resistant casing 109 from the ground side is first applied to the punched metal cover 103. The metallic punched metal cover 103 is plastically deformed due to the impact which is equal to or higher than a limit of elasticity, so as to absorb the impact energy. Impact energy which is not absorbed even through the plastic deformation of the punched metal cover 103 is applied to the annular bottom 111 of the main casing 101. The impact energy deforms the annular bottom 111 and is also applied to the microphone sheet metal 105 and the base sheet metal 107. The microphone casing 129 is stopped by the microphone sheet metal, and thus great impact energy is not applied thereto.

If the impact energy at this time is equal to or greater than the limit of elasticity of the resinous main casing 101, the main casing 101 absorbs the impact energy by causing whitening, cracks, or the like. Although the whitening or the cracks occur, the main casing 101 recovers the original shape in a state in which the whitening or the cracks remain as long as the main casing is not completely destructed as a whole. In other words, even if the whitening or the cracks occur in the main casing 101, this does not greatly influence the acoustic characteristic of the microphone. In addition, since the plastically deformed punched metal cover 103 has a high aperture ratio, even deformation does not influence the acoustic characteristic of the microphone. For this reason, the acoustic characteristic of the microphone is unlikely to deteriorate in resistance to impacts from the outside.

In addition, if the main casing 101 is made of aluminum, the main casing is easily plastically deformed due to an impact coming from the punched metal cover 103. Particularly, in a case where a peripheral shape of the microphone is plastically deformed, the acoustic characteristic deteriorates. Therefore, according to the casing structure of the microphone array 20 of the above-described respective embodiments, it is possible to prevent the deterioration in the acoustic characteristic due to such plastic deformation.

Further, in the casing structure, the microphone sheet metal 105 is disposed inside the main casing 101. The fitting portions 143 rise from the microphone sheet metal 105. The fitting portions 143 are disposed with the intervals 149 toward the inside of the main casing outer circumferential wall 117. Each of the fitting portions 143 is provided with a pair of pinch pieces which are separated from each other in the radial direction (the thickness direction of the main casing outer circumferential wall 117). The base sheet metal outer circumferential wall 135 of the base sheet metal 107 is inserted and fitted (fitted) between the pair of pinch pieces of the fitting portion 143. In other words, in this casing structure, the side portion of the impact resistant casing 109 is configured by overlapping the main casing outer circumferential wall 117, the gap 149, the outer pinch piece 145, the base sheet metal outer circumferential wall 135, and the inner pinch piece 147 with each other in this order inwards from the outside.

Impact energy such as a blow which is applied to the impact resistant casing 109 from the outside of the side portion is first applied to the main casing outer circumferential wall 117. The main casing outer circumferential wall 117 is elastically deformed between the gaps 149 so as to absorb the impact energy. The impact energy which is equal to or higher than a limit of elasticity is applied to the fitting portion 143. The impact energy applied to the fitting portion 143 elastically deforms the outer pinch piece 145, the base sheet metal outer circumferential wall 135, and the inner pinch piece 147 and is thus absorbed thereby. Further, the impact energy applied to the fitting portion 143 is effectively absorbed and reduced even due to frictions between the outer pinch piece 145 and the base sheet metal outer circumferential wall 135, or between the base sheet metal outer circumferential wall 135 and the inner pinch piece 147.

Therefore, according to the casing structure of the microphone array 20 of the above-described respective embodiments, it is possible to improve impact resistance.

Fourth Embodiment

In the first to third embodiments, the description has been made assuming an operation of the sound processing system in a case where a single designated location is designated by the user in video data displayed on the display 63 or 73. In a fourth embodiment, similarly, a description will be made of an operation of the sound processing system in a case where a plurality of (for example, two) different designated locations are designated by the user in video data displayed on the display 63 or 73. A configuration of the sound processing system of the present embodiment is the same as the configuration of the sound processing system 5A shown in FIG. 1A, and thus the description will be made by referring to the reference numerals of the respective units of the sound processing system 5A.

In the sound processing system of the present embodiment, in a case where two designated locations are designated by the user in video data displayed on the display 63 or 73, the two designated locations are appropriately differentiated from each other, and a different identification shape for each designated location is displayed around each designated location so that the differentiated designated locations are visually clearly shown to the user. In addition, the sound processing system of the present embodiment forms directivity in a direction directed toward a sound position corresponding to each designated location from the microphone array 20 by using audio data of sound collected by the microphone array 20, and outputs sound according to a predefined method in correlation with each identification shape.

FIG. 8 schematically illustrates an example of a usage type of the sound processing system 5A of the fourth embodiment. FIG. 8A is a diagram illustrating a state in which a single camera 10, a single microphone array 20, and a single speaker 82 are installed, for example, on a ceiling 85 of an indoor hall. FIG. 8B is a diagram illustrating a schematic operation of the sound processing system 5A in a case where a plurality of designated locations are designated in video data displayed on the display 63.

In FIG. 8A, two persons 91a and 92a have conversations on the floor 87 of the hall. The speaker 82 is placed so as to contact the floor 87 at a position which is a little far from the two persons 91a and 92a, and music is output from the speaker 82. In addition, the camera 10 images the persons 91a and 92a present in the vicinity of a monitoring target point (location) which is set in advance in the camera 10. Further, the microphone array 20 collects sound of the entire hall. Video data captured by the camera 10 is displayed on a screen 68 of the display 63. Still further, the conversations of the two persons 91 and 92 or the music in the hall is output from the speaker 65 as sound.

For example, it is assumed that the user continuously touches the vicinities of the heads of the two persons 91a and 92a displayed on the screen 68 of the display 63 with the finger 95. Touch points 63a1 and 63a2 is a plurality of designated locations which are designated by the user. The signal processing unit 50 generates audio data items in which directivity is formed in directivities (directions indicated by the reference signs e1 and e2 shown in FIG. 8A) from the positions of the respective microphones 22 of the microphone array 20 toward the sound positions corresponding to the touch points 63a1 and 63a2 designated by the user by using sound collected by the microphone array 20, that is, respective audio data items collected by the microphones 22, and combines the audio data items with each other.

In other words, the signal processing unit 50 generates the audio data items in which sound (volume level thereof) is emphasized (amplified) in the directivities directed toward the sound positions corresponding to the touch points 63a1 and 63a2 designated by the user from the positions of the respective microphones 22 of the microphone array 20 by using the audio data items collected by the microphones 22, and combines the audio data items with each other. The reproducing unit 60 outputs the audio data combined by the signal processing unit 50 from the speaker 65 as sound in synchronization with the video data captured by the camera 10.

As a result, the audio data at the respective sound positions corresponding to the touch points 63a1 and 63a2 designated by the user is emphasized, and the conversations (for example, refer to "Hello" and "Hi!" illustrated in FIG. 8A) of the two persons 91a and 92a are output from the speaker 65 as sound with a large volume. On the other hand, the music (refer to "note" illustrated in FIG. 8A) is output as sound so as not to be emphasized from the speaker 82 which is placed at a distance closer to the microphone array 20 than to the two persons 91a and 92a and which is not the touch points 63a1 and 63a2 designated by the user, and is output as sound with a volume smaller than the conversations of the two persons 91a and 92a.

Next, with reference to FIGS. 31 to 40, a detailed description will be made of an example in which the sound processing system of the present embodiment displays a different identification shape for each designated location around each designated location in video data displayed on the display 63 in a case where a plurality of designated locations are designated by the user, and an example in which sound is output according to a predefined method in correlation with each identification shape. In addition, for better understanding of FIGS. 31 to 40 in the present embodiment, the description will be made assuming a sound processing system 5D into which the omnidirectional camera 10E and the microphone array 20C are integrally incorporated (refer to FIG. 9A), and, in the sound processing system 5D of the present embodiment, it is assumed that a plurality of (for example, two) speakers 65L and 65R are provided in the sound processing apparatus 40 or the PC 70.

Figure 31A:
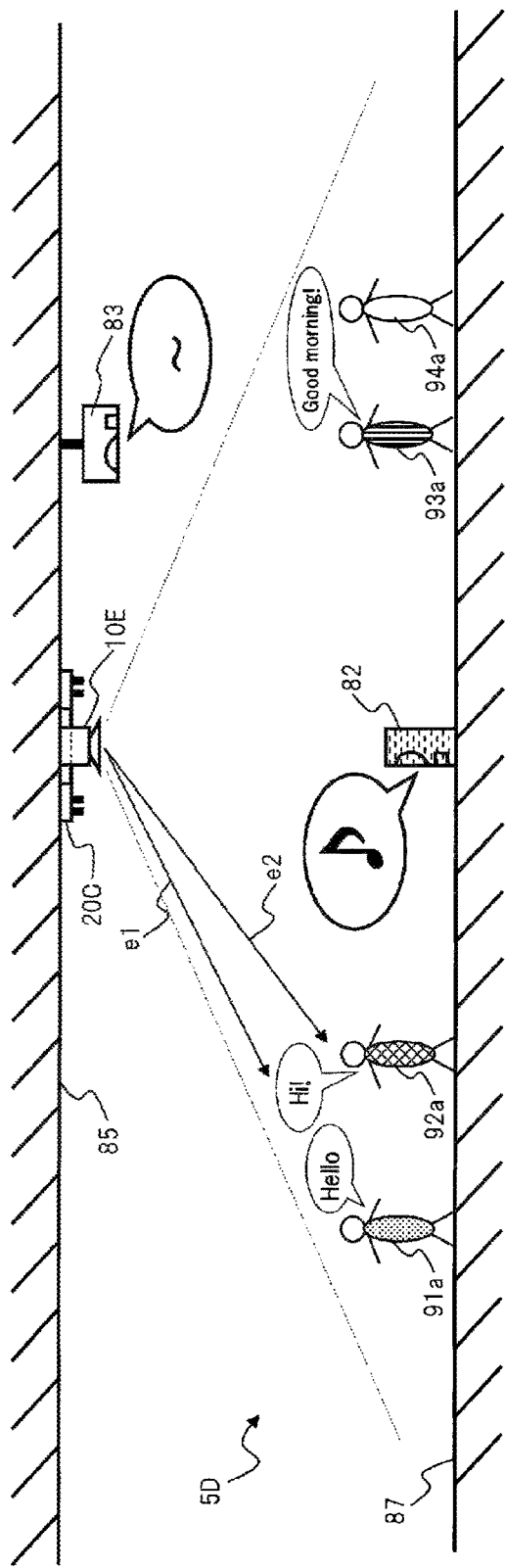
FIG. 31A is a diagram illustrating a usage example of the sound processing system of the fourth embodiment.
Figure 31B:
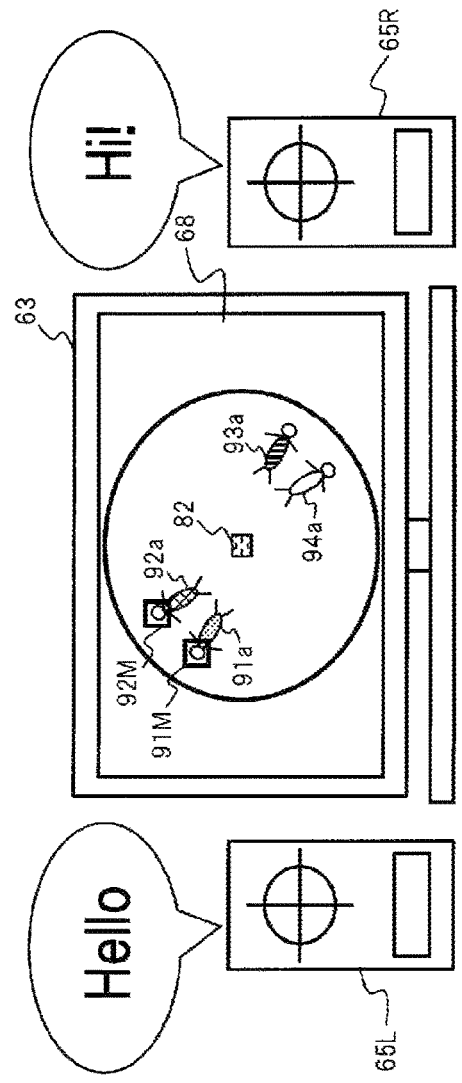
FIG. 31B is a diagram illustrating a state of displaying examples of a first identification shape displayed around a first designated location and a second identification shape displayed around a second designated location; a state in which sound is emphasized in a first directivity directed toward a first sound position corresponding to the first designated location specified by the first identification shape, and is output from a first speaker; and a state in which sound is emphasized in a second directivity directed toward a second sound position corresponding to the second designated location specified by the second identification shape, and is output from a second speaker.

FIG. 31A is a diagram illustrating a usage example of the sound processing system 5D of the fourth embodiment. FIG. 31B is a diagram illustrating a state of displaying examples of a first identification shape 91M displayed around a first designated location and a second identification shape 92M displayed around a second designated location; a state in which sound is emphasized in a first directivity directed toward a first sound position corresponding to the first designated location specified by the first identification shape 91M, and is output from the first speaker 65L; and a state in which sound is emphasized in a second directivity directed toward a second sound position corresponding to the second designated location specified by the second identification shape 92M, and is output from the second speaker 65R.

In FIG. 31A, the doughnut-shaped microphone array 20C, the omnidirectional camera 10E integrally assembled with the microphone array 20C, and the speaker 83 are installed, for example, on the ceiling 85 of the indoor hall. In addition, in FIG. 31A, four persons 91a, 92a, 93a and 94a have conversations on the floor 87 of the hall. More specifically, the persons 91a and 92a have conversations, and the persons 93a and 94a have conversations. The speaker 82 is placed so as to contact the floor 87 at a position which is a little far from the persons 92a and 93a, and music is output from the speaker 82. Further, the omnidirectional camera 10E images the persons 91a, 92a, 93a and 94a and the speaker 82 present within a predetermined viewing angle. Further, the microphone array 20C collects sound of the entire hall. Video data captured by the omnidirectional camera 10E is displayed on the screen 68 of the display 63.

(Combination of Designation Method of Designated Location and Sound Output Method Correlated with Designation Method)

Hereinafter, in the sound processing system 5D of the present embodiment, a description will be made of combinations of a designation method of the user designating a plurality of designated locations, with a sound output method correlated with an identification shape displayed for each designated location, by using a plurality of examples. However, the following combinations of the designation method of designated locations and the sound output method are only examples, and other designation methods of designated locations or sound output methods may be used and combined with each combination.

(Combination of First Designation Method with First Sound Output Method)

A first designation method is a method in which a designated location is designated, for example, through a left click operation and a right click operation using a mouse. A first sound output method is a simple stereo 2 channel (ch) output method in which audio data of one designated location is output from one speaker as sound, and audio data of the other designated location is output from the other speaker as sound.

For example, it is assumed that the user performs a left click operation of the operation unit 55 (for example, a mouse) on the vicinity of the head of the person 91a displayed on the screen 68 (refer to FIG. 31B) of the display 63 and also performs a right click operation of the operation unit 55 (for example, a mouse) on the vicinity of the head of the person 92a in a continuous manner, so as to perform continuous designation. The locations designated through the left click operation and the right click operation are a plurality of designated locations which are designated by the user. In a case where the plurality of designated locations are designated, the signal processing unit 50 displays a different identification shape for each designated location around each designated location in order to appropriately differentiate the designated locations from each other.

Specifically, the signal processing unit 50 displays the identification shape 91M for visually clearly showing that the person 91a is designated, around the person 91a designated through the left click operation, and, similarly, displays the identification shape 92M for visually clearly showing that the person 92a is designated, around the person 92a designated through the right click operation. The identification shapes 91M and 92M are respectively, for example, green and red rectangular shapes, but colors or shapes are not limited to green, red, and the rectangular shape.

In addition, the signal processing unit 50 generates audio data items in which directivity is formed in directivities (directions indicated by the reference signs e1 and e2 shown in FIG. 31A) from the installation position of the microphone array 20C toward the sound positions corresponding to the two designated locations designated by the user by using audio data of sound collected by the microphone array 20C. In synchronization with the video data captured by the omnidirectional camera 10E, the reproducing unit 60 outputs audio data in which sound is emphasized in the first directivity (refer to the reference sign e1 illustrated in FIG. 31A) specified by the identification shape 91M from the speaker 65L as sound, and outputs audio data in which sound is emphasized in the second directivity (refer to the reference sign e2 illustrated in FIG. 31A) specified by the identification shape 92M from the speaker 65R as sound. Therefore, the conversation sound ("Hello") of the person 91a is emphasized and is output from the speaker 65L as sound, and the conversation sound ("Hi!") of the person 92a is emphasized and is output from the speaker 65R as sound.

Figure 32:
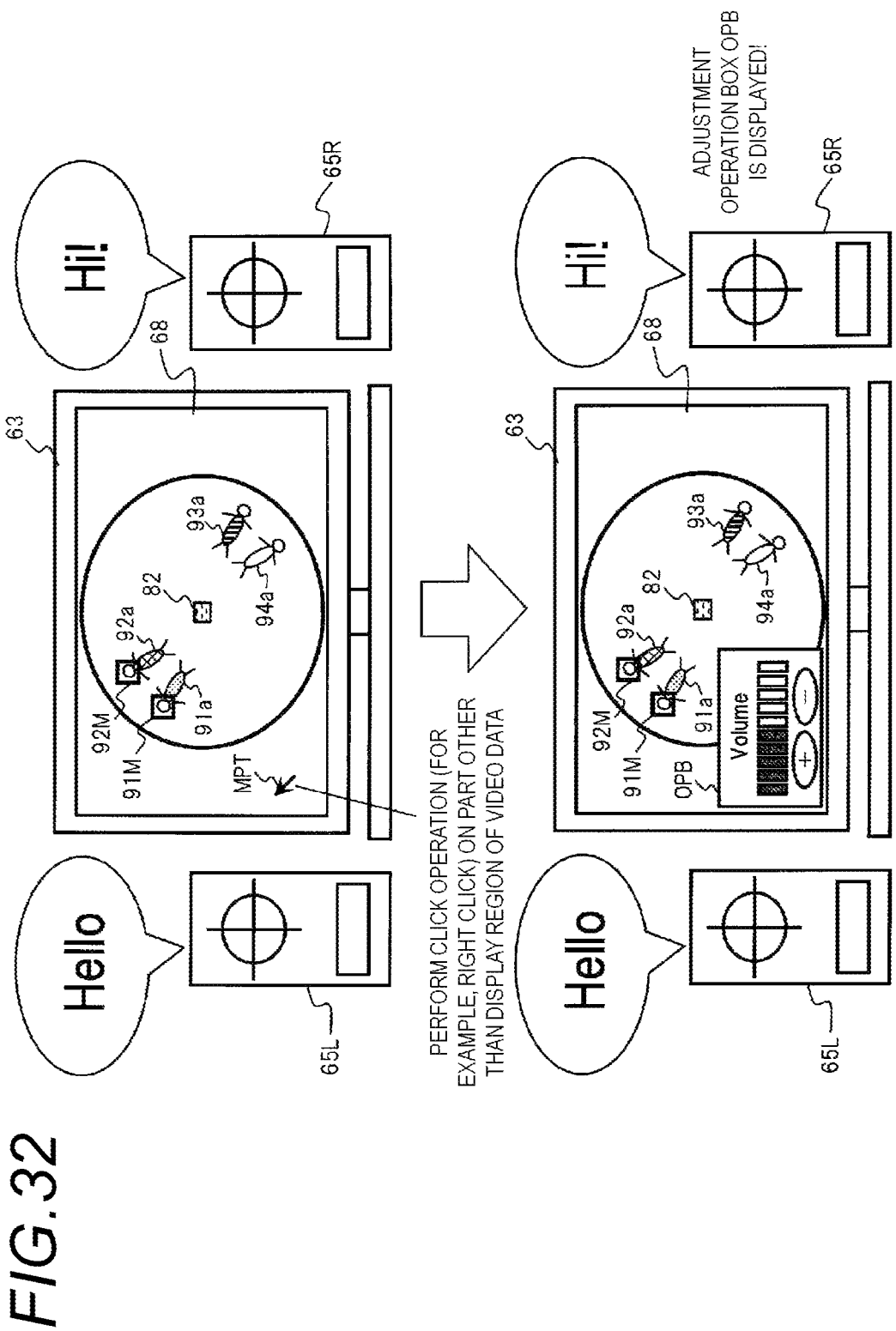
FIG. 32 is a diagram illustrating a case in which a click operation is performed on parts other than a display region of the video data which is displayed on the display in a state in which the video data illustrated in FIG. 31B is displayed, and, as a result, an adjustment operation box is displayed.
Figure 33:
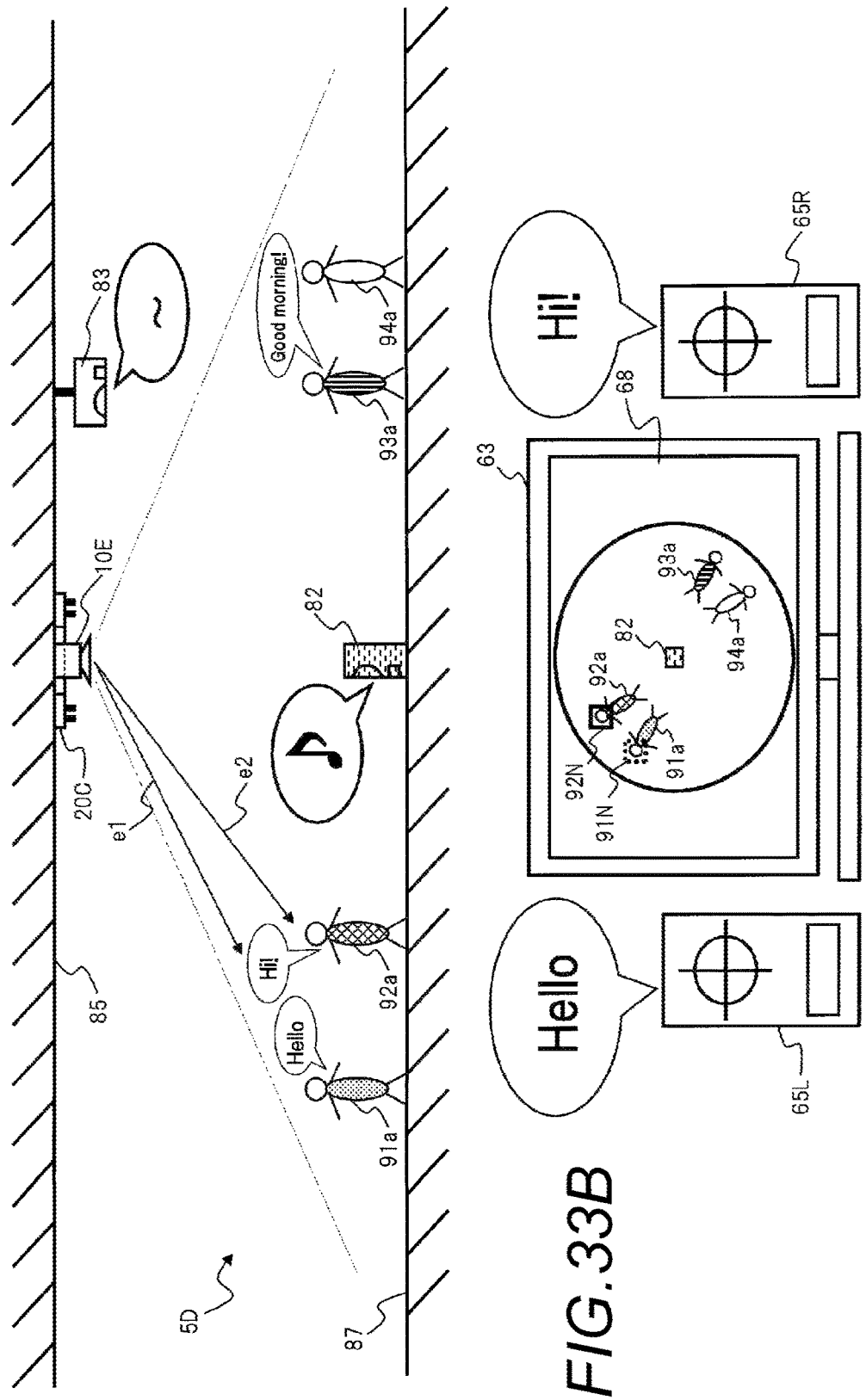
FIG. 33A is a diagram illustrating a usage example of the sound processing system of the fourth embodiment.
FIG. 33B is a diagram illustrating a state of displaying examples of a first identification shape displayed around a first designated location and a second identification shape displayed around a second designated location; a state in which sound is emphasized in a first directivity directed toward a first sound position corresponding to the first designated location specified by the first identification shape, and is output from the first speaker; and a state in which sound is emphasized in a second directivity directed toward a second sound position corresponding to the second designated location specified by the second identification shape, and is output from the second speaker.

FIG. 32 is a diagram illustrating a case in which a click operation is performed on parts other than a display region of the video data which is displayed on the display 63 in a state in which the video data illustrated in FIG. 31B is displayed, and, as a result, an adjustment operation box OPB is displayed. For example, in a case where the video data illustrated in FIG. 31B is displayed on the display 63, it is assumed that the user moves a cursor MPT to the outside of the display region of the video data by using the operation unit 55 (for example, a mouse) and then performs a click operation (for example, a right click operation). In response to the user's click operation, the signal processing unit 50 displays the adjustment operation box OPB for adjusting a parameter (for example, a volume level) of sound which is output from the speaker 65L or 65R, on the display 63. In addition, the adjustment operation box OPB is described to be used to adjust, for example, a volume level, but may be used to adjust settings of equalizer when sound is output or to adjust switching between directive sound and nondirective sound.

In addition, if the user presses a "+" button of the adjustment operation box OPB multiple times in a state of selecting the first identification shape 91M, the conversation sound of the person 91a which is being output from the speaker 65L is output in a higher level. On the other hand, if the user presses a "−" button of the adjustment operation box OPB multiple times in a state of selecting the second identification shape 92M, the conversation sound of the person 92a which is being output from the speaker 65R is output in a lower level.

Further, the first identification shape 91M and the second identification shape 92M are all represented by the solid line and are differentiated from each other by the different colors, but may be differentiated from each other by using the same color, and a solid line and a dotted line (refer to FIG. 33B). FIG. 33A is a diagram illustrating a usage example of the sound processing system 5D of the fourth embodiment. FIG. 33B is a diagram illustrating a state of displaying examples of a first identification shape 91N displayed around a first designated location and a second identification shape 92N displayed around a second designated location; a state in which sound is emphasized in a first directivity directed toward a first sound position corresponding to the first designated location specified by the first identification shape 91N, and is output from the first speaker 65L; and a state in which sound is emphasized in a second directivity directed toward a second sound position corresponding to the second designated location specified by the second identification shape 92N, and is output from the second speaker 65R.

In addition, FIG. 33A is the same as FIG. 31A, and thus description of FIG. 33A will be omitted. Further, in FIG. 31B, the identification shapes 91M and 92M have the different colors and are all represented by the solid lines, but, in FIG. 33B, the identification shapes 91N and 92N have the same color, one identification shape (the first identification shape 91N) is represented by a solid line, and the other identification shape (the second identification shape 92N) is represented by a dotted line. There is no difference between FIG. 33B and FIG. 31B except for this content, and thus description of FIG. 33B will also be omitted.

Figure 34:
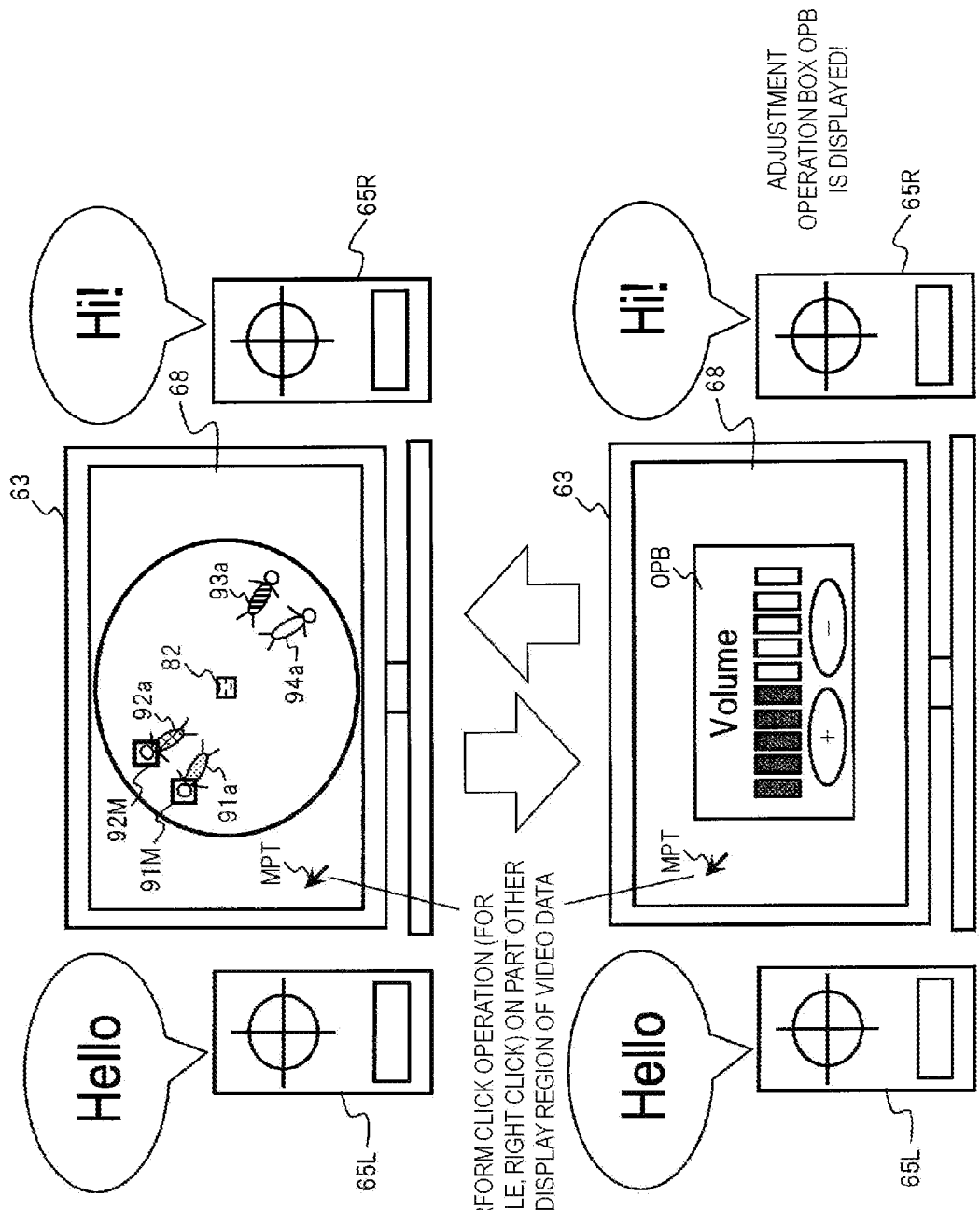
FIG. 34 is a diagram illustrating a case in which video data captured by the omnidirectional camera and the adjustment operation box are displayed in a switching manner whenever a click operation is performed on parts other than a display region of the video data which is displayed on the display in a state in which the video data illustrated in FIG. 31B is displayed.

FIG. 34 is a diagram illustrating a case in which video data captured by the omnidirectional camera 10E and the adjustment operation box OPB are displayed in a switching manner whenever a click operation is performed on parts other than a display region of the video data which is displayed on the display 63 in a state in which the video data illustrated in FIG. 31B is displayed. For example, in a case where the video data illustrated in FIG. 31B is displayed on the display 63, it is assumed that the user moves the cursor MPT to the outside of the display region of the video data by using the operation unit 55 (for example, a mouse) and then performs a click operation (for example, a right click operation). In response to the user's click operation, the signal processing unit 50 switches the screen of the video data captured by the omnidirectional camera 10E to the adjustment operation box OPB which is then displayed on the display 63.

Conversely, in a case where the adjustment operation box OPB is displayed on the display 63, it is assumed that the user moves the cursor MPT to the outside of the display region of the video data by using the operation unit 55 (for example, a mouse) and then performs a click operation (for example, a right click operation). In response to the user's click operation, the signal processing unit 50 switches the adjustment operation box OPB to the screen of the video data captured by the omnidirectional camera 10E, which is then displayed on the display 63. In addition, the switching between the adjustment operation box OPB and the screen of the video data captured by the omnidirectional camera 10E is performed through a click operation after the cursor MPT is moved to the outside of the display region of the video data, but is not limited to the click operation and may be performed through a predetermined input operation. The predetermined input operation is, for example, an operation in which the user simultaneously presses a plurality of different keys of a keyboard.

Figure 35:
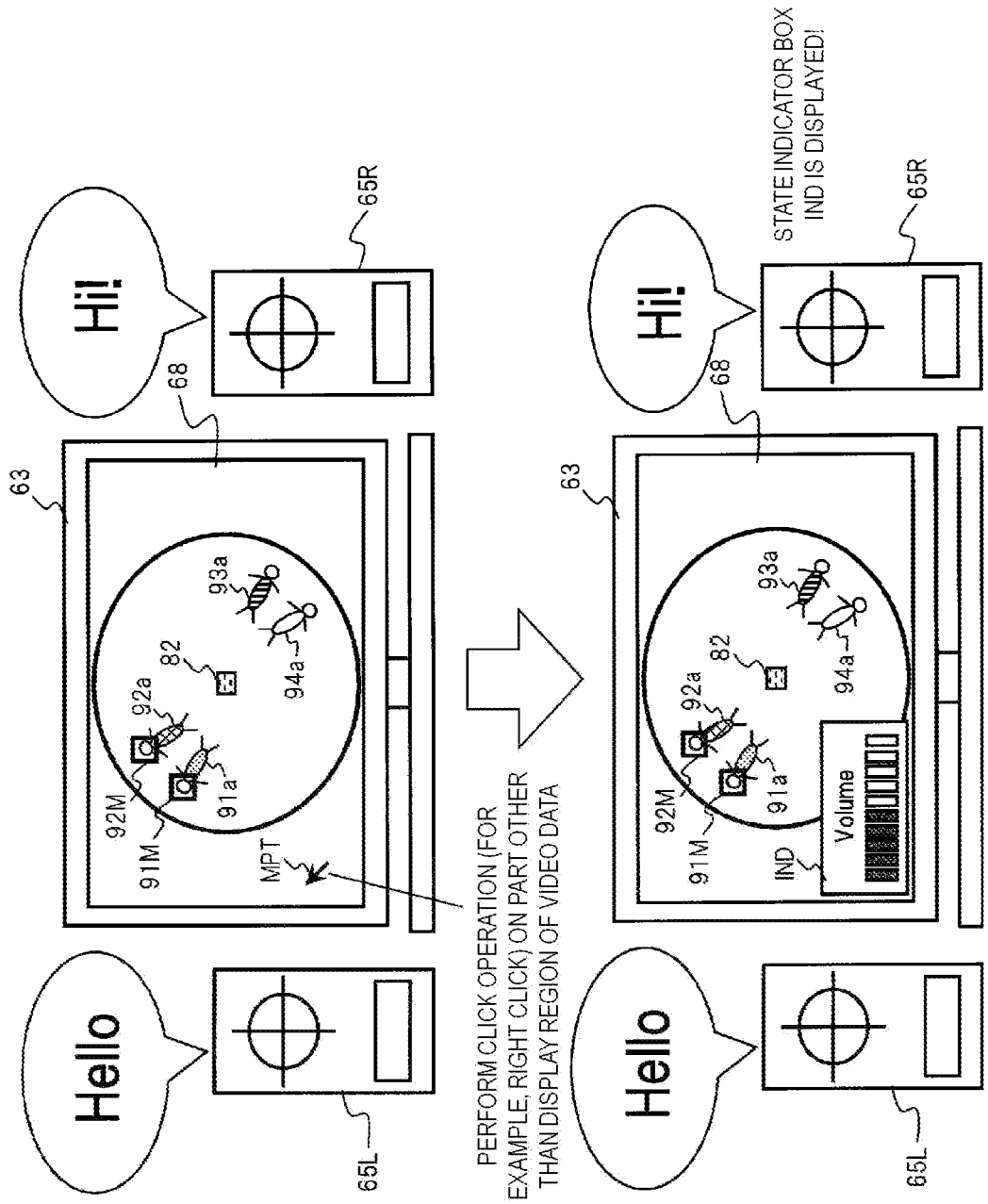
FIG. 35 is a diagram illustrating a case where a state indicator box is displayed in response to a click operation on parts other than the display region of the video data displayed on the display in a state in which the video data illustrated in FIG. 31B is displayed.
Figure 36:
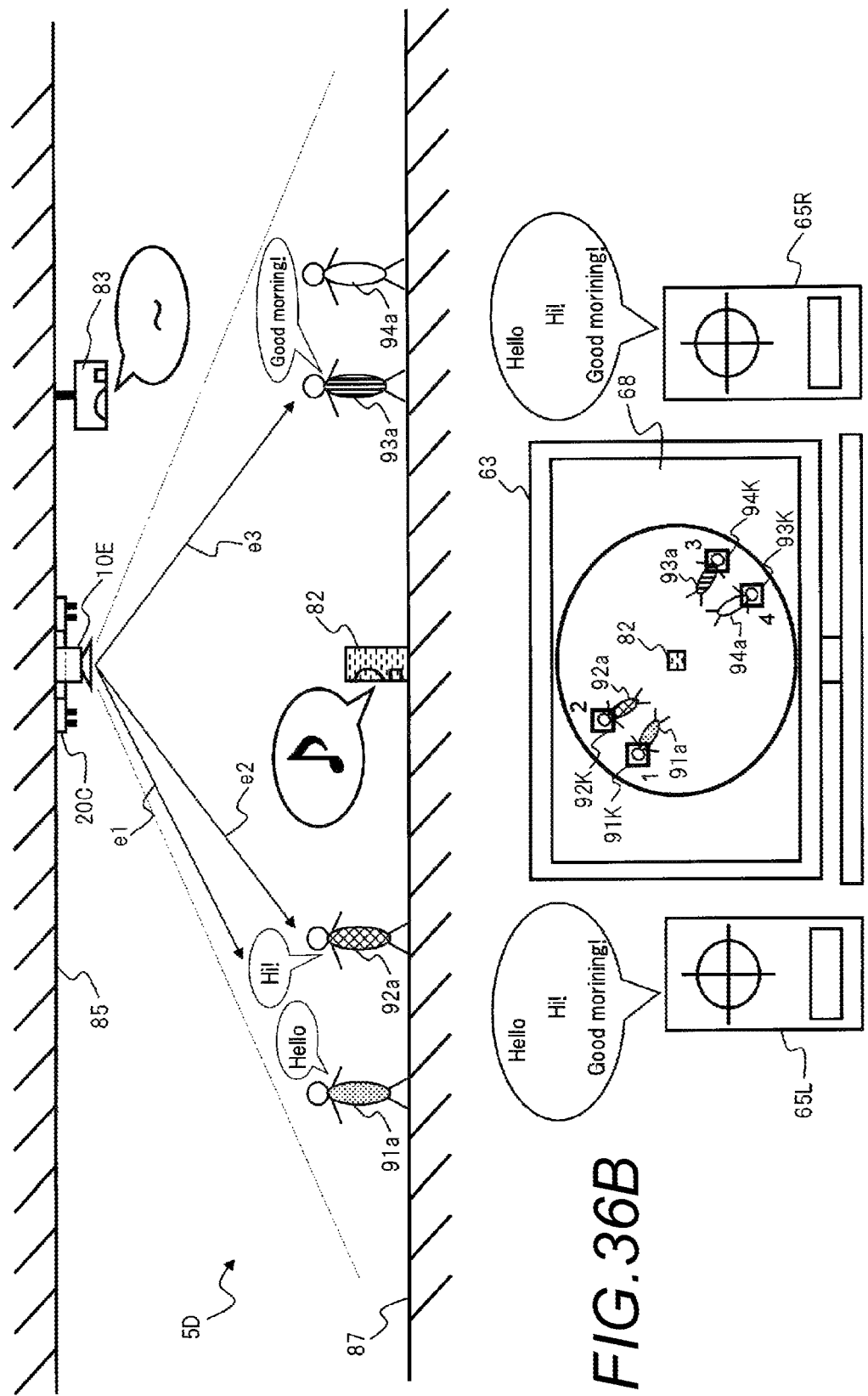
FIG. 36A is a diagram illustrating a usage example of the sound processing system of the fourth embodiment.
FIG. 36B is a diagram illustrating a state of displaying examples of a first identification shape displayed around a first designated location, a second identification shape displayed around a second designated location, a third identification shape displayed around a third designated location, a fourth identification shape displayed around a fourth designated location; and a state of outputting audio data in which sound is emphasized in a first directivity directed toward a first sound position corresponding to the first designated location specified by the first identification shape, audio data in which sound is emphasized in a second directivity directed toward a second sound position corresponding to the second designated location specified by the second identification shape, and audio data in which sound is emphasized in a third directivity directed toward a third sound position corresponding to the third designated location specified by the third identification shape from each of the first and second speakers.

FIG. 35 is a diagram illustrating a case where a state indicator box IND is displayed in response to a click operation on parts other than the display region of the video data displayed on the display 63 in a state in which the video data illustrated in FIG. 31B is displayed. For example, in a case where the video data illustrated in FIG. 31B is displayed on the display 63, it is assumed that the user moves the cursor MPT to the outside of the display region of the video data by using the operation unit 55 (for example, a mouse) and then performs a click operation (for example, a right click operation). In response to the user's click operation, the signal processing unit 50 displays the state indicator box IND for indicating a state of a parameter (for example, a volume level) of sound which is output from the speaker 65L or 65R, on the display 63.

In addition, although the user cannot operate the state indicator box IND, if any one of identification shapes which is desired to be displayed on the display 63 is designated by the user, the content of a volume level of sound of a person corresponding to the designated identification shape is visually clearly shown by the state indicator box IND. Further, in order to change the content of the state indicator box IND, for example, if the user presses a specific key of another operation unit (for example, a keyboard) in a state of selecting the first identification shape 91M, a result of increasing or decreasing a volume level of conversation sound of the person 91a which is output from the speaker 65L, or a process for reaching the result is visually clearly shown in the state indicator box IND. Still further, the state indicator box IND is described to be used to indicate, for example, a state of a volume level, but may be used to indicate the setting content of equalizer when sound is output or to indicate a state of switching between directive sound and nondirective sound. Furthermore, the state indicator box IND may be displayed on the display 63 at all times.

(Combination of Second Designation Method with Second Sound Output Method)

A second designation method is, for example, a method of designating a designated location through a pressing operation of numeric keys of a keyboard and a left click operation of a mouse. A second sound output method is a composite monaural 2 channel (ch) output method in which audio data of all designated locations is output from both speakers as sound.

FIG. 36A is a diagram illustrating a usage example of the sound processing system 5D of the fourth embodiment. FIG. 36B is a diagram illustrating a state of displaying examples of a first identification shape 91K displayed around a first designated location, a second identification shape 92K displayed around a second designated location, a third identification shape 93K displayed around a third designated location, a fourth identification shape 94K displayed around a fourth designated location; and a state of outputting audio data in which sound is emphasized in a first directivity directed toward a first sound position corresponding to the first designated location specified by the first identification shape 91K, audio data in which sound is emphasized in a second directivity directed toward a second sound position corresponding to the second designated location specified by the second identification shape 92K, and audio data in which sound is emphasized in a third directivity directed toward a third sound position corresponding to the third designated location specified by the third identification shape 93K, from each of the first and second speakers 65L and 65R. In addition, FIG. 36A is the same as FIG. 31A, and thus description of FIG. 36A will be omitted.

For example, it is assumed that the user performs simultaneous operations (for example, pressing of a numeric key of "1" of the keyboard and a left click operation of the mouse) of the operation unit 55 on the vicinity of the head of the person 91a displayed on the screen 68 (refer to FIG. 36B) of the display 63, simultaneous operations (for example, pressing of a numeric key of "2" of the keyboard and a left click operation of the mouse) of the operation unit 55 on the vicinity of the head of the person 92a, simultaneous operations (for example, pressing of a numeric key of "3" of the keyboard and a left click operation of the mouse) of the operation unit 55 on the vicinity of the head of the person 93a, and simultaneous operations (for example, pressing of a numeric key of "4" of the keyboard and a left click operation of the mouse) of the operation unit 55 on the vicinity of the head of the person 94a, so as to perform continuous designation. The locations designated through the pressing of the numeric keys and the left click operations are a plurality of designated locations which are designated by the user. In a case where the plurality of designated locations are designated, the signal processing unit 50 displays a different identification shape for each designated location around each designated location in order to appropriately differentiate the designated locations from each other.

Specifically, the signal processing unit 50 displays the identification shape 91K for visually clearly showing that the person 91a is designated, around the person 91a designated through the pressing operation of the number "1" and the left click operation, displays the identification shape 92K for visually clearly showing that the person 92a is designated, around the person 92a designated through the pressing operation of the number "2" and the left click operation, displays the identification shape 93K for visually clearly showing that the person 93a is designated, around the person 93a designated through the pressing operation of the number "3" and the left click operation, and displays the identification shape 94K for visually clearly showing that the person 94a is designated, around the person 94a designated through the pressing operation of the number "4" and the left click operation. The identification shapes 91K, 92K, 93K and 94K are black rectangular shapes, but colors or shapes are not limited to black and the rectangular shape.

In addition, the signal processing unit 50 generates audio data items in which directivity is formed in directivities (directions indicated by the reference signs e1, e2, and e3 shown in FIG. 36A) from the installation position of the microphone array 20C toward the sound positions corresponding to the four designated locations designated by the user by using audio data of sound collected by the microphone array 20C, and combines the audio data items with each other. In synchronization with the video data captured by the omnidirectional camera 10E, the reproducing unit 60 outputs audio data obtained by combining audio data in which sound is emphasized in the first directivity (refer to the reference sign e1 illustrated in FIG. 36A) specified by the identification shape 91K, audio data in which sound is emphasized in the second directivity (refer to the reference sign e2 illustrated in FIG. 36A) specified by the identification shape 92K, and audio data in which sound is emphasized in the third directivity (refer to the reference sign e3 illustrated in FIG. 36A) specified by the identification shape 93K with each other, from the speakers 65L and 65R as sound. Therefore, the conversation sound ("Hello") of the person 91a, the conversation sound ("Hi!") of the person 92a, and the conversation sound ("Good morning!") of the person 93a are emphasized and are output from the speakers 65L and 65R as sound. Further, since FIG. 36A illustrates that the person 94a does not utter sound, conversation sound of the person 94a is not emphasized or output from the speakers 65L and 65R, but, for example, in a case where the person 94a utters sound, conversation sound of the person 94a is also output from the speakers 65L and 65R.

Figure 37:
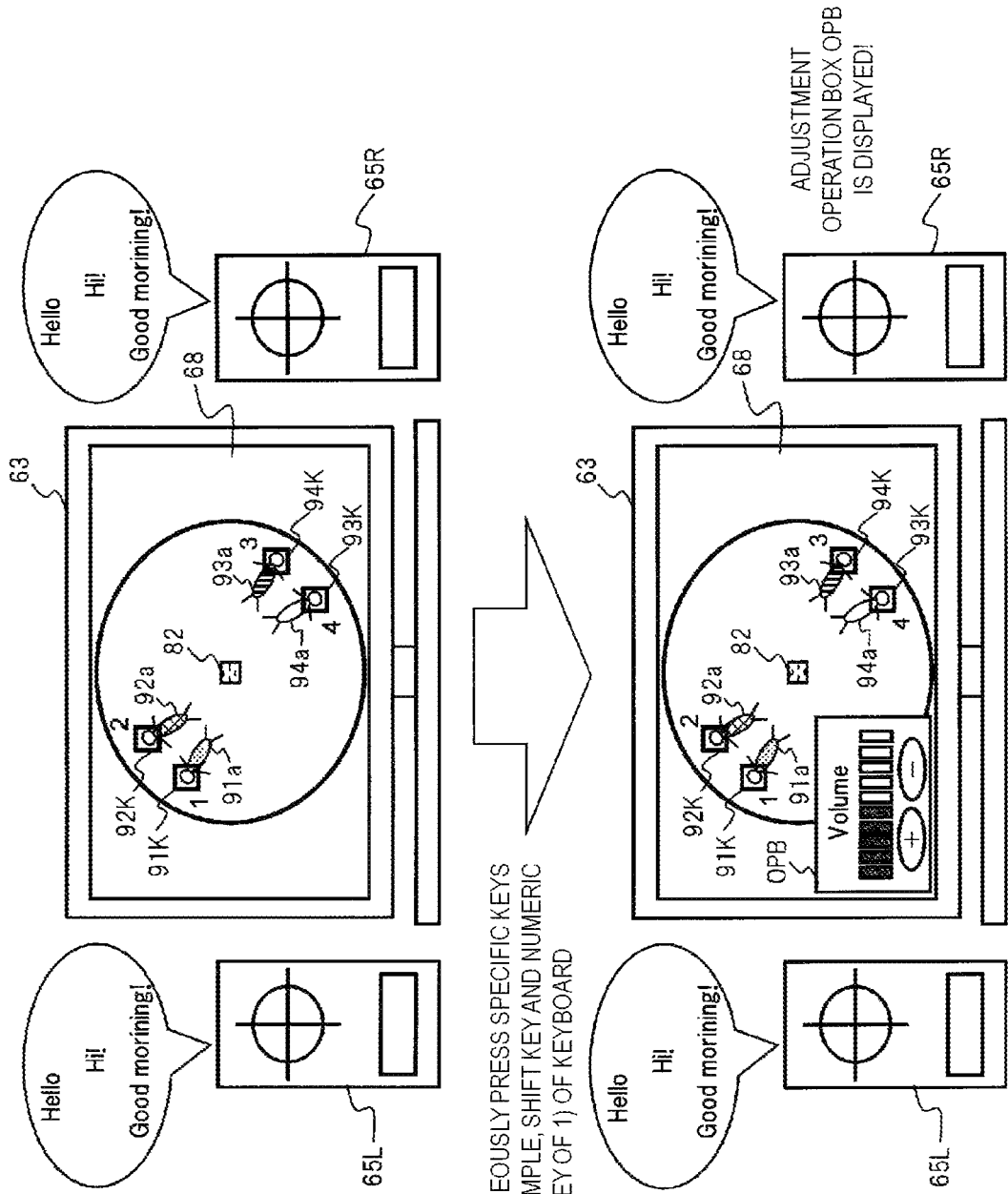
FIG. 37 is a diagram illustrating a case in which simultaneous pressing operations of a plurality of specific keys of a keyboard are performed in a state in which the video data illustrated in FIG. 36B is displayed, and, as a result, the adjustment operation box is displayed.
Figure 38:
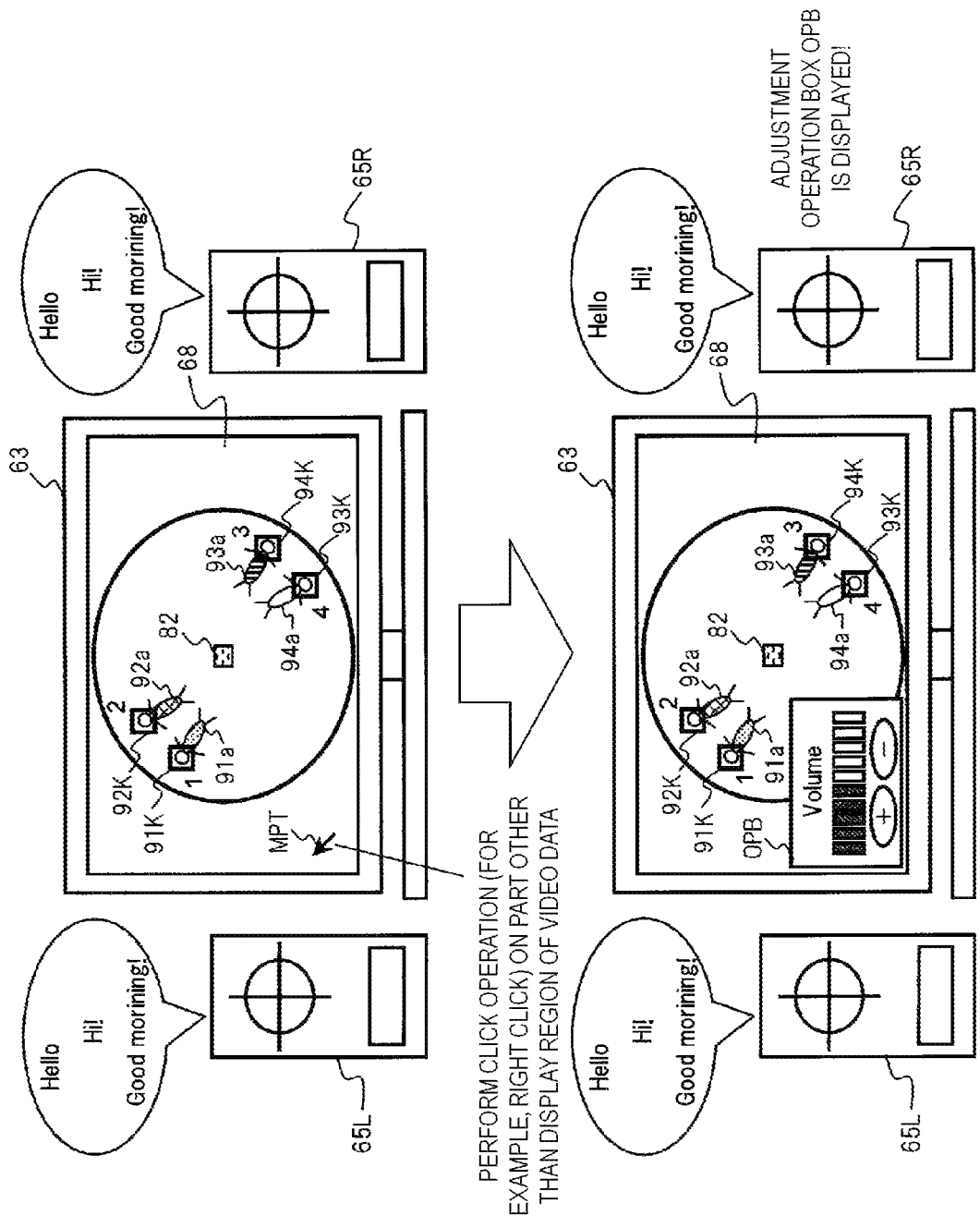
FIG. 38 is a diagram illustrating a case in which a click operation is performed on parts other than a display region of the video data which is displayed on the display in a state in which the video data illustrated in FIG. 36B is displayed, and, as a result, the adjustment operation box is displayed.

FIG. 37 is a diagram illustrating a case in which simultaneous pressing operations of a plurality of specific keys of the keyboard are performed in a state in which the video data illustrated in FIG. 36B is displayed, and, as a result, the adjustment operation box OPB is displayed. For example, in a case where the video data illustrated in FIG. 36B is displayed on the display 63, it is assumed that the user performs simultaneous pressing operations of the operation unit 55 (for example, the "shift" key and the numeric key of "1" of the keyboard). In response to the user's click operation, the signal processing unit 50 displays the adjustment operation box OPB for adjusting a volume level of sound which is output from the speaker 65L or 65R, on the display 63.

FIG. 39 is a diagram illustrating a case in which a click operation is performed on parts other than a display region of the video data which is displayed on the display 63 in a state in which the video data illustrated in FIG. 36B is displayed, and, as a result, the adjustment operation box OPB is displayed. For example, in a case where the video data illustrated in FIG. 36B is displayed on the display 63, it is assumed that the user moves the cursor MPT to the outside of the display region of the video data by using the operation unit 55 (for example, a mouse) and then performs a click operation (for example, a right click operation). In response to the user's click operation, the signal processing unit 50 displays the adjustment operation box OPB for adjusting a volume level of sound which is output from the speaker 65L or 65R, on the display 63.

(Combination of Third Designation Method with Third Sound Output Method)

A third designation method is, for example, a method of designating a designated location through a drawing operation of different identification shapes using a user's finger or a stylus pen on the display 63 provided with a touch panel, or a touch device (for example, a touch pad) which is different from the touch panel. A third sound output method is a composite stereo 2 channel (ch) output method in which audio data of one or a plurality of designated locations designated by the user is output from one speaker as sound, and, similarly, audio data of one or a plurality of designated locations designated by the user is output from the other speaker as sound. Hereinafter, for better understanding of description, the description will be made assuming that a designated location is designated through a user's drawing operation on the display 63 provided with a touch panel.

Figure 39A:
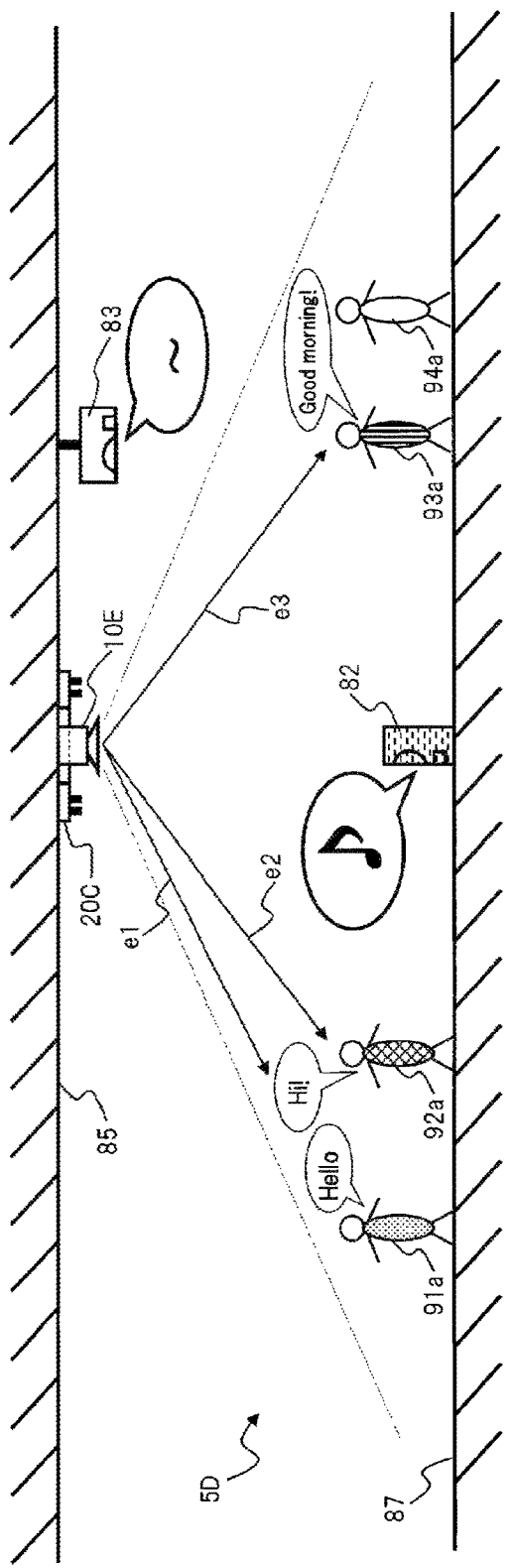
FIG. 39A is a diagram illustrating a usage example of the sound processing system of the fourth embodiment.
Figure 39B:
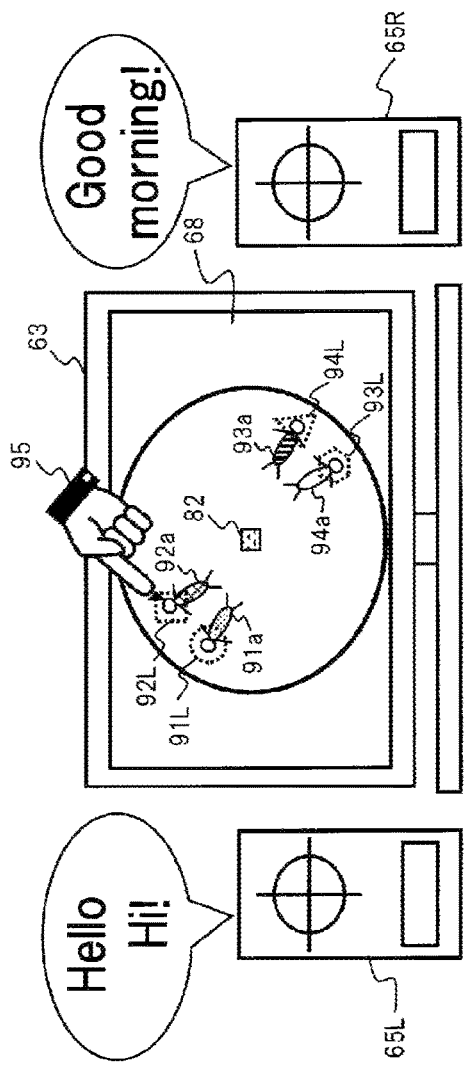
FIG. 39B is a diagram illustrating a state of displaying examples of a first identification shape displayed around a first designated location, a second identification shape displayed around a second designated location, a third identification shape displayed around a third designated location, and a fourth identification shape displayed around a fourth designated location; a state of outputting audio data obtained by combining audio data in which sound is emphasized in a first directivity directed toward a first sound position corresponding to the first designated location specified by the first identification shape with audio data in which sound is emphasized in a second directivity directed toward a second sound position corresponding to the second designated location specified by the second identification shape, from the first speaker; and a state of outputting audio data in which sound is emphasized in a third directivity directed toward a third sound position corresponding to the third designated location specified by the third identification shape, from the second speaker.

FIG. 39A is a diagram illustrating a usage example of the sound processing system 5D of the fourth embodiment. FIG. 39B is a diagram illustrating a state of displaying examples of a first identification shape 91L displayed around a first designated location, a second identification shape 92L displayed around a second designated location, a third identification shape 93L displayed around a third designated location, a fourth identification shape 94L displayed around a fourth designated location; a state of outputting audio data obtained by combining audio data in which sound is emphasized in a first directivity directed toward a first sound position corresponding to the first designated location specified by the first identification shape 91L with audio data in which sound is emphasized in a second directivity directed toward a second sound position corresponding to the second designated location specified by the second identification shape 92L, from the first speaker 65L; and a state of outputting audio data in which sound is emphasized in a third directivity directed toward a third sound position corresponding to the third designated location specified by the third identification shape 93L, from the second speaker 65R. In addition, FIG. 39A is the same as FIG. 31A, and thus description of FIG. 39A will be omitted.

For example, it is assumed that the user performs a operation of drawing a circular shape as a result of touch and drag operations on the vicinity of the head of the person 91a displayed on the screen 68 (refer to FIG. 40B) of the display 63, performs a operation of drawing a rectangular shape as a result of touch and drag operations on the vicinity of the head of the person 92a, performs a operation of drawing a triangular shape as a result of touch and drag operations on the vicinity of the head of the person 93a, and performs a operation of drawing a hexagonal shape as a result of touch and drag operations on the vicinity of the head of the person 94a, so as to perform continuous designation. The locations designated through the operation of drawing each shape as a result of the touch and drag operations are a plurality of designated locations which are designated by the user. In a case where the plurality of designated locations are designated, the signal processing unit 50 displays the shape drawn through the different drawing operation for each designated location around each designated location as an identification shape in order to appropriately differentiate the designated locations from each other.

Specifically, the signal processing unit 50 displays the identification shape 91L for visually clearly showing that the person 91a is designated, around the person 91a designated through the operation of drawing the circular shape, displays the identification shape 92L for visually clearly showing that the person 92a is designated, around the person 92a designated through the operation of drawing the rectangular shape, displays the identification shape 93L for visually clearly showing that the person 93a is designated, around the person 93a designated through the operation of drawing the triangular shape, and displays the identification shape 94L for visually clearly showing that the person 94a is designated, around the person 94a designated through the operation of drawing the hexagonal shape. The identification shapes 91K, 92K, 93K and 94K are only examples and are not limited to the respective shapes. In FIG. 39B, each identification shape is represented by a dotted line but is not limited to the dotted line, and may be represented by, for example, a solid line.

In addition, the signal processing unit 50 generates audio data items in which directivity is formed in directivities (directions indicated by the reference signs e1, e2, and e3 shown in FIG. 39A) from the installation position of the microphone array 20C toward the sound positions corresponding to the four designated locations designated by the user by using audio data of sound collected by the microphone array 20C, and combines the audio data items with each other. For example, the reproducing unit 60 sets the identification shapes 91L and 92L drawn in the left display region from the center of the display 63 as a sound output group, and outputs audio data obtained by combining audio data in which sound is emphasized in the first directivity (refer to the reference sign e1 illustrated in FIG. 39A) specified by the identification shape 91L with audio data in which sound is emphasized in the second directivity (refer to the reference sign e2 illustrated in FIG. 39A) specified by the identification shape 92L, from the speaker 65L as sound in synchronization with the video data captured by the omnidirectional camera 10E. Further, the reproducing unit 60 sets the identification shape 93L drawn in the right display region from the center of the display 63 as a sound output group, and outputs audio data in which sound is emphasized in the third directivity (refer to the reference sign e3 illustrated in FIG. 39A) specified by the third identification shape 93L, from the speaker 65R as sound in synchronization with the video data captured by the omnidirectional camera 10E. Therefore, the conversation sound ("Hello") of the person 91a and the conversation sound ("Hi!") of the person 92a are emphasized and are output from the speaker 65L, and the conversation sound ("Good morning!") of the person 93a is emphasized and is output from the speaker 65R. Further, since FIG. 36A illustrates that the person 94a does not utter sound, conversation sound of the person 94a is not emphasized or output from the speakers 65L and 65R, but, for example, in a case where the person 94a utters sound, conversation sound of the person 94a is also output from the speakers 65L and 65R.

In addition, in the above description, a case has been described in which the reproducing unit 60 divides a set of identification shapes into identification shapes displayed in the left display region and the right display region from the center of the display 63 and then forms each sound output group, but the present embodiment is not limited to this method. For example, the user may arbitrarily designate a sound output group. For example, the first identification shape 91L and the third identification shape 93L may be designated as a sound output group for outputting sound from the speaker 65L, and the second identification shape 92L may be designated as a sound output group for outputting sound from the speaker 65R. In this case, the reproducing unit 60 outputs audio data obtained by combining audio data in which sound is emphasized in the first directivity (refer to the reference sign e1 illustrated in FIG. 39A) specified by the identification shape 91L with audio data in which sound is emphasized in the third directivity (refer to the reference sign e3 illustrated in FIG. 39A) specified by the identification shape 93L, from the speaker 65L as sound in synchronization with the video data captured by the omnidirectional camera 10E. Further, the reproducing unit 60 outputs audio data in which sound is emphasized in the second directivity (refer to the reference sign e2 illustrated in FIG. 39A) specified by the third identification shape 92L, from the speaker 65R as sound in synchronization with the video data captured by the omnidirectional camera 10E. Therefore, the conversation sound ("Hello") of the person 91a and the conversation sound ("Good morning!") of the person 93a are emphasized and are output from the speaker 65L, and the conversation sound ("Hi!") of the person 92a is emphasized and is output from the speaker 65R.

FIG. 40 is a diagram illustrating a case in which a touch operation is performed on parts other than a display region of the video data which is displayed on the display 63 provided with a touch panel in a state in which the video data illustrated in FIG. 39B is displayed, and, as a result, the adjustment operation box OPB is displayed. For example, in a case where the video data illustrated in FIG. 39B is displayed on the display 63 provided with the touch panel, it is assumed that the user touches parts other than the display region of the video data. In response to the user's touch, the signal processing unit 50 displays the adjustment operation box OPB for adjusting a volume level of sound which is output from the speaker 65L or 65R, on the display 63.

As described above, in the fourth embodiment, in a case where the user designates a plurality of (for example, two) designated locations in video data displayed on the display 63, the signal processing unit 50 displays different identification shapes (for example, the identification shapes 91L and 92L) at the respective designated locations in the video data.

Consequently, the sound processing system 5D can recognize a plurality of different designated locations which are designated by the user in the video data displayed on the display 63 in a differentiated manner, and can visually clearly show the plurality of designated locations which are recognized in a differentiated manner to the user by displaying different identification shapes around the respective differentiated designated locations, for example, by displaying the rectangular identification shape 91L around one designated location and displaying the circular identification shape 92L around the other designated location.

In addition, for example, two speakers are provided in the sound processing system 5D. The reproducing unit 60 outputs first audio data in which sound is emphasized in a first directivity directed toward a position (first sound position) corresponding to a first designated location from the microphone array 20, from the first speaker 65L as sound, and outputs second audio data in which sound is emphasized in a second directivity directed toward a position (second sound position) corresponding to a second designated location from the microphone array 20, from the second speaker 65R as sound.

Consequently, for example, in a case where two speakers are provided, the sound processing system 5D can output respective audio data items in which sound is emphasized in the directivities directed toward the sound positions corresponding to the designated locations from the microphone array 20, from the speakers 65L and 65R as sound in an independent manner for the respective designated locations.

Hereinafter, configurations, operations, and effects of the sound processing system and sound processing method related to the above-described present invention will be described.

According to an embodiment of the present invention, there is provided a sound processing system including at least one imaging unit that captures a video; a display unit that displays video data captured by the imaging unit; a sound collecting unit that includes a plurality of microphones and collects sound by using the microphones; a sound output unit that outputs audio data collected by the sound collecting unit, as sound; a recording unit that records the video data captured by the imaging unit and the audio data collected by the sound collecting unit; a reproducing unit that displays the video data recorded in the recording unit on the display unit, and outputs the audio data recorded in the recording unit from the sound output unit as sound; an operation unit that receives designation of one or more designated locations in the video data displayed on the display unit; and a signal processing unit that generates or combines audio data in which sound is emphasized in directivities directed toward positions corresponding to the one or more designated locations in the video data from the sound collecting unit based on the audio data recorded in the recording unit.

With this configuration, in the sound processing system, the signal processing unit generates and combines audio data in which directivity is formed in directions directed toward positions corresponding to one or more designated locations from a microphone array by using respective audio data items collected by microphones of the microphone array in response to designation of a predetermined designated location via the operation unit during reproduction of the previously recorded video data.

Consequently, the sound processing system can emphasize and output audio data in videos for any designated reproduction period of time during reproduction of recorded video data and audio data.

In addition, according to the embodiment of the present invention, the reproducing unit outputs, from the sound output unit as sound, the audio data in which sound is emphasized in directivities directed toward positions corresponding to the one or more designated locations in the video data from the sound collecting unit.

Consequently, in the sound processing system, the signal processing unit can output, from the microphone array as sound, audio data in which directivity is formed in directivities directed toward positions corresponding to one or more designated locations.

In addition, according to the embodiment of the present invention, the imaging unit is an omnidirectional camera; the signal processing unit performs image conversion on a coordinate system of video data including the one or more designated locations according to the one or more designated locations which are designated while the video data captured by the omnidirectional camera is displayed on the display unit; and the reproducing unit displays the image-converted video data on the display unit, and outputs, from the sound collecting unit as sound, the audio data in which sound is emphasized in directivities directed toward positions corresponding to the one or more designated locations.

With this configuration, the sound processing system can facilitate a coordinate system conversion process for correlating a position of a subject in video data captured by the omnidirectional camera with a direction of sound of a person as the subject, collected by the microphone array, and thus it is possible to reduce a processing load in a case where the reproducing unit reproduces video data captured by the camera and audio data in which directivity is formed in directions directed toward positions corresponding to one or more designated locations in synchronization with each other.

Further, according to the embodiment of the present invention, the imaging unit and the sound collecting unit are disposed on a common axis.

Consequently, in the sound processing system, the omnidirectional camera and the microphone array of the sound processing system are provided so as to have the common axis, and thus the common coordinate system can be used as coordinate systems of the omnidirectional camera 10E and the microphone array 20C.

In addition, according to the embodiment of the present invention, the imaging unit and the sound collecting unit are disposed on an indoor ceiling.

Consequently, installation of the sound processing system can be simplified.

Further, according to the embodiment of the present invention, in response to designation of a plurality of designated locations in the video data displayed on the display unit, the signal processing unit displays different identification shapes at the respective designated locations in the video data.

With this configuration, in a case where the user designates a plurality of (for example, two) different designated locations in the video data displayed on the display, the signal processing unit displays different identification shapes at the respective different designated locations in the video data.

Consequently, the sound processing system can recognize a plurality of different designated locations which are designated by the user in the video data displayed on the display in a differentiated manner, and can visually clearly show the plurality of designated locations which are recognized in a differentiated manner to the user by displaying different identification shapes at the respective differentiated designated locations, for example, by displaying a rectangular identification shape at one designated location and displaying a circular identification shape at the other designated location.

In addition, according to the embodiment of the present invention, the sound output unit includes a first sound output portion and a second sound output portion, and the reproducing unit outputs, from the first sound output portion as sound, first audio data in which sound is emphasized in a first directivity directed toward a position corresponding to a first designated location from the sound collecting unit, and outputs, from the second sound output portion as sound, second audio data in which sound is emphasized in a second directivity directed toward a position corresponding to a second designated location from the sound collecting unit.

With this configuration, for example, two speakers are provided in the sound processing system, and the reproducing unit outputs first audio data in which sound is emphasized in a first directivity directed toward a position (first sound position) corresponding to a first designated location from the microphone array, from a first speaker as sound, and outputs second audio data in which sound is emphasized in a second directivity directed toward a position (second sound position) corresponding to a second designated location from the microphone array, from a second speaker as sound.

Consequently, for example, in a case where two speakers are provided, the sound processing system can output respective audio data items in which sound is emphasized in the directivities directed toward the sound positions corresponding to the designated locations from the microphone array, from the speakers as sound in an independent manner for the respective designated locations.

In addition, according to the embodiment of the present invention, the sound output unit includes a first sound output portion and a second sound output portion, and the reproducing unit outputs, from the first sound output portion as sound, audio data obtained by combining audio data items with each other in which sound is emphasized in a plurality of directivities directed toward positions corresponding to a plurality of designated locations from the sound collecting unit, and outputs, from the second sound output portion as sound or combined sound, audio data or audio data obtained by combining audio data items with each other, in which sound is emphasized in one or more remaining directivities directed toward positions corresponding to one or more remaining designated locations from the sound collecting unit.

With this configuration, for example, two speakers are provided in the sound processing system, the reproducing unit outputs audio data obtained by combining audio data items with each other in which sound is emphasized in first and second directivities directed toward positions (for example, first and second sound positions) corresponding to a plurality of designated locations from the microphone array, from a first speaker as sound, and outputs audio data in which sound is emphasized in one or more remaining directivities directed toward positions (for example, a third sound position) corresponding to one or more remaining designated locations from the microphone array, from a second speaker as sound.

Consequently, for example, in a case where two speakers are provided, the sound processing system can output, from one speaker as sound, audio data obtained by combining audio data items with each other in which sound is emphasized in a plurality of (for example, two) directivities from the microphone array, and can output audio data in which sound is emphasized in a different directivity from the other speaker as sound.

According to the embodiment of the present invention, the sound processing system further includes one or more sound output units, and the reproducing unit outputs, from the one or more sound output units as sound, audio data obtained by combining audio data items with each other in which sound is emphasized in a plurality of directivities directed toward positions corresponding to a plurality of designated locations from the sound collecting unit.

With this configuration, for example, one or more speakers are provided in the sound processing system, and the reproducing unit outputs first audio data in which sound is emphasized in a first directivity directed toward a position (first sound position) corresponding to a first designated location from the microphone array, second audio data in which sound is emphasized in a second directivity directed toward a position (second sound position) corresponding to a second designated location from the microphone array, and third audio data in which sound is emphasized in a third directivity directed toward a position (third sound position) corresponding to a third designated location from the microphone array, from the one or more speakers as sound.

Consequently, for example, in a case where one or more speakers are provided, the sound processing system can combine audio data items in which sound is emphasized in a plurality of (for example, three) directivities from the microphone array with each other and can out the combined audio data from the speakers. In addition, in a case where a plurality of speakers are provided, the sound processing system can output the combined audio data simultaneously.

Further, according to the embodiment of the present invention, the signal processing unit displays a medium for adjusting a parameter of the audio data output from the sound output unit as sound, in response to a predetermined input operation, or a designation operation on a part other than a display region of the video data.

With this configuration, the sound processing system can easily display an adjustment operation box for receiving an operation of adjusting a parameter (for example, a volume level) of audio data which is output from the speaker as sound through a predetermined input operation (for example, a right click operation of a mouse), or a designation operation (for example, a left click operation of the mouse) on parts other than a display region of video data which is displayed on the display.

In addition, according to the embodiment of the present invention, the signal processing unit displays a medium for indicating a state of a parameter of the audio data output from the sound output unit as sound, at all times or in response to a predetermined input operation, or a designation operation on a part other than a display region of the video data.

With this configuration, the sound processing system can easily display a state indicator box as an indicator for indicating a state of a parameter (for example, a volume level) of audio data which is output from the speaker as sound at all times or through a predetermined input operation (for example, a right click operation of a mouse), or a designation operation (for example, a left click operation of the mouse) on parts other than a display region of video data which is displayed on the display.

Further, according to the embodiment of the present invention, the signal processing unit displays, on the display unit, by switching between video data captured by the imaging unit and a medium for adjusting a parameter of the audio data output from the sound output unit as sound, in response to a predetermined input operation, or for each designation operation on a part other than a display region of the video data.

With this configuration, the sound processing system can easily display video data captured by the camera and an adjustment operation box for receiving an operation of adjusting a parameter (for example, a volume level) of the audio data which is output from the speaker as sound in a switching manner, in response to a predetermined input operation, or for each designation operation (for example, a left click operation of a mouse) on parts other than a display region of the video data.

In addition, according to the embodiment of the present invention, in response to an operation of drawing a predetermined shape including a designated location at a center thereof in the video data displayed on the display unit, the signal processing unit generates or combines audio data in which sound is emphasized in a directivity directed toward a position corresponding to the designated location from the sound collecting unit.

With this configuration, through a simple drawing operation (for example, a touch operation and a sliding operation in a state in which the touch operation is performed) of drawing a predetermined shape (for example, a rectangular shape) including a designated location at a center thereof in the video data displayed on the display, the sound processing system can generate or combine audio data in which sound is emphasized in a directivity directed toward a position corresponding to the designated location from the microphone array.

Further, according to the embodiment of the present invention, in response to re-designation of the identification shape displayed for each designated location, the signal processing unit generates or combines audio data in which sound stops being emphasized in a directivity directed toward a position corresponding to a designated location at which the re-designated identification shape is displayed from the sound collecting unit.

With this configuration, if the identification shape displayed for each designated location is re-designated, the sound processing system can easily generate or combine audio data in which sound stops being emphasized in a directivity directed toward a position corresponding to a designated location at which the re-designated identification shape is displayed from the microphone array.

According to another embodiment of the present invention, there is provided a sound processing method including the steps of causing at least one imaging unit to capture a video; causing a sound collecting unit including a plurality of microphones to collect sound; displaying video data captured by the imaging unit on a display unit; recording the video data captured by the imaging unit and the audio data collected by the sound collecting unit; displaying the recorded video data recorded on the display unit, and outputting the recorded audio data from a sound output unit as sound; receiving designation of one or more designated locations in the video data displayed on the display unit; and generating or combining audio data in which sound is emphasized in directivities directed toward positions corresponding to the one or more designated locations in the video data from the sound collecting unit based on the recorded audio data recorded.

With this configuration, in the sound processing system, the signal processing unit generates and combines audio data in which directivity is formed in directivities directed toward positions corresponding to one or more designated locations from a microphone array by using respective audio data items collected by microphones of the microphone array in response to designation of a predetermined designated location via the operation unit during reproduction of the previously recorded video data.

Consequently, the sound processing system can emphasize and output audio data in videos for any designated reproduction period of time during reproduction of recorded video data and audio data.

As mentioned above, the various embodiments have been described with reference to the drawings, but, needless to say, the present invention is not limited to the embodiments. It is clear that a person skilled in the art can conceive of various modifications or alterations within the scope disclosed in the claims, and it is understood that they naturally fall within the technical scope of the present invention.

This application is based on Japanese Patent Application No. 2012-285862, filed Dec. 27, 2012, and Japanese Patent Application No. 2013-252468, filed Dec. 5, 2013; the entire contents of which are incorporated herein by reference.

INDUSTRIAL APPLICABILITY

The present invention is useful as a sound processing system and a sound processing method capable of emphasizing and outputting audio data in directivities directed toward positions corresponding to one or more designated locations which are designated in a display screen on which captured video data is displayed.

REFERENCE SIGNS LIST 5A, 5B, 5C, 5D: SOUND PROCESSING SYSTEM
10, 10A, 10B, 10C: CAMERA
10E: OMNIDIRECTIONAL CAMERA
20, 20A, 20C, 20D, 20E, 20F: MICROPHONE ARRAY
22, 22A, 22B, 22C, 22D, 22E, 22F, 22a, 22b, 22c, 22(n−1), 22n: MICROPHONE
30, 30A: NETWORK
40: SOUND PROCESSING APPARATUS
45, 45A: RECORDER
50, 71: SIGNAL PROCESSING UNIT
51a, 51b, 51c, 51(n−1), 51n: A/D CONVERTER
52a, 52b, 52c, 52(n−1), 52n: DELAY DEVICE
55, 78: OPERATION UNIT
57: ADDER
60, 60A, 60B: REPRODUCING UNIT
63, 73: DISPLAY
65, 75, 82, 83: SPEAKER
101: MAIN CASING
103: PUNCHED METAL COVER
105: MICROPHONE SHEET METAL
107: BASE SHEET METAL
111: ANNULAR BOTTOM
113: MICROPHONE INSTALLATION HOLE
117: MAIN CASING OUTER CIRCUMFERENTIAL WALL
127: MICROPHONE BOARD

129: MICROPHONE CASING
133: ANNULAR TOP PLATE
135: BASE SHEET METAL OUTER CIRCUMFERENTIAL WALL
139: MAIN BOARD
141: POWER SUPPLY BOARD
143: FITTING PORTION
145: OUTER PINCH PIECE
147: INNER PINCH PIECE
149: GAP

The invention claimed is:

1. A sound processing system comprising:
at least one camera that captures a video image;
a sound collector that includes a plurality of microphones and collects sound by using the plurality of microphones;
a processor that displays the video image captured by the camera on a display, and outputs, from a speaker, sound collected by the sound collector; and
an input device that receives designation of at least one designated location in the video image displayed on the display,
wherein the camera and the sound collector are disposed on an indoor ceiling,
when a first designated location is received while the video image in a first coordinate system is being displayed on the display,
the processor converts a predetermined region of the video image including the first designated location, into an image in a second coordinate system, and displays the converted image in the second coordinate system on the display, and
the processor outputs, from the speaker, first emphasized sound in which sound originated in the predetermined region is emphasized,
when a second designated location is received while the converted image in the second coordinate system is being displayed on the display,
the processor outputs, from the speaker, second emphasized sound in which sound in a direction directed toward a position corresponding to the second designated location from the sound collector is emphasized,
wherein, when the at least one designated location comprises a plurality of different designated locations in the video image displayed on the display, the processor displays different identification shapes around the respective designated locations in the video image.

2. The sound processing system according to claim 1, wherein the camera is an omnidirectional camera.

3. The sound processing system according to claim 1, wherein the camera and the sound collector are disposed on a common axis.

4. The sound processing system according to claim 1, wherein the speaker comprises a first speaker and a second speaker, and
wherein the processor
outputs, from the first speaker, first sound, in which sound is emphasized in a first direction directed toward a position corresponding to one of the different designated locations from the sound collector; and
outputs, from the second speaker, second sound, in which sound is emphasized in a second direction directed toward a position corresponding to an other of the different designated locations from the sound collector.

5. The sound processing system according to claim 1, wherein the speaker comprises a first speaker and a second speaker, and
wherein the processor
outputs, from the first speaker, first sound, in which sound is emphasized in at least one direction directed toward at least one position corresponding to at least one designated location of the plurality of different designated locations from the sound collector; and
outputs, from the second speaker, second sound, in which sound is emphasized in a remaining direction directed toward a position corresponding to a remaining location other than the at least one location of the plurality of designated locations from the sound collector.

6. The sound processing system according to claim 1, wherein the speaker comprises a plurality of speakers,
wherein the processor outputs, from the plurality of speakers, sound obtained by combining sound items with each other, each of the sound items being emphasized in a direction directed toward a position corresponding to respective one of the plurality of different designated locations from the sound collector.

7. The sound processing system according to claim 1, wherein the processor displays a screen for adjusting a parameter of the sound output from the speaker, in response to a predetermined input operation, or a designation operation on a display region other than a display region of the video image displayed on the display.

8. The sound processing system according to claim 1, wherein the processor displays a screen indicating a state of a parameter of the sound output from the speaker, at all times or in response to a predetermined input operation, or a designation operation on a display region other than a display region of the video image displayed on the display.

9. The sound processing system according to claim 1, wherein the processor switches a displayed image on the display between the video image captured by the camera and a screen for adjusting a parameter of the sound output from the speaker, in response to a predetermined input operation, or a designation operation on a display region other than a display region of the video image displayed on the display.

10. The sound processing system according to claim 1, wherein, in response to an operation of drawing a predetermined shape defining the predetermined region including the first designated location in the video image displayed on the display, the processor outputs, from the speaker, the first emphasized sound in which the sound originated from the predetermined region is emphasized.

11. The sound processing system according to claim 1, wherein, in response to re-designation of an identification shape displayed for each designated location of the plurality of different designated locations, the processor outputs sound, in which sound is not emphasized in a direction directed toward a position corresponding to a designated location of the re-designated identification shape from the sound collector.

12. The sound processing system according to claim 1, further comprising a recorder that records the video data captured by the camera and the sound collected by the sound collector.

13. A sound processing method comprising:
causing at least one camera disposed on an indoor ceiling to capture a video image;
causing a sound collector, disposed on an indoor ceiling and including a plurality of microphones, to collect sound;

displaying the video image captured by the camera on a display in a first coordinate system;

receiving designation of a first designated location in the video image displayed on the display in the first coordinate system;

upon receipt of the designation of the first designated location, converting a predetermined region of the video image including the first designated location, into an image in a second coordinate system, displaying the converted image in the second coordinate system on the display, and outputting, from the speaker, first emphasized sound in which sound originated from the predetermined region is emphasized, receiving designation of a second designated location, while the converted image in the second coordinate system is being displayed on the display, upon receipt of the designation of the second designated location, outputting, from the speaker, second emphasized sound in which sound is emphasized in a direction toward a position corresponding to the second designated location in the converted image from the sound collector, wherein, when a plurality of different designated locations are designated in the video image displayed on the display, the processor displays different identification shapes around the respective designated locations in the video image.

\* \* \* \* \*